(12) United States Patent
Momma et al.

(10) Patent No.: US 12,412,893 B2
(45) Date of Patent: Sep. 9, 2025

(54) METHOD FOR FORMING POSITIVE ELECTRODE ACTIVE MATERIAL

(71) Applicant: SEMICONDUCTOR ENERGY LABORATORY CO., LTD., Atsugi (JP)

(72) Inventors: Yohei Momma, Kanagawa (JP); Teruaki Ochiai, Kanagawa (JP); Mayumi Mikami, Kanagawa (JP); Jo Saito, Kanagawa (JP); Masahiro Takahashi, Kanagawa (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 832 days.

(21) Appl. No.: 17/442,195

(22) PCT Filed: Mar. 23, 2020

(86) PCT No.: PCT/IB2020/052665
§ 371 (c)(1),
(2) Date: Sep. 23, 2021

(87) PCT Pub. No.: WO2020/201892
PCT Pub. Date: Oct. 8, 2020

(65) Prior Publication Data
US 2022/0190332 A1   Jun. 16, 2022

(30) Foreign Application Priority Data
Apr. 5, 2019 (JP) .................................. 2019-072816

(51) Int. Cl.
*H01M 4/525* (2010.01)
*C01G 51/66* (2025.01)
(Continued)

(52) U.S. Cl.
CPC ............ *H01M 4/525* (2013.01); *C01G 51/66* (2013.01); *H01G 11/50* (2013.01); *H01G 11/86* (2013.01);
(Continued)

(58) Field of Classification Search
None
See application file for complete search history.

(56) References Cited

U.S. PATENT DOCUMENTS 8,741,484 B2   6/2014  Karthikeyan et al.
8,765,306 B2   7/2014  Amiruddin et al.
(Continued)

FOREIGN PATENT DOCUMENTS

CN   105655554 A   6/2016
CN   106029577 A   10/2016
(Continued)

OTHER PUBLICATIONS

International Search Report (Application No. PCT/IB2020/052665) Dated Jun. 30, 2020.
(Continued)

*Primary Examiner* — Sheng H Davis
(74) *Attorney, Agent, or Firm* — Fish & Richardson P.C.

(57) ABSTRACT

A method for forming a positive electrode active material of a lithium ion secondary battery is provided. In the method for forming a positive electrode active material, a first container that includes a mixture of lithium oxide, fluoride, and a magnesium compound and fluoride that is outside the first container are provided in a heating furnace, and the heating furnace is heated at a temperature higher than or equal to a temperature at which the fluoride is volatilized or sublimated. It is further preferable that the fluoride be lithium fluoride and the magnesium compound be magnesium fluoride.

9 Claims, 31 Drawing Sheets

(51) Int. Cl.
   H01G 11/50   (2013.01)
   H01G 11/86   (2013.01)
   H01M 4/04    (2006.01)
   H01M 4/02    (2006.01)

(52) U.S. Cl.
   CPC ....... H01M 4/0471 (2013.01); *C01P 2002/77* (2013.01); *C01P 2002/88* (2013.01); *C01P 2006/40* (2013.01); *H01M 2004/028* (2013.01)

(56) References Cited

U.S. PATENT DOCUMENTS

| | | | |
|---|---|---|---|
| 8,916,294 | B2 | 12/2014 | Kumar et al. |
| 10,741,845 | B2 | 8/2020 | Yushin et al. |
| 11,539,039 | B2 | 12/2022 | Chae et al. |
| 2002/0110736 | A1 | 8/2002 | Kweon et al. |
| 2003/0104279 | A1 | 6/2003 | Miyazaki et al. |
| 2004/0142241 | A1 | 7/2004 | Nagayama |
| 2006/0263690 | A1* | 11/2006 | Suhara .................. H01M 4/525 429/231.6 |
| 2007/0117014 | A1 | 5/2007 | Saito et al. |
| 2008/0241693 | A1 | 10/2008 | Fukuchi et al. |
| 2009/0087362 | A1 | 4/2009 | Sun et al. |
| 2009/0104532 | A1 | 4/2009 | Hosoya |
| 2010/0086854 | A1 | 4/2010 | Kumar et al. |
| 2010/0247986 | A1 | 9/2010 | Toyama et al. |
| 2011/0236751 | A1 | 9/2011 | Amiruddin et al. |
| 2011/0244331 | A1 | 10/2011 | Karthikeyan et al. |
| 2011/0300441 | A1 | 12/2011 | Kawakami |
| 2013/0052534 | A1 | 2/2013 | Fujiki et al. |
| 2013/0323596 | A1 | 12/2013 | Morita et al. |
| 2016/0013478 | A1 | 1/2016 | Satow et al. |
| 2016/0276659 | A1 | 9/2016 | Choi et al. |
| 2017/0018768 | A1 | 1/2017 | Yushin et al. |
| 2017/0069911 | A1 | 3/2017 | Volkov et al. |
| 2018/0013130 | A1 | 1/2018 | Ochiai et al. |
| 2018/0145317 | A1 | 5/2018 | Momma et al. |
| 2018/0145368 | A1 | 5/2018 | Ochiai et al. |
| 2018/0233770 | A1 | 8/2018 | Ein-eli et al. |
| 2020/0176770 | A1 | 6/2020 | Takahashi et al. |
| 2020/0313177 | A1 | 10/2020 | Momma et al. |
| 2020/0313178 | A1 | 10/2020 | Momma et al. |
| 2020/0328413 | A1 | 10/2020 | Momma et al. |
| 2020/0358091 | A1 | 11/2020 | Momma et al. |
| 2020/0373567 | A1 | 11/2020 | Momma et al. |
| 2020/0373568 | A1 | 11/2020 | Momma et al. |
| 2020/0373569 | A1 | 11/2020 | Momma et al. |
| 2020/0373580 | A1 | 11/2020 | Yushin et al. |
| 2021/0020935 | A1 | 1/2021 | Takahashi et al. |
| 2021/0028456 | A1 | 1/2021 | Takahashi et al. |
| 2021/0083281 | A1 | 3/2021 | Mikami et al. |
| 2021/0313571 | A1 | 10/2021 | Momma et al. |
| 2022/0199984 | A1 | 6/2022 | Momma et al. |
| 2022/0199989 | A1 | 6/2022 | Momma et al. |
| 2023/0307622 | A1 | 9/2023 | Momma et al. |
| 2023/0327095 | A1 | 10/2023 | Momma et al. |

FOREIGN PATENT DOCUMENTS

| | | | | |
|---|---|---|---|---|
| CN | 108023068 | A | 5/2018 | |
| EP | 3460882 | A | 3/2019 | |
| EP | 3783707 | A | 2/2021 | |
| JP | 2000-203842 | A | 7/2000 | |
| JP | 2001210325 | | * 8/2001 | |
| JP | 2002-216760 | A | 8/2002 | |
| JP | 2010-080407 | A | 4/2010 | |
| JP | 2012-018914 | A | 1/2012 | |
| JP | 2012-504316 | | 2/2012 | |
| JP | 2013-524413 | | 6/2013 | |
| JP | 2013-524440 | | 6/2013 | |
| JP | 2015-099722 | A | 5/2015 | |
| JP | 2016-076454 | A | 5/2016 | |
| JP | 2018-088400 | A | 6/2018 | |
| JP | 2018-520488 | | 7/2018 | |
| JP | 2018-523276 | | 8/2018 | |
| JP | 2019-032954 | A | 2/2019 | |
| JP | 7081908 | | 6/2022 | |
| KR | 2011-00769554 | | 7/2011 | |
| TW | 201907608 | | 2/2019 | |
| WO | WO-2010/039732 | | 4/2010 | |
| WO | WO-2010039732 | A2 * | 4/2010 | ............. C01G 53/50 |
| WO | WO-2011/119386 | | 9/2011 | |
| WO | WO-2011/123264 | | 10/2011 | |
| WO | WO2015128219 | | * 9/2015 | |
| WO | WO-2015128219 | A1 * | 9/2015 | ............. C01G 53/50 |
| WO | WO-2017/011594 | | 1/2017 | |
| WO | WO-2017/025957 | | 2/2017 | |
| WO | WO-2018/135929 | | 7/2018 | |
| WO | WO-2019/003025 | | 1/2019 | |

OTHER PUBLICATIONS

Written Opinion (Application No. PCT/IB2020/052665) Dated Jun. 30, 2020.

Motohashi.T et al., "Electronic phase diagram of the layered cobalt oxide system $Li_xCoO_2$ ($0.0 \leq x \leq 1.0$)", Phys. Rev. B (Physical Review. B), Oct. 9, 2009, vol. 80, No. 16, pp. 165114-1-165114-9.

Okumura.T et al., "Correlation of lithium ion distribution and X-ray absorption near-edge structure in O3- and O2-lithium cobalt oxides from first-principle calculation", Journal of Materials Chemistry, 2012, vol. 22, pp. 17340-17348.

Exhibit 1031 of IPR2023-01016, portions of JP-2012-018914A and Full translation.

Exhibit 1027 of IPR2023-01349, Full translation of JP-2012-018914A.

Chinese Office Action (Application No. 202080026420.0) Dated Apr. 28, 2023.

Appendix B of EPR U.S. Appl. No. 90/019,535, portions of JP-2012-018914A and Full translation.

Exhibit 1040 of EPR U.S. Appl. No. 90/019,535, JP-2012-018914A and Full translation.

\* cited by examiner

120

903  116    906 122

120

903  124 126  906

METHOD FOR FORMING POSITIVE ELECTRODE ACTIVE MATERIAL

CROSS REFERENCE TO RELATED APPLICATIONS

This application is a U.S. National Phase Application under 35 U.S.C. § 371 of International Application PCT/IB2020/052665, filed on Mar. 23, 2020, which is incorporated by reference and claims the benefit of a foreign priority application filed in Japan on Apr. 5, 2019, as Application No. 2019-072816.

TECHNICAL FIELD

One embodiment of the present invention relates to a method for forming a positive electrode active material. Alternatively, the present invention relates to an object, a process, a machine, manufacture, or a composition (composition of matter). One embodiment of the present invention relates to a semiconductor device, a display device, a light-emitting device, a power storage device, a lighting device, an electronic device, or a forming method thereof.

Note that in this specification, a power storage device refers to every element and device having a function of storing electric power. Examples of the power storage device include a storage battery (also referred to as a secondary battery) such as a lithium ion secondary battery, a lithium ion capacitor, an all-solid-state battery, and an electric double layer capacitor.

In addition, electronic devices in this specification mean all devices including power storage devices, and electro-optical devices including power storage devices, information terminal devices including power storage devices, and the like are all electronic devices.

BACKGROUND ART

In recent years, a variety of power storage devices such as lithium ion secondary batteries, lithium ion capacitors, air batteries, and all-solid-state batteries have been actively developed. In particular, a demand for lithium ion secondary batteries with high output and high capacity has rapidly grown with the development of the semiconductor industry, for portable information terminals such as mobile phones, smartphones, and laptop computers; portable music players; digital cameras; medical equipment; next-generation clean energy vehicles such as hybrid vehicles (HV), electric vehicles (EV), and plug-in hybrid electric vehicles (PHV or PHEV); and the like. The lithium ion secondary batteries are essential as rechargeable energy supply sources for today's information society.

Thus, improvement of a positive electrode active material has been studied to increase the cycle performance and the capacity of the lithium ion secondary battery (Patent Document 1 and Patent Document 2).

The performance currently required for power storage devices includes safe operation under a variety of environments and longer-term reliability.

REFERENCE

Patent Documents

[Patent Document 1] Japanese Published Patent Application No. 2012-018914

[Patent Document 2] Japanese Published Patent Application No. 2016-076454

Non-Patent Documents

[Non-Patent Document 1] Toyoki Okumura et al., "Correlation of lithium ion distribution and X-ray absorption near-edge structure in O3- and O2-lithium cobalt oxides from first-principle calculation", *Journal of Materials Chemistry*, 2012, 22, pp. 17340-17348.

[Non-Patent Document 2] T. Motohashi, et al., "Electronic phase diagram of the layered cobalt oxide system $Li_xCoO_2$ ($0.0 \leq x \leq 1.0$)", *Physical Review B*, 80 (16); 165114.

SUMMARY OF THE INVENTION

Problems to be Solved by the Invention

A lithium ion secondary battery and a positive electrode active material that is used for it require an improvement in terms of capacity, cycle performance, charge and discharge characteristics, reliability, and safety, and development of a lithium composite oxide $LiMO_2$ in which part of $LiCoO_2$ is substituted with different elements progresses. Furthermore, development of a method for forming $LiMO_2$ at low cost in a short time is desired.

In view of the above, one object of one embodiment of the present invention is to provide a method for forming a positive electrode active material. Another object of one embodiment of the present invention is to provide a novel positive electrode active material. Another object of one embodiment of the present invention is to provide a novel power storage device.

Note that the description of these objects does not preclude the existence of other objects. One embodiment of the present invention does not have to achieve all these objects. Note that other objects can be taken from the description of the specification, the drawings, and the claims.

Means for Solving the Problems

One embodiment of the present invention is a method for forming a positive electrode active material, in which a first container that includes a mixture of lithium oxide, fluoride, and a magnesium compound and fluoride that is outside the first container are provided in a heating furnace, and the heating furnace is heated at a temperature higher than or equal to a temperature at which the fluoride is volatilized or sublimated.

Another embodiment of the present invention is a method for forming a positive electrode active material, in which a first container that includes a mixture of lithium oxide, fluoride, and a magnesium compound and a second container that includes fluoride are provided in a heating furnace, and the heating furnace is heated at a temperature higher than or equal to a temperature at which the fluoride is volatilized or sublimated.

In the above structure, the fluoride is preferably lithium fluoride (LiF).

In the above structure, the heating furnace is preferably heated at higher than or equal to 740° C. and lower than or equal to 1130° C.

In the above structure, the magnesium compound is preferably magnesium fluoride ($MgF_2$).

In the above structure, the heating furnace is preferably heated after an atmosphere in the heating furnace is replaced with oxygen.

Effect of the Invention

According to one embodiment of the present invention, a method for forming a positive electrode active material can be provided. According to another embodiment of the present invention, a novel positive electrode active material particle can be provided. According to another embodiment of the present invention, a novel power storage device can be provided.

MODE FOR CARRYING OUT THE INVENTION

Figure 1:
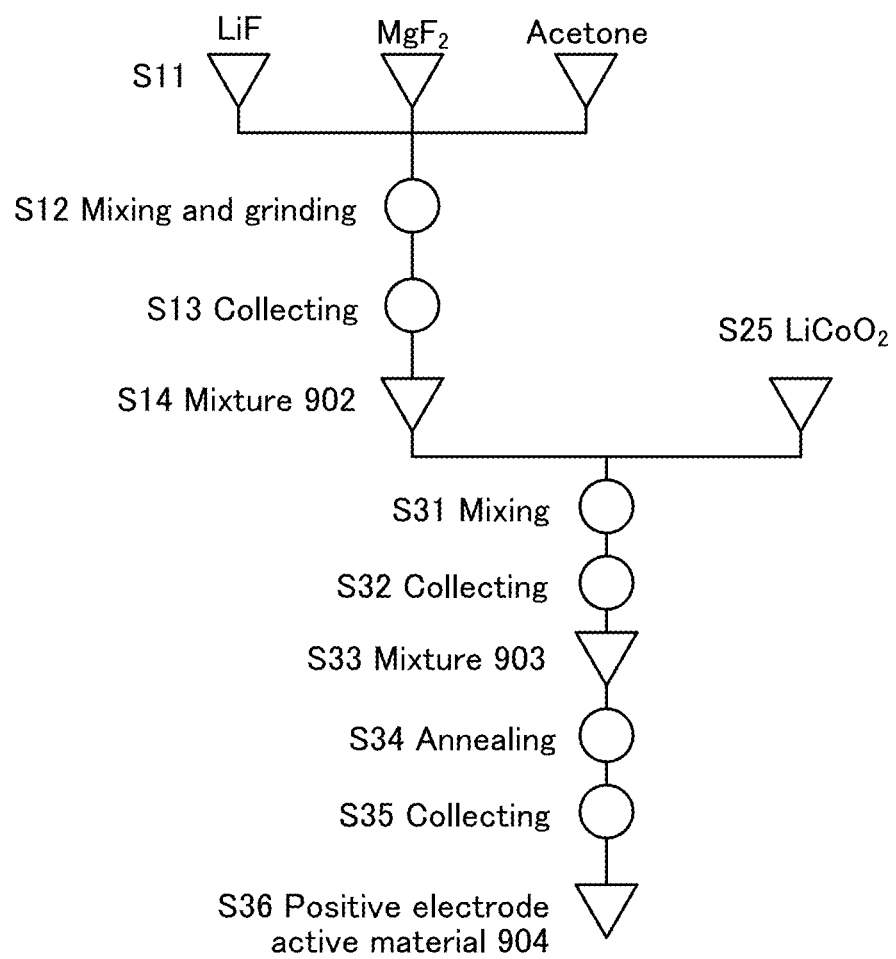
FIG. 1 is a diagram illustrating an example of a method for forming a positive electrode active material.

Embodiments of the present invention are described in detail with reference to the drawings. Note that the present invention is not limited to the following description, and it is readily understood by those skilled in the art that modes and details of the present invention can be modified in various ways. In addition, the present invention should not be construed as being limited to the description of embodiments below.

In the crystallography, a bar is placed over a number in the expression of crystal planes and orientations; however, in this specification and the like, crystal planes and orientations are expressed by placing − (a minus sign) at the front of a number because of expression limitations. Furthermore, an individual direction which shows an orientation in a crystal is denoted by "[ ]", a set direction which shows all of the equivalent orientations is denoted by "< >", an individual plane which shows a crystal plane is denoted by "( )", and a set plane having equivalent symmetry is denoted by "{ }".

In this specification, an atmosphere including fluoride is an atmosphere of a mixed gas including fluoride as at least one of the constituting components or an atmosphere under a condition of the mixed gas.

Embodiment 1

An example of a method for forming a lithium composite oxide $LiMO_2$ (M is two or more kinds of metals including Co, and the substitution positions of the metals are not particularly limited) is described with reference to FIG. 1. A positive electrode active material containing Mg as a metal element contained in $LiMO_2$ other than Co is described below as an example.

First, a halogen source is prepared as a material of a mixture 902. As the halogen source, chloride, bromide, and iodide can be used, and fluoride is particularly preferable. In this embodiment, LiF, which is a fluorine source, is prepared as the halogen source. LiF is preferable because it has a cation common with $LiCoO_2$. LiF can be used as both a lithium source and the fluorine source. LiF, which has a relatively low melting point of 848° C., is preferable because it is easily melted in an annealing process described later. Similarly, $MgF_2$, which can be used also as a fluorine source, is preferable as a magnesium source used for $LiMO_2$. Note that LiCl can also be used as the halogen source, and $MgCl_2$ can also be used as the magnesium source. Note that as a combination of the halogen source and the magnesium source, a combination having a eutectic point is preferable because a decrease in melting point, which is described later, can be utilized. Furthermore, the halogen source that can be used for one embodiment of the present invention is not limited to LiF or LiCl. Moreover, the magnesium source that can be used for one embodiment of the present invention is not limited to $MgF_2$ or $MgCl_2$.

In this specification, the eutectic point refers to a point in a solid-liquid phase curve of two components at which the two components do not form a solid solution but completely melt and mix in the liquid state. For example, when two components of metal elements A and B are fused, in the case where A and B do not form a solid solution and form solid phases separately or form molecular compounds, and A and B are completely melted together in a liquid phase, a mixture of A and B has a melting point lower than the melting point of A or B alone, and a mixture having a certain concentration ratio of A to B has the lowest melting point. This temperature is also referred to as a eutectic point, and this mixture is also referred to as a eutectic mixture. The above description applies not only to two components but also to three, four, five, or more components.

In this embodiment, LiF, which is a fluorine source, is prepared as the halogen source, and $MgF_2$ is prepared as the fluorine source and the magnesium source (Step S11 in FIG. 1). The molar ratio of LiF to $MgF_2$ is preferably LiF:$MgF_2$=u:1 ($0 \leq u \leq 1.9$), further preferably LiF:$MgF_2$=u:1 ($0.1 \leq u \leq 0.5$), still further preferably LiF:$MgF_2$=u:1 (u=the vicinity of 0.33).

In addition, in the case where the following mixing and grinding steps are performed by a wet process, a solvent is prepared. As the solvent, ketone such as acetone; alcohol such as ethanol or isopropanol; ether; dioxane; acetonitrile; N-methyl-2-pyrrolidone (NMP); or the like can be used. An aprotic solvent that hardly reacts with lithium is further preferably used. In this embodiment, acetone is used (see Step S11 in FIG. 1).

Next, the materials of the mixture 902 are mixed and ground (Step S12 in FIG. 1). Although the mixing can be performed by a dry process or a wet process, the wet process is preferable because the materials can be ground to the smaller size. For example, a ball mill, a bead mill, or the like can be used for the mixing. When the ball mill is used, a zirconia ball is preferably used as media, for example. The mixing and grinding steps are preferably performed sufficiently to pulverize the mixture 902.

The materials mixed and ground in the above are collected (Step S13 in FIG. 1), whereby the mixture 902 is obtained (Step S14 in FIG. 1).

For example, the mixture 902 preferably has an average particle diameter (D50) of greater than or equal to 600 nm and less than or equal to 20 μm, further preferably greater than or equal to 1 μm and less than or equal to 10 μm. When mixed with a composite oxide containing lithium such as lithium cobalt oxide, a transition metal, and oxygen in the later step, the mixture 902 pulverized to such a small size is easily attached to surfaces of composite oxide particles uniformly. The mixture 902 is preferably attached to the surfaces of the composite oxide particles uniformly because both halogen and magnesium are easily distributed to the surface portion of the composite oxide particles after heating. When there is a region containing neither halogen nor magnesium in the surface portion, the positive electrode active material might be less likely to have a pseudo-spinel crystal structure, which is described later, in the charged state.

<Step S25>

Next, a lithium source is prepared as shown in Step S25. A composite oxide which is synthesized in advance and contains lithium, a transition metal, and oxygen is used as Step S25.

In the case where the composite oxide containing lithium, the transition metal, and oxygen that is synthesized in advance is used, a composite oxide with few impurities is preferably used. In this specification and the like, lithium, cobalt, nickel, manganese, aluminum, and oxygen are the main components of the composite oxide containing lithium, the transition metal, and oxygen and the positive electrode active material, and elements other than the main components are regarded as impurities. For example, when analyzed with a glow discharge mass spectroscopy method (GD-MS), the total impurity concentration is preferably less than or equal to 10,000 ppm wt, further preferably less than or equal to 5,000 ppm wt. In particular, the total impurity concentration of transition metals such as titanium and arsenic is preferably less than or equal to 3,000 ppm wt, further preferably less than or equal to 1,500 ppm wt.

For example, as lithium cobalt oxide synthesized in advance, a lithium cobalt oxide particle (product name: CELLSEED C-10N) formed by NIPPON CHEMICAL INDUSTRIAL CO., LTD. can be used. This is lithium cobalt oxide in which the average particle diameter (D50) is approximately 12 μm, and in the impurity analysis by a glow discharge mass spectroscopy method, the magnesium concentration and the fluorine concentration are less than or equal to 50 ppm wt, the calcium concentration, the aluminum concentration, and the silicon concentration are less than or equal to 100 ppm wt, the nickel concentration is less than or equal to 150 ppm wt, the sulfur concentration is less than or equal to 500 ppm wt, the arsenic concentration is less than or equal to 1100 ppm wt, and the concentrations of elements other than lithium, cobalt, and oxygen are less than or equal to 150 ppm wt.

The composite oxide containing lithium, the transition metal, and oxygen in Step S25 preferably has a layered rock-salt crystal structure with few defects and distortions. Therefore, the composite oxide is preferably a composite oxide with few impurities. In the case where the composite oxide containing lithium, the transition metal, and oxygen includes a large number of impurities, the crystal structure is highly likely to have a large number of defects or distortions.

Next, the mixture 902 and the composite oxide containing lithium, the transition metal, and oxygen are mixed (Step S31 in FIG. 1). The atomic ratio of the transition metal TM in the composite oxide containing lithium, the transition metal, and oxygen to magnesium MgMix1 contained in the mixture 902 is preferably TM:MgMix1=1:v ($0.005 \leq v \leq 0.05$), further preferably TM:$Mg_{Mix1}$=1:v ($0.007 \leq v \leq 0.04$), still further preferably approximately TM:$Mg_{Mix1}$=1:0.02.

The condition of the mixing in Step S31 is preferably milder than that of the mixing in Step S12 not to damage the particles of the composite oxide. For example, a condition with a lower rotation frequency or shorter time than the mixing in Step S12 is preferable. In addition, it can be said that the dry process has a milder condition than the wet process. For example, a ball mill, a bead mill, or the like can be used for the mixing. When the ball mill is used, a zirconia ball is preferably used as media, for example.

The materials mixed in the above manner are collected (Step S32 in FIG. 1), whereby a mixture 903 is obtained (Step S33 in FIG. 1).

Next, the mixture 903 is heated (Step S34 in FIG. 1). This step is referred to as annealing in some cases. $LiMO_2$ is formed by the annealing. Thus, the conditions of performing Step S34, such as temperature, time, an atmosphere, and weight of the mixture 903 on which the annealing is performed, are important. In this specification, annealing includes, in meaning, a case where the mixture 903 is heated and a case where a heating furnace in which at least the mixture 903 is provided is heated.

In the case where the conditions of S34 are not appropriate, a positive electrode active material having excellent characteristics cannot be obtained in some cases.

Here, the present inventors have found that annealing performed in an atmosphere including fluoride included in the mixture 903 (in the case of this embodiment, LiF) enables a positive electrode active material having excellent characteristics to be formed.

[Effects of Annealing in Atmosphere Including Fluoride]

The annealing temperature is preferably higher than or equal to a temperature at which the mixture 902 is melted. When the mixture 903 is annealed, the mixture 902 is presumed to be melted. For example, the mixture of $MgF_2$ (melting point: 1263° C.) and LiF (melting point: 848° C.) is considered to be melted and distributed to surface portions of the composite oxide particles. It is considered that when $MgF_2$ is melted, a reaction with $LiCoO_2$ is promoted, so that $LiMO_2$ is formed. Thus, a combination of the fluoride and the magnesium source preferably forms a eutectic mixture.

The annealing temperature is further preferably higher than or equal to a temperature at which the mixture 903 is melted. When fluoride (e.g., LiF), a magnesium source (e.g., $MgF_2$), and lithium oxide (e.g., $LiCoO_2$) form a shared mixture, formation of $LiMO_2$ is probably promoted.

The annealing temperature needs to be lower than or equal to a decomposition temperature of $LiCoO_2$ (1130° C.). Thus, the heating is preferably performed at higher than or equal to the eutectic point of the fluoride and the magnesium source and lower than or equal to 1130° C.

Note that the eutectic point of LiF and $MgF_2$ is around 735° C., which is described later. Furthermore, an endothermic peak of LiF, $MgF_2$, and $LiCoO_2$ is observed at around 820° C. in differential scanning calorimetry (DSC measurement). Thus, the annealing temperature is preferably higher than or equal to 735° C., further preferably higher than or equal to 820° C. Since the decomposition temperature of $LiCoO_2$ is 1130° C., decomposition of a slight amount of $LiCoO_2$ is concerned at a temperature close to the decomposition temperature. Thus, the annealing temperature is preferably lower than or equal to 1130° C., further preferably lower than or equal to 1000° C.

Accordingly, the annealing temperature is preferably higher than or equal to 735° C. and lower than or equal to 1130° C., further preferably higher than or equal to 735° C. and lower than or equal to 1000° C. Moreover, the annealing temperature is preferably higher than or equal to 820° C. and lower than or equal to 1130° C., further preferably higher than or equal to 820° C. and lower than or equal to 1000° C.

Here, the DSC measurement of the mixture of LiF and $MgF_2$ is described.

As the measurement device, Thermo plus EV02 produced by Rigaku Corporation is used. The measurement is performed in a temperature range from 25° C. to 1000° C. at a temperature rising rate of 20° C./min.

Figure 2:
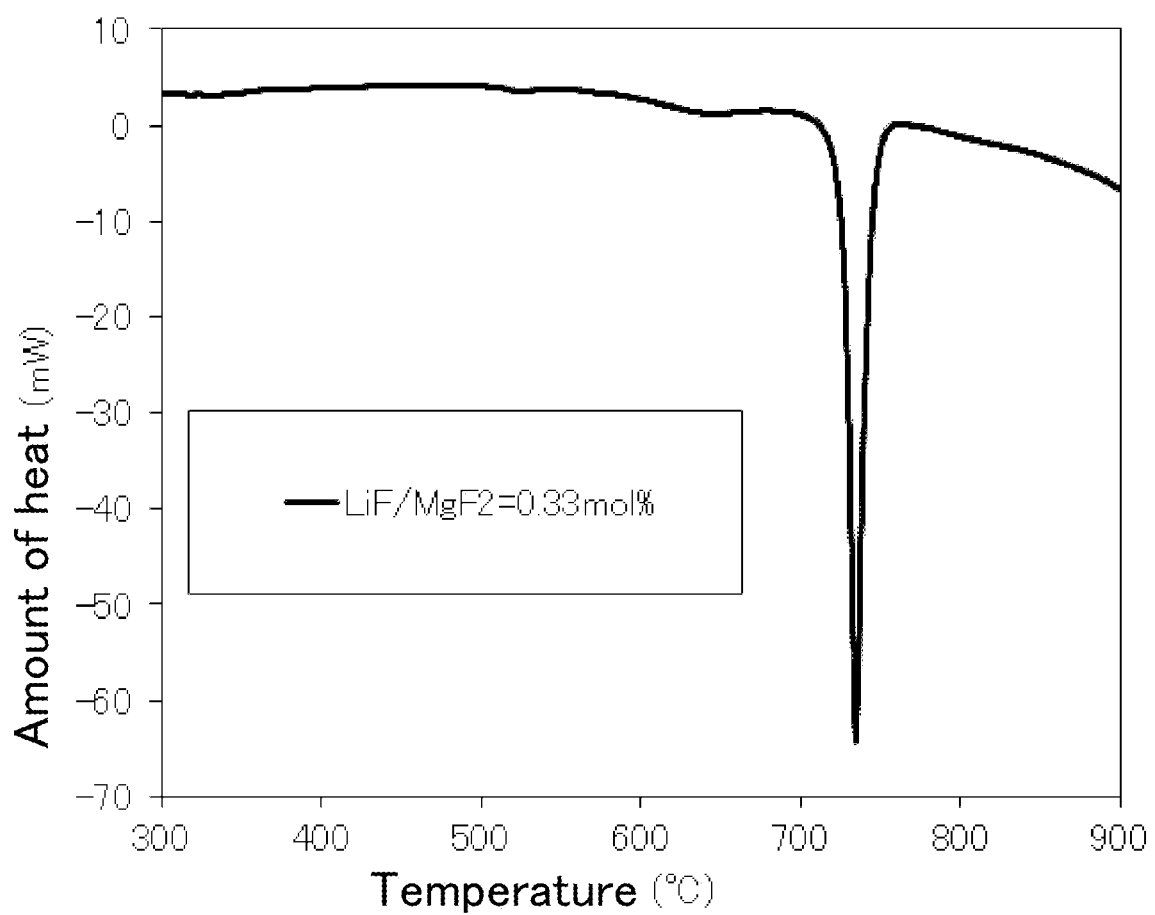
FIG. 2 is a diagram illustrating a DSC measurement result of a mixture of LiF and $MgF_2$.

FIG. 2 shows the DSC measurement result of the mixture of LiF and $MgF_2$ (LiF/$MgF_2$=0.33 mol %). As shown in FIG. 2, the endothermic peak is observed at around 735° C. Thus, the mixture of LiF and $MgF_2$ has a eutectic point of around 735° C.

In this embodiment, LiF, which is fluoride, is considered to function as flux. Thus, it is presumed that when LiF is volatilized and the amount of LiF in the mixture 903 is decreased, $MgF_2$ is less likely to be melted so that formation of $LiMO_2$ is inhibited. Therefore, heating needs to be performed while volatilization of LiF is inhibited.

Thus, when the mixture 903 is heated in an atmosphere including LiF, that is, the mixture 903 is heated in a state where the partial pressure of LiF in the heating furnace is high, volatilization of LiF in the mixture 903 can be inhibited and formation of $LiMO_2$ can progress efficiently. Accordingly, a positive electrode active material having excellent characteristics can be formed.

Here, a weight loss percentage in the case where the mixture of LiF and $MgF_2$ (LiF/$MgF_2$=0.33 mol %) is heated at a predetermined temperature can be found out by an experiment. The experiment method is as follows: the mixture of LiF and $MgF_2$ is heated to a predetermined temperature at a temperature rising rate of 200° C./h, and the predetermined temperature is held for 10 hours. After that, the temperature is lowered for longer than or equal to 10 hours. Moreover, the heating is performed while oxygen flows at a flow rate of 5.0 L/min. Table 1 shows the results of the weight loss percentage measurement. Note that the weight loss percentages (%) in Table 1 are the results calculated by the following formula: a difference in weight of the mixture between before and after the heating/weight of the mixture before the heating×100.

TABLE 1

| Heating temperature (° C.) | Weight loss percentage (%) |
| --- | --- |
| 600 | 1 |
| 700 | 2 |
| 800 | 8 |
| 900 | 26 |

As shown in Table 1, the weight loss of the mixture of LiF and $MgF_2$ is observed at least at 700° C. Thus, it is found that components of LiF and $MgF_2$ are volatilized from a reaction system at a temperature of at least 700° C. or higher.

[Annealing 1 in Atmosphere Including Fluoride]

An example of a method for performing annealing while the atmosphere in a heating furnace is made into an atmosphere including fluoride is described with reference to FIG. 3.

A heating furnace in this specification is equipment used for performing heat treatment (annealing) on a substance or a mixture and includes a heater and an inner wall that can withstand an atmosphere including fluoride and at least 600° C. Furthermore, the heating furnace may be provided with a pump having a function of reducing and/or increasing pressure in the heating furnace.

A heating furnace 100 includes a space 102 in the heating furnace, a hot plate 104, a heater 106, a heat insulator 108, a gas supply line 110, a gate valve 112, and a gas exhaust line 114. As a method for annealing the mixture 903 in an atmosphere including fluoride, a method in which a container 116 including the mixture 903 is provided in the space 102 in the heating furnace, a gas of fluoride is introduced from the gas supply line 110 into the space 102 in the heating furnace, and annealing is performed is given. In the case where fluoride having a corrosion property is used, the hot plate 104, the gas supply line 110, the gate valve 112, the gas exhaust line 114, the inner wall of the heating furnace, and the container 116 are preferably formed or processed using a material which is not damaged by fluoride and has high heat resistance. As the material, a ceramic material is given, and aluminum oxide can be used, for example. Note that in the case where LiF or the like which has low reactivity is used, another material such as a metal having high heat resistance can also be used.

In the case where a gas of fluoride is introduced, the gas is preferably introduced while the space 102 in the heating furnace is heated to a temperature higher than or equal to the freezing point or condensing point of the fluoride. In the case where the temperature in the space 102 in the heating furnace is low, the state of the introduced gas is changed to a liquid or solid state in some cases.

The valence number of Co (cobalt) in $LiMO_2$ formed by one embodiment of the present invention is preferably 3. The valence number of Co can be 2 or 3. Thus, to inhibit reduction of Co, it is preferable that the atmosphere in the space 102 in the heating furnace contain oxygen, the ratio of oxygen to nitrogen in the atmosphere in the space 102 in the heating furnace be higher than or equal to that in the air atmosphere, and the oxygen concentration in the atmosphere in the space 102 in the heating furnace be higher than or equal to that in the air atmosphere. Oxygen is preferably introduced through the gas supply line 110 in addition to fluoride. Note that although only one gas supply line is shown in FIG. 3, two or more gas supply lines may be provided. In that case, fluoride and oxygen may be introduced into the space 102 in the heating furnace through different lines.

Note that there is no particular limitation on the order of the step of providing the container 116 including the mixture 903 and the step of adjusting the atmosphere in the space 102 in the heating furnace (introducing a fluoride gas or adjusting the oxygen concentration). That is, after the container 116 including the mixture 903 is provided, the atmosphere in the space 102 in the heating furnace may be adjusted; the order may be reversed. After the container 116 is provided in the space 102 in the heating furnace and the atmosphere in the space 102 in the heating furnace is adjusted, the heating furnace 100 is heated, that is, the space 102 in the heating furnace is heated, whereby the mixture 903 can be annealed in the atmosphere including fluoride.

Alternatively, after the heating furnace 100 is heated and the atmosphere in the space 102 in the heating furnace is adjusted, the container 116 including the mixture 903 may be provided. In this case, there is no particular limitation on the order of the step of adjusting the atmosphere in the space 102 in the heating furnace and the step of heating the heating furnace 100.

Figure 3:
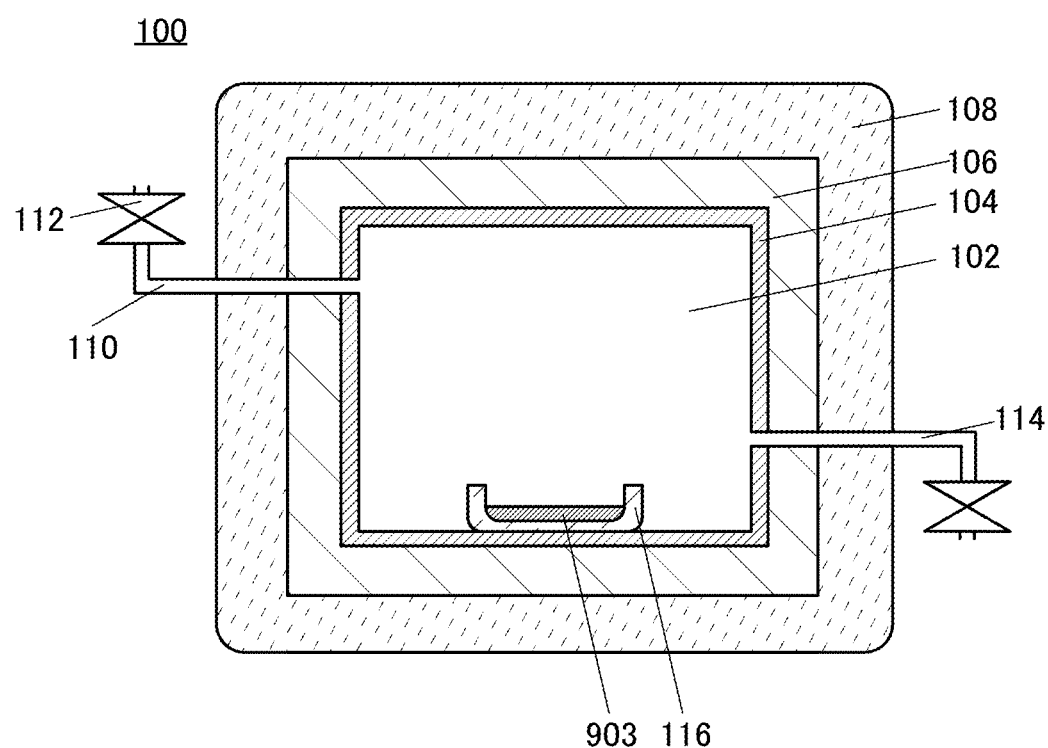
FIG. 3 is a diagram illustrating a method for forming a positive electrode active material of one embodiment of the present invention.

Although there is no particular limitation on the way of providing the mixture 903 in the container 116, as shown in FIG. 3, the mixture 903 is preferably provided so that the top surface of the mixture 903 is flat on the bottom surface of the container 116, in other words, the level of the top surface of the mixture 903 becomes uniform.

[Annealing 2 in Atmosphere Including Fluoride]

Examples of a method for performing annealing while the atmosphere in a heating furnace is made into an atmosphere including fluoride are described with reference to FIG. 4A and FIG. 4B. Note that in FIG. 4A and FIG. 4B, a portion having a function similar to that of a portion denoted by a reference numeral shown in FIG. 3 is represented by the same hatch pattern and the reference numeral is omitted in some cases. In addition, common reference numerals are used for portions having similar functions, and a detailed description thereof is omitted in some cases.

Figure 4A:
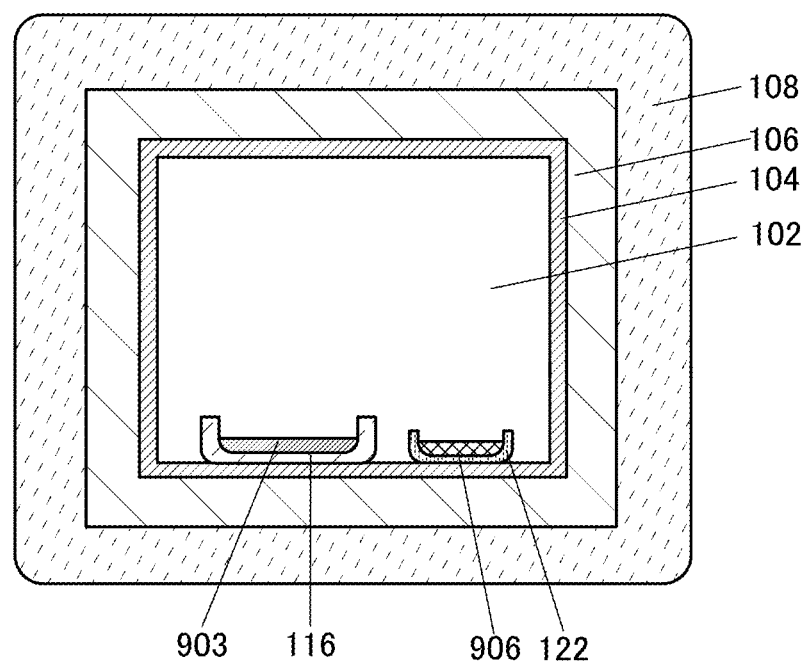
FIG. 4A and FIG. 4B are diagrams illustrating a method for forming a positive electrode active material of one embodiment of the present invention.
Figure 4B:
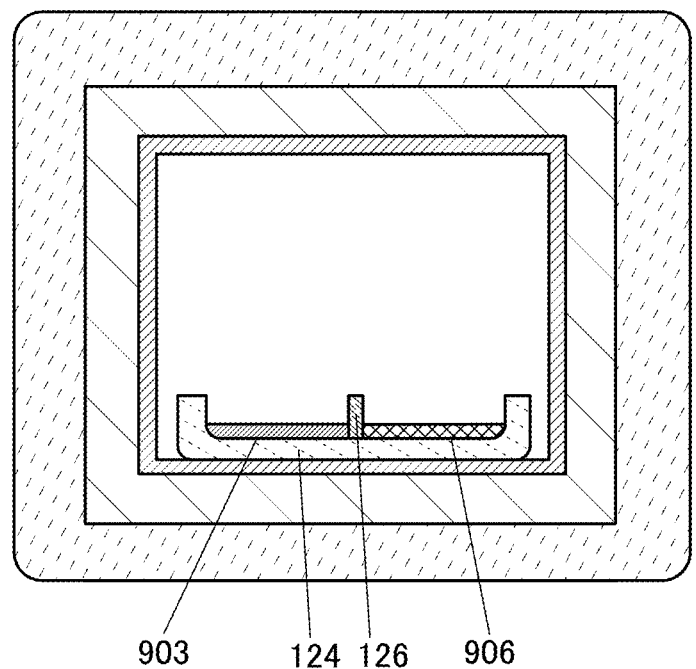

A heating furnace 120 illustrated in FIG. 4A and FIG. 4B includes the space 102 in the heating furnace, the hot plate 104, the heater 106, and the heat insulator 108. As a method for annealing the mixture 903 in an atmosphere including fluoride, a method which is shown in FIG. 4A and in which the container 116 including the mixture 903 is provided in the space 102 in the heating furnace, a container 122 including fluoride 906 that is used for the mixture 903 is provided, and the container 116 and the container 122 are heated at the same time is given. When the fluoride 906 in the container 122 is volatilized or sublimated, the atmosphere in the heating furnace can be made into an atmosphere including fluoride. Note that the fluoride 906 may be provided in the space 102 in the heating furnace without the container 122. The space 102 in the heating furnace needs to be heated to a temperature higher than or equal to a temperature at which the fluoride 906 is volatilized or sublimated so that the atmosphere in the space 102 in the heating furnace includes the fluoride 906.

Note that the fluoride used for the mixture 903 and the fluoride 906 included in the container 122 contain the same substance, and the purity may be different or the same. For example, in the case where LiF is used as the fluoride of the mixture 903, the purity of LiF used for the mixture 903 may be different from or the same as that of LiF included in the container 122. A mixture of LiF and another substance may be used as the fluoride 906 as long as reaction does not occur.

Note that there is no particular limitation on the order of providing the container 116 including the mixture 903 and the container 122 including the fluoride 906 in the heating furnace 120. After the container 116 is provided, the container 122 may be provided; the order may be reversed. Alternatively, the container 116 and the container 122 may be provided at the same time.

Moreover, as described above, to inhibit reduction of Co, annealing is preferably performed at an oxygen concentration higher than or equal to that in the atmospheric pressure. Thus, annealing is preferably performed after the oxygen concentration in the space 102 in the heating furnace is increased to higher than or equal to that in the atmospheric pressure.

Here, there is no particular limitation on the order of the step of providing the container 116 including the mixture 903 in the heating furnace 120, the step of providing the container 122 including the fluoride 906 in the heating furnace 120, and the step of adjusting the oxygen concentration in the space 102 in the heating furnace. That is, after the oxygen concentration in the space 102 in the heating furnace is adjusted, the container 116 and the container 122 may be provided in the heating furnace 120; the order may be reversed. Alternatively, after the container 116 is provided in the heating furnace 120, the oxygen concentration in the space 102 in the heating furnace may be adjusted and the container 122 may be provided in the heating furnace 120. Alternatively, after the container 122 is provided in the heating furnace 120, the oxygen concentration in the space 102 in the heating furnace may be adjusted and the container 116 may be provided in the heating furnace 120. Heating the heating furnace 120 after these steps enables annealing of the mixture 903 in an atmosphere including fluoride. Note that among these steps, the step of heating the heating furnace 120 is preferably performed last. When the heating is performed last, the fluoride 906 and the mixture 903 can be inhibited from being heated rapidly; thus, uniform chemical reaction or state change can occur and an undesirable phenomenon such as bumping can be inhibited.

Alternatively, after the step of heating the heating furnace 120, the step of adjusting the oxygen concentration in the space 102 in the heating furnace, and the step of providing the container 122 including the fluoride 906 in the heating furnace 120 are performed, the container 116 including the mixture 903 may be provided in the heating furnace 120. When the container 122 is heated at a temperature higher than or equal to a temperature at which the fluoride 906 is volatilized or a sublimation point, the atmosphere in the space 102 in the heating furnace can be an atmosphere including the fluoride 906. Thus, when the container 116 including the mixture 903 is provided in the heating furnace 120 after the step of adjusting the atmosphere in the space 102 in the heating furnace (making the atmosphere include the fluoride 906 and have adjusted oxygen concentration) is performed, the mixture 903 can be annealed in the atmosphere including fluoride.

In the case where the container 116 including the mixture 903 is provided in the heating furnace 120 after the step of adjusting the atmosphere in the space 102 in the heating furnace is performed, there is no particular limitation on the order of the step of heating the heating furnace 120, the step of adjusting the oxygen concentration in the space 102 in the heating furnace, and the step of providing the container 122 including the fluoride 906 in the heating furnace 120. For example, after the heating furnace 120 is heated, the oxygen concentration in the space 102 in the heating furnace may be adjusted and the container 122 may be provided in the heating furnace 120, or after the container 122 is provided in the heating furnace 120, the oxygen concentration in the space 102 in the heating furnace may be adjusted and the heating may be performed.

As shown in FIG. 4B, the mixture 903 may be provided in one space of a container 124 provided with a divider 126, and the fluoride 906 may be provided in the other space. With the structure, the mixture 903 and the fluoride 906 can be provided in the heating furnace 120 at the same time. Furthermore, with the structure, the atmosphere in the space 102 in the heating furnace can include fluoride without mixing of the mixture 903 and the fluoride 906 when they are melted.

Note that as described above, the fluoride used for the mixture 903 and the fluoride 906 contain the same substance, and the purity may be different or the same. For example, in the case where LiF is used as the fluoride of the mixture 903, the purity of LiF used for the mixture 903 may be different from or the same as that of LiF used as the fluoride 906.

The annealing is preferably performed at an appropriate temperature for an appropriate time. The appropriate temperature and time depend on the conditions such as the particle size and the composition of the composite oxide containing lithium, the transition metal, and oxygen in Step S25. In the case where the particle size is small, the annealing is preferably performed at a lower temperature or for a shorter time than the case where the particle size is large, in some cases.

For example, in the case where the average particle diameter (D50) of particles in Step S25 is approximately 12 μm, the annealing time is preferably 3 hours or longer, further preferably 10 hours or longer.

In contrast, in the case where the average particle diameter (D50) of particles in Step S25 is approximately 5 μm, the annealing time is preferably longer than or equal to 1 hour and shorter than or equal to 10 hours, further preferably approximately 2 hours, for example.

The temperature decreasing time after the annealing is, for example, preferably longer than or equal to 10 hours and shorter than or equal to 50 hours.

The materials annealed in the above manner are collected (Step S35 in FIG. 1), whereby a positive electrode active material 904 is obtained (Step S36 in FIG. 1).

FIG. 5 illustrates examples of a heating furnace. Note that in FIG. 5, a portion having a function similar to that of a portion denoted by a reference numeral in FIG. 3 is represented by the same hatch pattern and a reference numeral is omitted in some cases. In addition, common reference numerals are used for portions having similar functions, and a detailed description thereof is omitted in some cases.

<Structure of Heating Furnace>

There is no particular limitation on the heating furnace used for one embodiment of the present invention, and a variety of heating furnaces such as a batch-type or sequential heating furnace can be used. Examples thereof are illustrated in FIG. 5A and FIG. 5B.

Figure 5A:
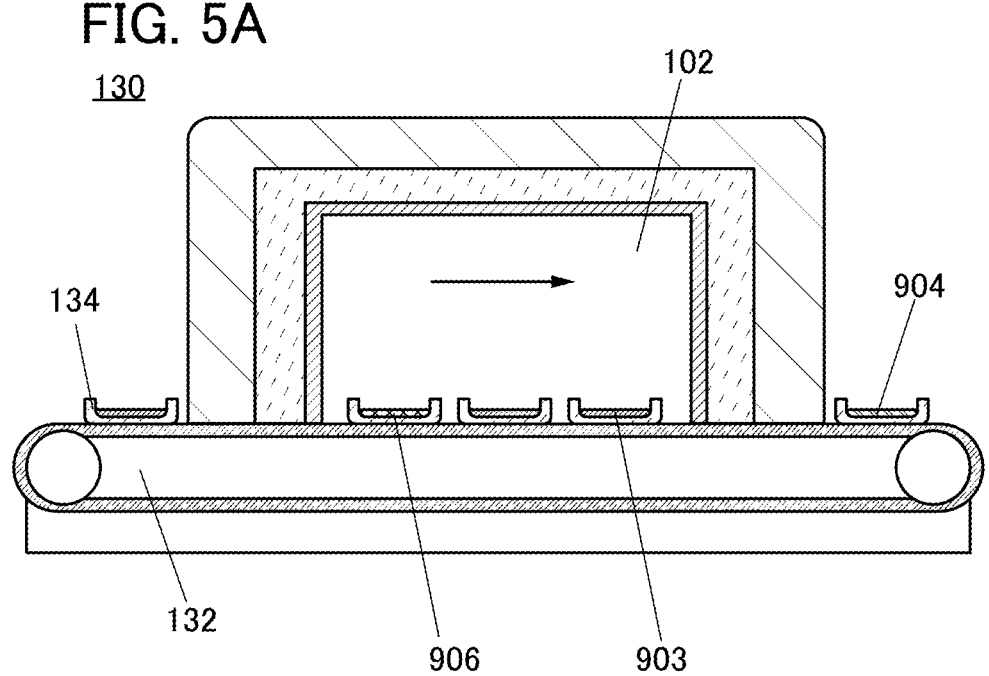
FIG. 5A and FIG. 5B are diagrams illustrating a method for forming a positive electrode active material of one embodiment of the present invention.

A heating furnace 130 illustrated in FIG. 5A is an example of a sequential heating furnace. The heating furnace 130 includes a conveyor belt 132. Containers 134 including the mixture 903 are provided over the conveyor belt 132, and processing is performed in the heating furnace 130, so that the annealing can be performed sequentially. Adjusting the moving speed of the conveyor belt enables adjustment of the annealing time. Furthermore, when the fluoride 906 is provided in one of the containers 134 and is annealed at the same time as the mixture 903, the atmosphere in the space 102 in the heating furnace can include fluoride. The mixture 903 is annealed in the heating furnace 130, so that the positive electrode active material 904 can be obtained.

Figure 5B:
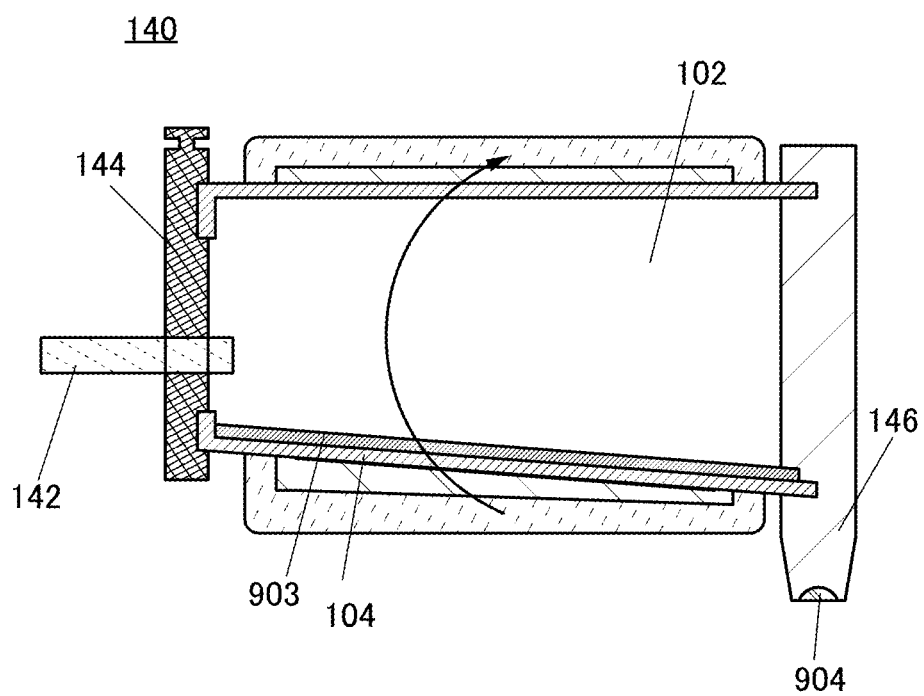

A heating furnace 140 illustrated in FIG. 5B is an example of a rotational heating furnace. The heating furnace 140 includes a material input port 142, an atmosphere control portion 144, and a collecting portion 146. The mixture 903 is input from the material input port 142 to the space 102 in the heating furnace. The hot plate 104 includes a rotating mechanism, and the hot plate 104 is tilted to the collecting portion 146. With the structure, the annealing can be performed with the mixture 903 flowing. Adjustment of the tilt or rotating speed of the hot plate 104 enables adjustment of the annealing time. The annealed mixture 903 is collected in the collecting portion 146, whereby the positive electrode active material 904 can be obtained.

With the atmosphere control portion 144, the atmosphere in the space 102 in the heating furnace can be an atmosphere including fluoride. As a method for making the atmosphere include fluoride, as described above, a method for introducing a fluoride gas and a method for sublimating or volatilizing fluoride can be given.

Embodiment 2

An example of a method for forming $LiMO_2$ is described. A forming method in the case where a plurality of metal elements are further used as the metal element contained in $LiMO_2$ other than Co is described below with reference to FIG. 6.

<<Forming Method 2 of Positive Electrode Active Material>>

Figure 6:
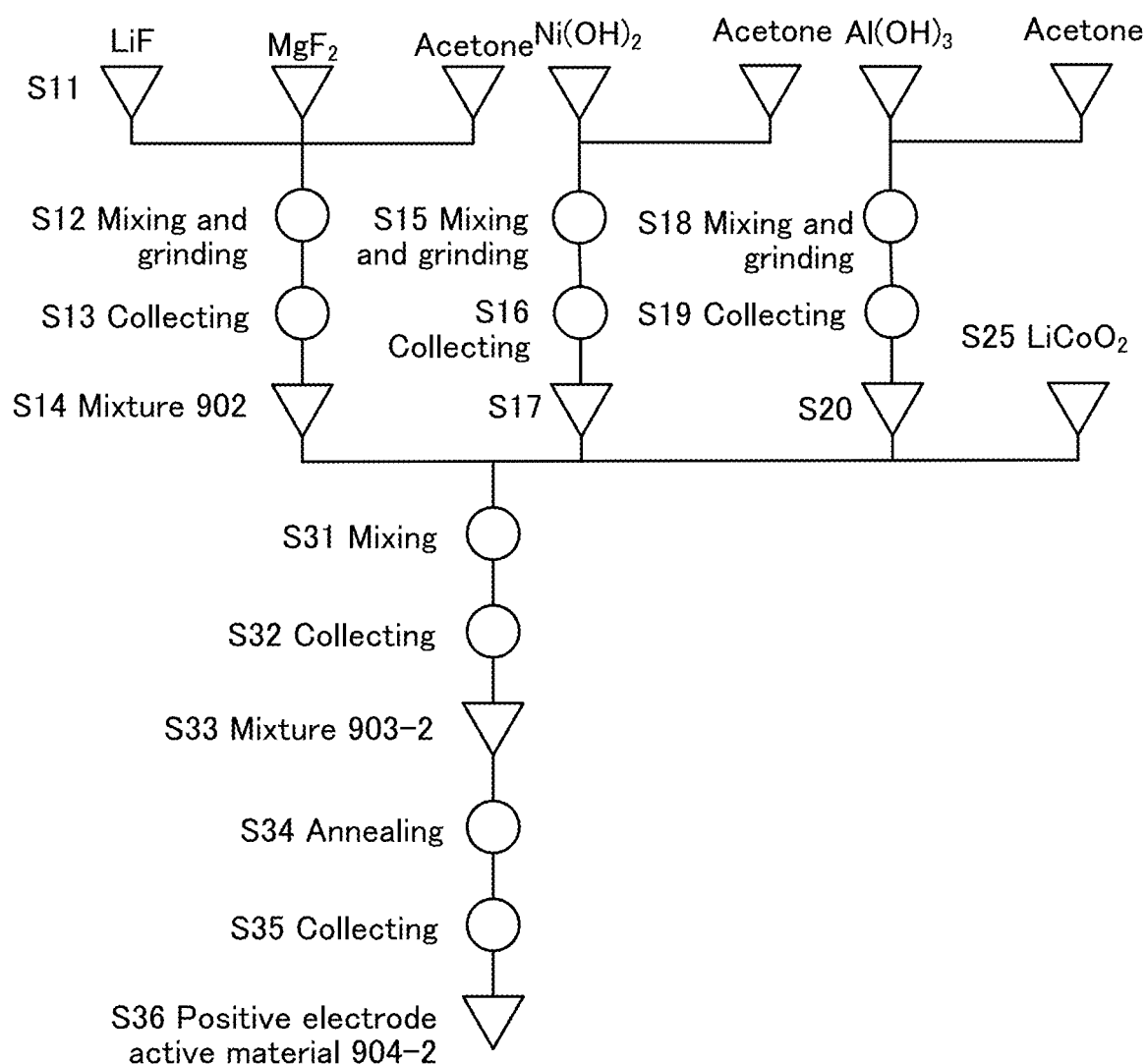
FIG. 6 is a diagram illustrating an example of a method for forming a positive electrode active material.

FIG. 6 illustrates an example of forming steps of a composite oxide $LiMO_2$ containing Mg, Ni, and Al other than Co. This forming method is as follows: metal element sources other than Li and Co are separately mixed and subjected to grinding treatment, and after that, each metal element source subjected to the grinding treatment is mixed with lithium cobalt oxide and annealed. S11 to S36 are similar to the steps described in Embodiment 1 and FIG. 1. That is, a mixture 903-2 is preferably annealed in an atmosphere including LiF in Step S34. Through the forming steps illustrated in FIG. 6, a positive electrode active material 904-2 can be obtained.

<Step S15, Step S16, and Step S17>

Nickel hydroxide ($Ni(OH)_2$) that is pulverized to be mixed in Step S31 is prepared. On the pulverized nickel hydroxide, Step S15 for mixing nickel hydroxide and acetone and Step S16 for collecting the mixture are performed in advance. Through Step S16, the pulverized nickel hydroxide is obtained (Step S17).

<Step S18, Step S19, and Step S20>

Aluminum hydroxide ($Al(OH)_3$) that is pulverized to be mixed in Step S31 is prepared. On the pulverized aluminum hydroxide, Step S18 for mixing aluminum hydroxide and acetone and Step S19 for collecting the mixture are performed in advance. Through Step S19, the pulverized aluminum hydroxide is obtained (Step S20).

Although nickel hydroxide is used as the nickel (Ni) source and aluminum hydroxide is used as the aluminum (Al) source in Step S15 to S20 described above, the nickel source and the aluminum source are not limited to them. An oxide or a halide containing each element can also be used.

<<Forming Method 3 of Positive Electrode Active Material>>

Figure 7:
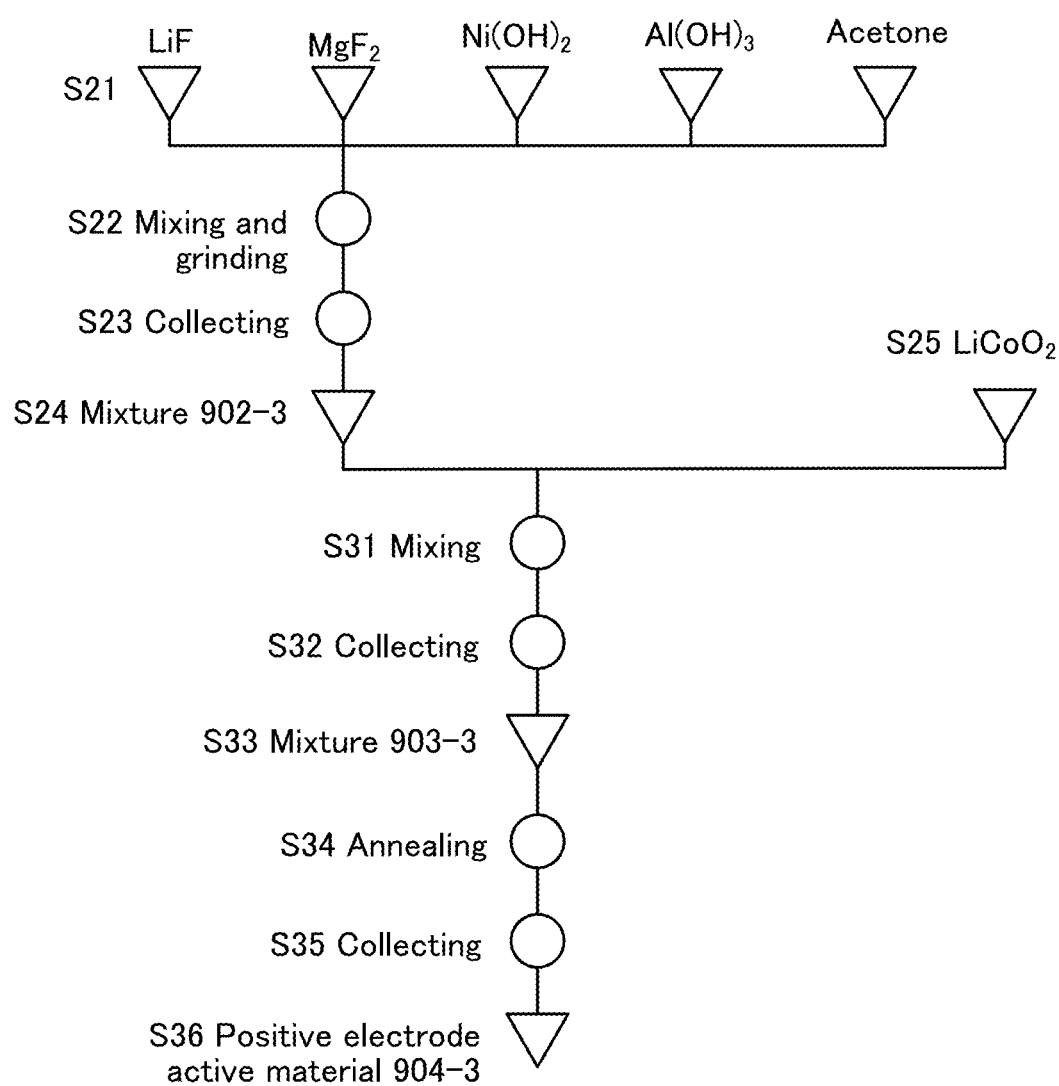
FIG. 7 is a diagram illustrating an example of a method for forming a positive electrode active material.

FIG. 7 illustrates an example of steps of forming a composite oxide $LiMO_2$ containing Mg, Ni, and Al other than Co. This forming method is as follows: metal element sources other than Li and Co are mixed at the same time and subjected to grinding treatment, and after that, the mixture is mixed with lithium cobalt oxide and annealed. S31 to S35 are similar to the steps described in Embodiment 1 and FIG. 1. That is, a mixture 903-3 is preferably annealed in an atmosphere including LiF in Step S34. Through the forming steps illustrated in FIG. 7, a positive electrode active material 904-3 can be obtained.

<Step S22 to Step S24>

As in Step S15 to Step S17 and Step S18 to Step S20 described above, $MgF_2$, $Ni(OH)_2$, and $Al(OH)_3$ which are pulverized are prepared. On the pulverized aluminum hydroxide, Step S22 for mixing aluminum hydroxide and acetone and Step S23 for collecting the mixture are performed in advance. Through Step S22, a pulverized mixture 902-3 is obtained (Step S24).

<<Forming Method 4 of Positive Electrode Active Material>>

Figure 8:
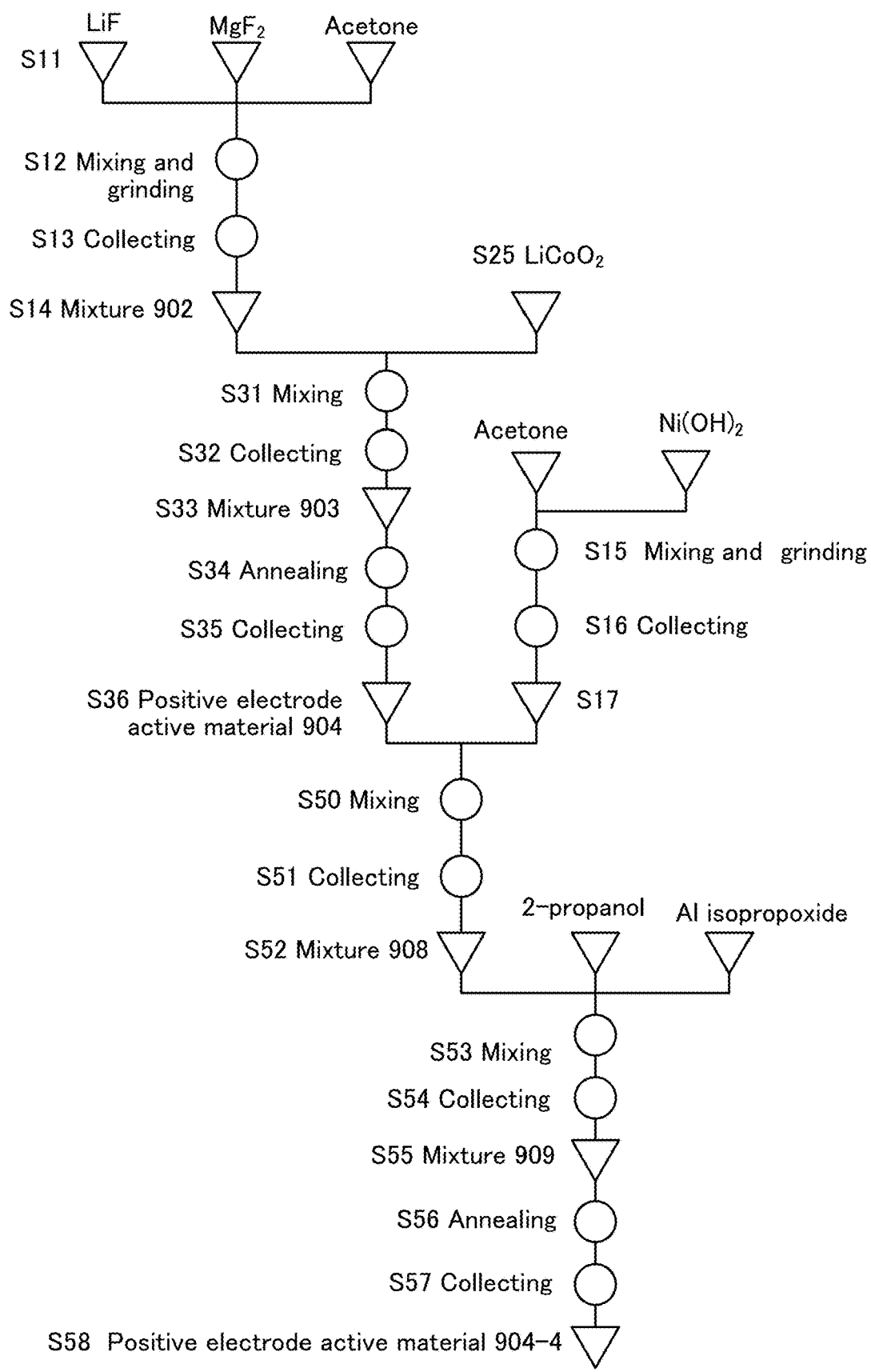
FIG. 8 is a diagram illustrating an example of a method for forming a positive electrode active material.

FIG. 8 illustrates an example of steps of forming a composite oxide $LiMO_2$ containing Mg, Ni, and Al other than Co. This forming method is as follows: a composite oxide which contains Mg and is expressed by $LiMO_2$ is formed, and then a Ni source and an Al source are added, so that a composite oxide containing Mg, Ni, and Al is formed. S11 to S14 and S31 to S36 are similar to the steps described in Embodiment 1 and FIG. 1. That is, the mixture 903 is preferably annealed in an atmosphere including LiF in Step S34. Step S15 to Step S17 are similar to the steps described with reference to FIG. 6. Through the forming steps illustrated in FIG. 8, a positive electrode active material 904-4 can be obtained.

Next, as shown in Step S50, the positive electrode active material 904 and pulverized nickel hydroxide are mixed. Then, the mixed materials are collected (Step S51). For the pulverized nickel hydroxide, Step S15 for mixing nickel hydroxide and acetone and Step S16 for collecting the mixture are performed in advance. Through Step S16, the pulverized nickel hydroxide is obtained (Step S17).

The materials mixed in Step S50 are collected in Step S51, whereby a mixture 908 is obtained (Step S52 in FIG. 8).

Next, through Step S53 to Step S55, Al is added. For the addition of Al, a liquid phase method such as a sol-gel method, a solid phase method, a sputtering method, an evaporation method, a CVD (chemical vapor deposition) method, a PLD (pulsed laser deposition) method, and the like can be used.

As shown in FIG. 8, a metal source is first prepared in Step S52. In the case of employing a sol-gel method, a solvent used for the sol-gel method is prepared. As the Al source, Al alkoxide, Al hydroxide, Al oxide, or the like can be used. The concentration of aluminum in the metal source is 0.001 times or more and 0.02 times or less as high as that of cobalt with the number of cobalt atoms in the lithium cobalt oxide regarded as 1.

Here, an example of employing a sol-gel method using aluminum isopropoxide as the metal source and 2-propanol as the solvent is shown.

Next, aluminum alkoxide is dissolved in 2-propanol, and furthermore, a mixture 905 is mixed (Step S53 in FIG. 8).

The necessary amount of metal alkoxide depends on the particle size of lithium cobalt oxide. For example, when aluminum isopropoxide is used and the particle diameter (D50) of the lithium cobalt oxide is approximately 20 μm, the aluminum isopropoxide is preferably added so that the concentration of aluminum in the aluminum isopropoxide is 0.001 times or more and 0.02 times or less as high as that of cobalt with the number of cobalt atoms in the lithium cobalt oxide regarded as 1.

Next, a mixed solution of the alcohol solution of metal alkoxide and the lithium cobalt oxide particles is stirred under an atmosphere including moisture. The stirring can be performed with a magnetic stirrer, for example. The stirring time is not limited as long as water and metal alkoxide in the atmosphere cause hydrolysis and polycondensation reaction. For example, the stirring can be performed at 25° C. and a humidity of 90% RH (Relative Humidity) for 4 hours. Alternatively, the stirring may be performed under an atmosphere where the humidity and temperature are not adjusted, for example, an air atmosphere in a fume hood. In such a case, the stirring time is preferably set longer and can be 12 hours or longer at room temperature, for example.

Reaction between moisture and metal alkoxide in the atmosphere enables a sol-gel reaction to proceed more slowly as compared with the case where liquid water is added. Alternatively, reaction between metal alkoxide and water at room temperature enables a sol-gel reaction to proceed more slowly as compared with the case where heating is performed at a temperature higher than the boiling point of alcohol serving as a solvent, for example. A sol-gel reaction that proceeds slowly enables formation of a high-quality coating layer with a uniform thickness.

After the above process, the precipitate is collected from the mixed solution (Step S54 in FIG. 8). As the collection method, filtration, centrifugation, evaporation to dryness, and the like can be used. The precipitate can be washed with alcohol that is the same as the solvent in which metal alkoxide is dissolved. Note that in the case of employing evaporation to dryness, the solvent and the precipitate are not necessarily separated in this step; for example, the precipitate is collected in the subsequent drying step (Step S54).

Next, the collected residue is dried, so that a mixture 909 is obtained (Step S55 in FIG. 8). In the drying step, vacuum or ventilation drying can be performed at 80° C. for longer than or equal to 1 hour and shorter than or equal to 4 hours, for example.

Then, the obtained mixture is heated (Step S56 in FIG. 8).

As for the heating time, the time for keeping the heating temperature within a predetermined range is preferably longer than or equal to 1 hour and shorter than or equal to 80 hours.

The heating temperature is lower than 1000° C., preferably higher than or equal to 700° C. and lower than or equal to 950° C., further preferably approximately 850° C.

The heating is preferably performed in an oxygen-containing atmosphere.

In this embodiment, the heating temperature is 850° C. and kept for 2 hours, the temperature rising rate is 200° C./h, and the flow rate of oxygen is 10 L/min.

The heating temperature in Step S56 is preferably lower than the heating temperature in Step S34.

<Step S57 and Step S58>

Next, cooled particles are collected (Step S57 in FIG. 8). Moreover, the particles are preferably made to pass through a sieve. Through the above steps, the positive electrode active material 904-4 can be formed (Step S58 in FIG. 8).

Embodiment 3

In this embodiment, an example of a structure of a positive electrode active material formed by the forming method of one embodiment of the present invention is described.

[Structure of Positive Electrode Active Material]

A material with a layered rock-salt crystal structure, such as lithium cobalt oxide ($LiCoO_2$), is known to have a high discharge capacity and excel as a positive electrode active material of a secondary battery. As an example of the material with a layered rock-salt crystal structure, a composite oxide represented by $LiMO_2$ is given. As an example of the element M, one or more elements selected from Co and Ni can be given. As another example of the element M, in addition to one or more elements selected from Co and Ni, one or more elements selected from Al and Mg can be given.

It is known that the Jahn-Teller effect in a transition metal compound varies in degree according to the number of electrons in the d orbital of the transition metal.

In a compound containing nickel, distortion is likely to be caused because of the Jahn-Teller effect in some cases. Accordingly, when high-voltage charge and discharge are performed on $LiNiO_2$, the crystal structure might be disordered because of the distortion. The influence of the Jahn-Teller effect is suggested to be small in $LiCoO_2$; hence, $LiCoO_2$ is preferable because the resistance to high-voltage charge and discharge is higher in some cases.

Figure 9:
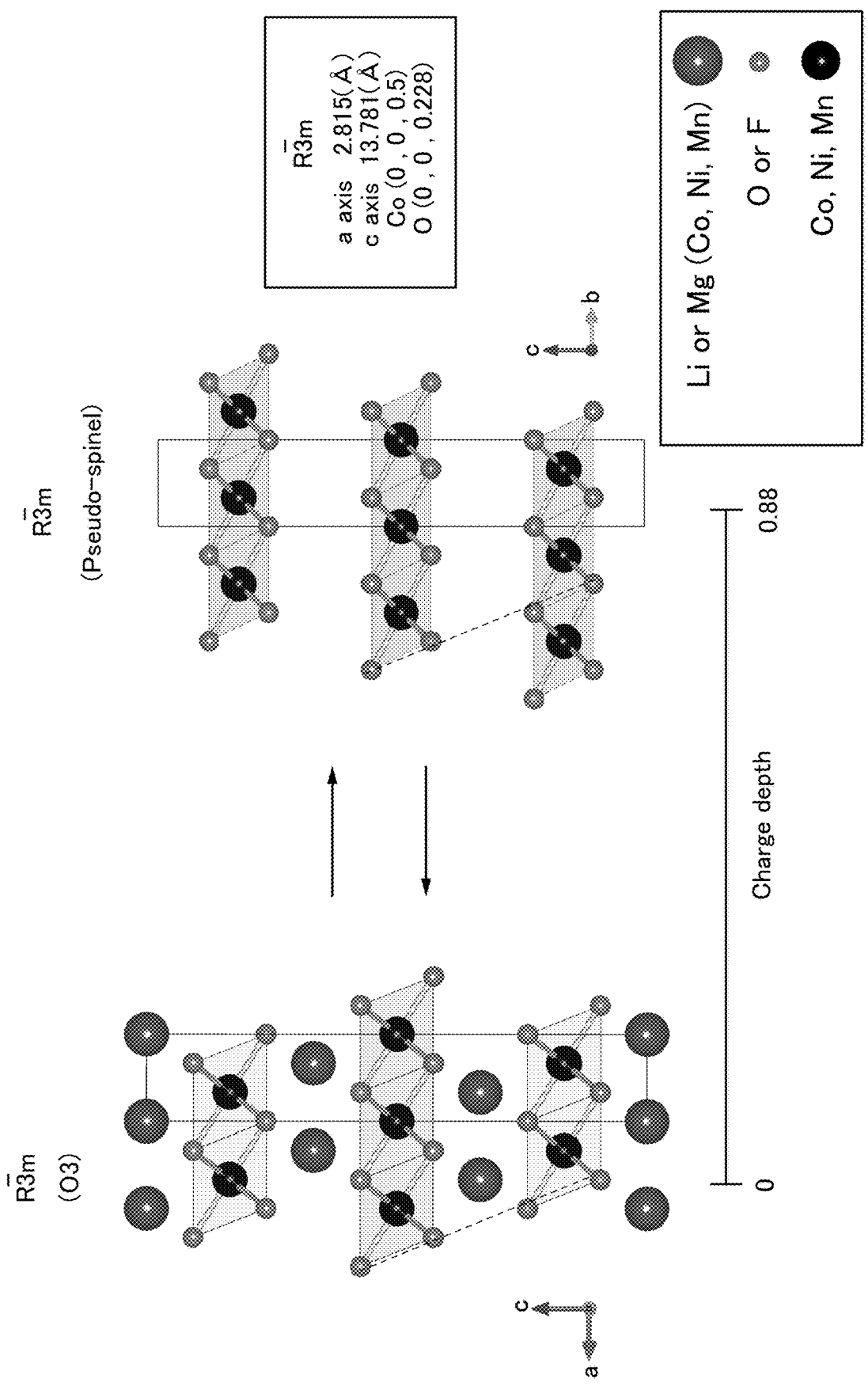
FIG. 9 is a diagram illustrating crystal structures and magnetism of a positive electrode active material.
Figure 10:
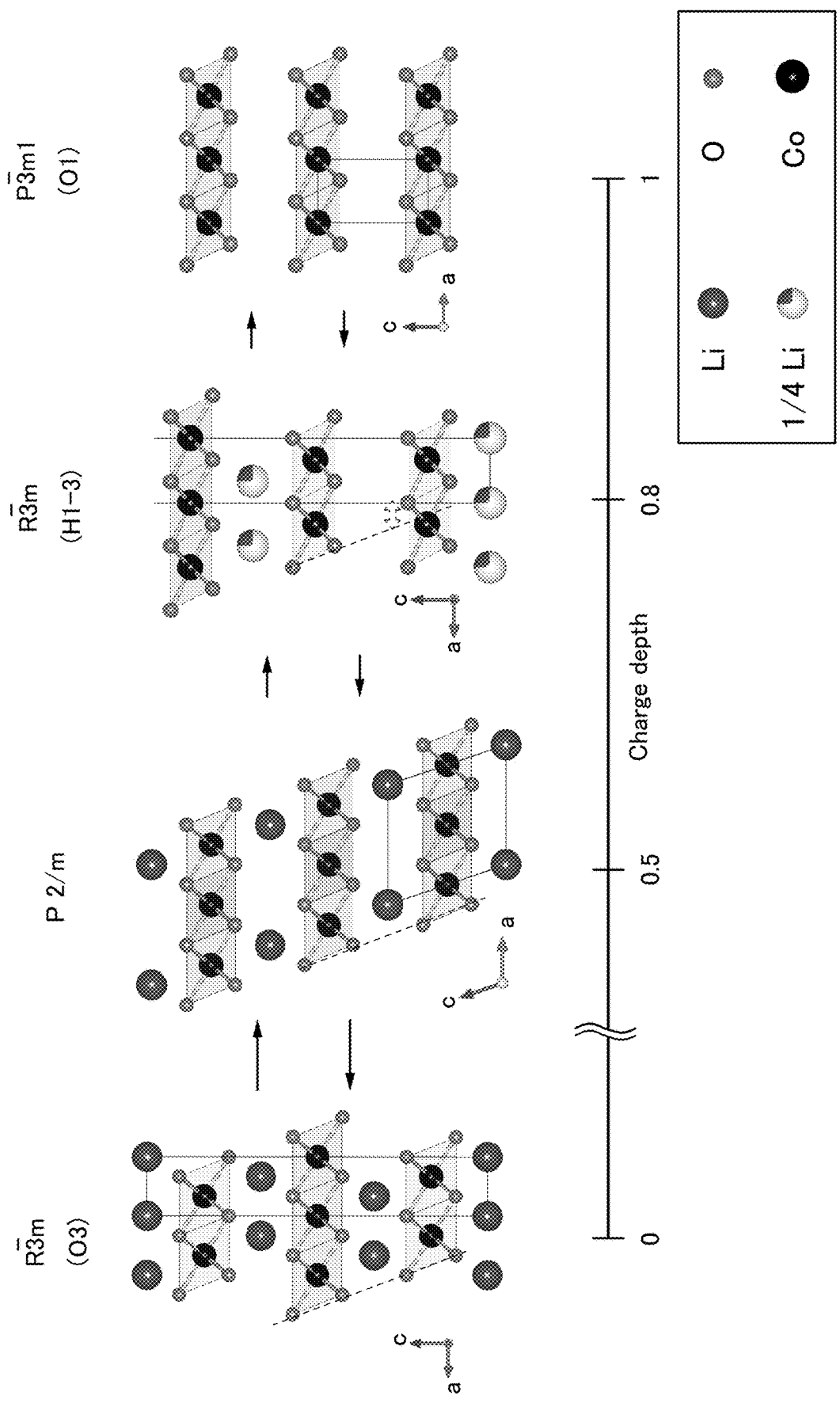
FIG. 10 is a diagram illustrating crystal structures and magnetism of a positive electrode active material of a conventional example.

Positive electrode active materials are described with reference to FIG. 9 and FIG. 10. In FIG. 9 and FIG. 10, the case where cobalt is used as a transition metal contained in the positive electrode active material is described.

In the positive electrode active material formed by one embodiment of the present invention, the difference in the positions of $CoO_2$ layers can be small in repeated charge and discharge at high voltage. Furthermore, the change in the volume can be small. Thus, the compound can have excellent cycle performance. In addition, the compound can have a stable crystal structure in a high-voltage charged state. Thus, in the compound, a short circuit is less likely to occur while the high-voltage charged state is maintained. This is preferable because the safety is further improved. In particular, a compound represented by a chemical formula $Li_{(1-x-y)}Co_{(1-a-b)}Ni_{(x+a)}Mg_{(y+b)}O_2$ have excellent characteristics when $0<x+a\leq0.015$ and $0<y+b\leq0.06$.

The compound has a small change in the crystal structure and a small difference in volume per the same number of transition metal atoms between a sufficiently discharged state and a high-voltage charged state.

FIG. 9 illustrates the crystal structures of the positive electrode active material 904 before and after being charged and discharged. The positive electrode active material 904 is a composite oxide containing lithium, cobalt, and oxygen. In addition to the above, the positive electrode active material 904 preferably contains magnesium. Furthermore, the positive electrode active material 904 preferably contains halogen such as fluorine or chlorine. The positive electrode active material 904 preferably contains aluminum and nickel.

The crystal structure with a charge depth of 0 (the discharged state) in FIG. 9 is R-3m (O3), which is the same as that in FIG. 10. Meanwhile, the positive electrode active material 904 with a charge depth in a sufficiently charged state includes a crystal whose structure is different from the H1-3 type structure. This structure belongs to the space group R-3m, and is not a spinel crystal structure but a structure in which an ion of cobalt, magnesium, or the like is coordinated to six oxygen atoms and the cation arrangement has symmetry similar to that of the spinel crystal structure. This structure is thus referred to as the pseudo-spinel crystal structure in this specification and the like. Note that although the indication of lithium is omitted in the diagram of the pseudo-spinel crystal structure shown in FIG. 9 to explain the symmetry of cobalt atoms and the symmetry of oxygen atoms, a lithium of 20 atomic % or less, for example, with respect to cobalt practically exists between the $CoO_2$ layers. In addition, in both the O3-type crystal structure and the pseudo-spinel crystal structure, a slight amount of magnesium preferably exists between the $CoO_2$ layers, i.e., in lithium sites. In addition, a slight amount of halogen such as fluorine may exist in oxygen sites at random.

Note that in the pseudo-spinel crystal structure, oxygen is tetracoordinated to a light element such as lithium in some cases. Also in that case, the ion arrangement has symmetry similar to that of the spinel crystal structure.

The pseudo-spinel crystal structure can also be regarded as a crystal structure that contains Li between layers at random but is similar to a $CdCl_2$ type crystal structure. The crystal structure similar to the $CdCl_2$ type crystal structure is close to a crystal structure of lithium nickel oxide when charged up to a charge depth of 0.94 ($Li_{0.06}NiO_2$); however, pure lithium cobalt oxide or a layered rock-salt positive electrode active material containing a large amount of cobalt is known not to have this crystal structure generally.

Anions of a layered rock-salt crystal and anions of a rock-salt crystal have cubic closest packed structures (facecentered cubic lattice structures). Anions of a pseudo-spinel crystal are also presumed to have cubic closest packed structures. When the pseudo-spinel crystal is in contact with the layered rock-salt crystal and the rock-salt crystal, there is a crystal plane at which orientations of cubic closest packed structures composed of anions are aligned. Note that a space group of the layered rock-salt crystal and the pseudo-spinel crystal is R-3m, which is different from a space group Fm-3m of a rock-salt crystal (a space group of a general rock-salt crystal) and a space group Fd-3m of a rock-salt crystal (a space group of a rock-salt crystal having the simplest symmetry); thus, the Miller index of the crystal plane satisfying the above conditions in the layered rock-salt crystal and the pseudo-spinel crystal is different from that in the rock-salt crystal. In this specification, a state where the orientations of the cubic closest packed structures composed of anions in the layered rock-salt crystal, the pseudo-spinel crystal, and the rock-salt crystal are aligned is referred to as a state where crystal orientations are substantially aligned in some cases.

In the positive electrode active material 904, a change in the crystal structure when the positive electrode active material 904 is charged with high voltage and a large amount of lithium is extracted is inhibited as compared with a positive electrode active material 100C described later. As indicated by the dotted lines in FIG. 9, for example, there is a very little deviation in the $CoO_2$ layers between the crystal structures.

More specifically, the structure of the positive electrode active material 904 is highly stable even when a charge voltage is high. For example, at a charge voltage that makes the positive electrode active material 100C have the H1-3 type crystal structure, for example, at a voltage of approximately 4.6 V with reference to the potential of a lithium metal, a charge voltage region where the R-3m (O3) crystal structure can be maintained exists. Moreover, in a higher charge voltage region, for example, at voltages of approximately 4.65 V to 4.7 V with reference to the potential of a lithium metal, the pseudo-spinel crystal structure can be obtained. At a much higher charge voltage, the H1-3 type structure is eventually observed in some cases. In the case where graphite, for instance, is used as a negative electrode active material in a secondary battery, when the voltage of the secondary battery is higher than or equal to 4.3 V and lower than or equal to 4.5 V, for example, a charge voltage region where the R-3m (O3) crystal structure can be maintained exists. In a higher charge voltage region, for example, at a voltage higher than or equal to 4.35 V and lower than or equal to 4.55 V with reference to the potential of a lithium metal, the pseudo-spinel crystal structure can be obtained.

Thus, in the positive electrode active material 904, the crystal structure is less likely to be disordered even when charge and discharge are repeated at high voltage.

Note that in the unit cell of the pseudo-spinel crystal structure, coordinates of cobalt and oxygen can be represented by Co (0, 0, 0.5) and 0 (0, 0, x) within the range of $0.20 \leq x \leq 0.25$.

A slight amount of magnesium existing between the $CoO_2$ layers, i.e., in lithium sites at random, has an effect of inhibiting a deviation in the $CoO_2$ layers. Thus, the existence of magnesium between the $CoO_2$ layers makes it easier to obtain the pseudo-spinel crystal structure. Therefore, magnesium is preferably distributed over whole particles of a positive electrode active material 100A-1. In addition, to distribute magnesium over whole particles, heat treatment is preferably performed in the forming process of the positive electrode active material 100A-1.

However, cation mixing occurs when the heat treatment temperature is excessively high, so that magnesium is highly likely to enter the cobalt sites. Magnesium in the cobalt sites eliminates the effect of maintaining the R-3m structure. Furthermore, when the heat treatment temperature is excessively high, adverse effects such as reduction of cobalt to have a valence of two and transpiration of lithium are concerned.

In view of the above, a halogen compound such as a fluorine compound is preferably added to lithium cobalt oxide before the heat treatment for distributing magnesium over whole particles. The addition of the halogen compound decreases the melting point of lithium cobalt oxide. The decrease in the melting point makes it easier to distribute magnesium over whole particles at a temperature at which the cation mixing is unlikely to occur. Furthermore, the existence of the fluorine compound expects to improve corrosion resistance to hydrofluoric acid generated by decomposition of an electrolyte solution.

When the magnesium concentration is higher than a predetermined value, the effect of stabilizing a crystal structure becomes small in some cases. This is probably because magnesium enters the cobalt sites in addition to the lithium sites. The number of magnesium atoms in the positive electrode active material formed by one embodiment of the present invention is preferably 0.001 times or more and 0.1 times or less, further preferably more than 0.01 times and less than 0.04 times, still further preferably approximately 0.02 as large as the number of cobalt atoms. The magnesium concentration described here may be a value obtained by element analysis on the entire particles of the positive electrode active material using ICP-MS or the like, or may be a value based on the ratio of the raw materials mixed in the forming process of the positive electrode active material, for example.

The number of nickel atoms in the positive electrode active material 904 is preferably 7.5% or lower, preferably 0.05% or higher and 4% or lower, further preferably 0.1% or higher and 2% or lower of the number of cobalt atoms. The nickel concentration described here may be a value obtained by element analysis on the entire particle of the positive electrode active material using ICP-MS or the like, or may be a value based on the ratio of the raw materials mixed in the forming process of the positive electrode active material, for example.

<<Particle Size>>

A too large particle size of the positive electrode active material 904 causes problems such as difficulty in lithium diffusion and too much surface roughness of an active material layer in coating to a current collector. By contrast, a too small particle size causes problems such as difficulty in carrying the active material layer in coating to the current collector and overreaction with an electrolyte solution. Therefore, an average particle diameter (D50, also referred to as median diameter) is preferably more than or equal to 1 μm and less than or equal to 100 μm, further preferably more than or equal to 2 μm and less than or equal to 40 μm, still further preferably more than or equal to 5 μm and less than or equal to 30 μm.

<Analysis Method>

Whether or not a positive electrode active material has the pseudo-spinel crystal structure when charged with high voltage can be determined by analyzing a high-voltage charged positive electrode using XRD, electron diffraction, neutron diffraction, electron spin resonance (ESR), nuclear magnetic resonance (NMR), or the like. The XRD is particularly preferable because the symmetry of a transition metal such as cobalt contained in the positive electrode active material can be analyzed with high resolution, the degrees of crystallinity and the crystal orientations can be compared, the distortion of lattice periodicity and the crystallite size can be analyzed, and a positive electrode obtained by disassembling a secondary battery can be measured without any change with sufficient accuracy, for example.

As described so far, the positive electrode active material 904 has a feature of a small change in the crystal structure between the high-voltage charged state and the discharged state. A material where 50 wt % or more of the crystal structure largely changes between the high-voltage charged state and the discharged state is not preferable because the material cannot withstand the high-voltage charge and discharge. In addition, it should be noted that an objective crystal structure is not obtained in some cases only by addition of impurity elements. For example, although the positive electrode active material that is lithium cobalt oxide containing magnesium and fluorine is a commonality, the positive electrode active material has 60 wt % or more of the pseudo-spinel crystal structure in some cases, and has 50 wt % or more of the H1-3 type crystal structure in other cases, when charged with high voltage. Furthermore, at a predetermined voltage, the positive electrode active material has almost 100 wt % of the pseudo-spinel crystal structure, and with an increase in the predetermined voltage, the H1-3 type crystal structure is generated in some cases. Thus, the crystal structure of the positive electrode active material 904 is preferably analyzed by XRD or the like.

Note that a positive electrode active material in the high-voltage charged state or the discharged state sometimes causes a change in the crystal structure when exposed to air. For example, the pseudo-spinel crystal structure changes into the H1-3 type crystal structure in some cases. Thus, all samples are preferably handled in an inert atmosphere such as an atmosphere including argon.

<Positive Electrode Active Material 100C of Comparative Example>

The positive electrode active material 100C shown in FIG. 10 is lithium cobalt oxide ($LiCoO_2$) to which halogen and magnesium are not added in a formation method described later. As described in Non-Patent Document 1, Non-Patent Document 2, and the like, the crystal structure of lithium cobalt oxide shown in FIG. 10 changes depending on the charge depth.

As illustrated in FIG. 10, lithium cobalt oxide with a charge depth of 0 (the discharged state) includes a region having the crystal structure of the space group R-3m, and includes three $CoO_2$ layers in a unit cell. Thus, this crystal structure is referred to as an O3-type crystal structure in some cases. Note that the $CoO_2$ layer has a structure in which octahedral geometry with oxygen atoms hexacoordinated to cobalt continues on a plane in the edge-sharing state.

Furthermore, when the charge depth is 1, $LiCoO_2$ has the crystal structure of the space group P-3 m1, and one $CoO_2$ layer exists in a unit cell. Thus, this crystal structure is referred to as an O1-type crystal structure in some cases.

Moreover, lithium cobalt oxide when the charge depth is approximately 0.88 has the crystal structure of the space group R-3m. This structure can also be regarded as a structure in which $CoO_2$ structures such as P-3 m1 (O1) and $LiCoO_2$ structures such as R-3m (O3) are alternately stacked. Thus, this crystal structure is referred to as an H1-3 type crystal structure in some cases. Note that the number of cobalt atoms per unit cell in the actual H1-3 type crystal structure is twice as large as that of cobalt atoms per unit cell in other structures. However, in this specification including FIG. 10, the c-axis of the H1-3 type crystal structure is described half that of the unit cell for easy comparison with the other structures.

For the H1-3 type structure, as disclosed in Non-Patent Document 3, the coordinates of cobalt and oxygen in the unit cell can be expressed as follows, for example: Co (0, 0, 0.42150±0.00016), $O_1$ (0, 0, 0.27671±0.00045), and $O_2$ (0, 0, 0.11535±0.00045). $O_1$ and $O_2$ are each an oxygen atom. In this manner, the H1-3 type structure is represented by a unit cell including one cobalt and two oxygen. Meanwhile, the pseudo-spinel crystal structure of one embodiment of the present invention is preferably represented by a unit cell including one cobalt and one oxygen, as described later. This means that the symmetry of cobalt and oxygen differs between the pseudo-spinel structure and the H1-3 type structure, and the amount of change from the $O_3$ structure is smaller in the pseudo-spinel structure than in the H1-3 type structure. A preferred unit cell for representing a crystal structure in a positive electrode active material is selected such that the value of GOF (goodness of fit) is smaller in Rietveld analysis of XRD patterns, for example.

When charge with a high voltage of 4.6 V or higher based on the redox potential of a lithium metal or charge with a large charge depth of 0.8 or more and discharge are repeated, the crystal structure of lithium cobalt oxide changes (i.e., an unbalanced phase change occurs) repeatedly between the H1-3 type structure and the R-3m (O3) structure in a discharged state.

However, there is a large deviation in the position of the $CoO_2$ layer between these two crystal structures. As indicated by the dotted line and the arrow in FIG. 10, the $CoO_2$ layer in the H1-3 type crystal structure largely deviates from that in R-3m (O3). Such a dynamic structural change might adversely affect the stability of the crystal structure.

A difference in volume is also large. A difference in volume in comparison with the same number of cobalt atoms between the H1-3 type crystal structure and the O3-type crystal structure in the discharged state is 3.0% or more.

In addition, a structure in which $CoO_2$ layers are continuous, such as P-3 m1 (O1), included in the H1-3 type crystal structure is highly likely to be unstable.

Thus, the repeated high-voltage charge and discharge break the crystal structure of lithium cobalt oxide. The break of the crystal structure degrades the cycle performance. This is probably because the break of the crystal structure reduces sites where lithium can stably exist and makes it difficult to insert and extract lithium.

Embodiment 4

In this embodiment, examples of materials which can be used for a secondary battery including the positive electrode active material formed by the forming method of one embodiment of the present invention are described. In this embodiment, a secondary battery in which a positive electrode, a negative electrode, and an electrolyte solution are wrapped in an exterior body is described as an example.

[Positive Electrode]

The positive electrode includes a positive electrode active material layer and a positive electrode current collector.

<Positive Electrode Active Material Layer>

The positive electrode active material layer includes a positive electrode active material particle. The positive electrode active material layer may contain a conductive additive and a binder.

As the positive electrode active material particle, the positive electrode active material formed by the forming method of one embodiment of the present invention can be used.

Examples of the conductive additive include a carbon material, a metal material, and a conductive ceramic material. Alternatively, a fiber material may be used as the conductive additive. The content of the conductive additive with respect to the total amount of the active material layer is preferably greater than or equal to 1 wt % and less than or equal to 10 wt %, further preferably greater than or equal to 1 wt % and less than or equal to 5 wt %.

A network for electric conduction can be formed in the electrode by the conductive additive. The conductive additive also allows maintaining of a path for electric conduction between the positive electrode active materials. The addition of the conductive additive to the active material layer increases the electric conductivity of the active material layer.

Examples of the conductive additive include natural graphite, artificial graphite such as mesocarbon microbeads, and carbon fiber. Examples of carbon fiber include mesophase pitch-based carbon fiber and isotropic pitch-based carbon fiber. In addition, carbon nanofiber, carbon nanotube, or the like can be used as carbon fiber. Carbon nanotube can be formed by, for example, a vapor deposition method. Other examples of the conductive additive include carbon materials such as carbon black (e.g., acetylene black (AB)), graphite (black lead) particles, graphene, and fullerene. Alternatively, metal powder or metal fibers of copper, nickel, aluminum, silver, gold, or the like, a conductive ceramic material, or the like can be used.

Alternatively, a graphene compound may be used as the conductive additive.

A graphene compound has excellent electrical characteristics of high conductivity and excellent physical properties of high flexibility and high mechanical strength in some cases. Furthermore, a graphene compound has a planar shape. A graphene compound enables low-resistance surface contact. Furthermore, a graphene compound has extremely high conductivity even with a small thickness in some cases and thus allows a conductive path to be formed in an active material layer efficiently even with a small amount. For this reason, it is preferable to use a graphene compound as the conductive additive because the area where the active material and the conductive additive are in contact with each other can be increased or electric resistance can be reduced in some cases. Here, it is particularly preferable to use, for example, graphene, multilayer graphene, or reduced graphene oxide (hereinafter, RGO) as a graphene compound. Note that RGO refers to a compound obtained by reducing graphene oxide (GO), for example.

In the case where an active material particle with a small particle diameter, e.g., 1 μm or less, is used, the specific surface area of the active material particle is large and thus more conductive paths for connecting the active material particles are needed. In such a case, a graphene compound that can efficiently form a conductive path even in a small amount is particularly preferably used.

A cross-sectional structure example of an active material layer 200 containing a graphene compound as a conductive additive is described below.

Figure 11A:
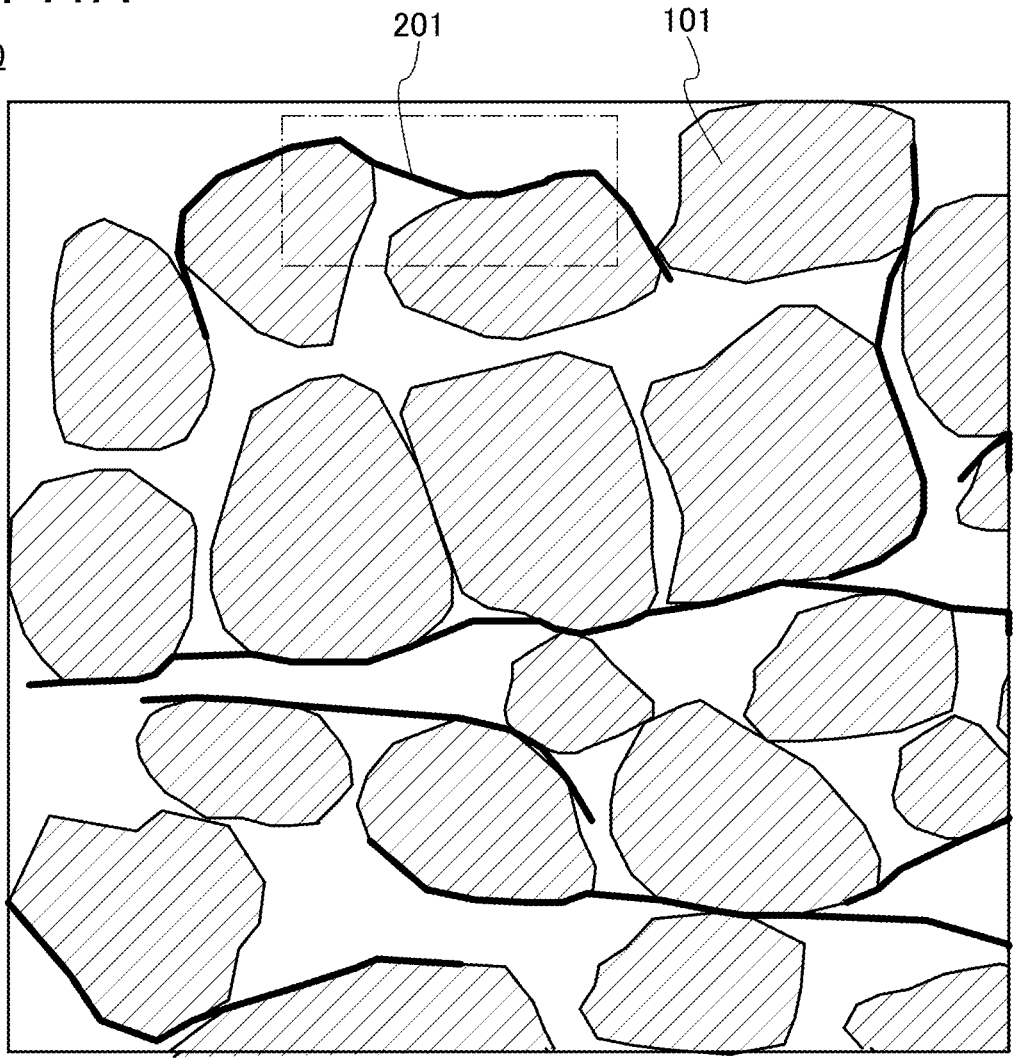
FIG. 11A and FIG. 11B are cross-sectional views of an active material layer containing a graphene compound as a conductive additive.
Figure 11B:
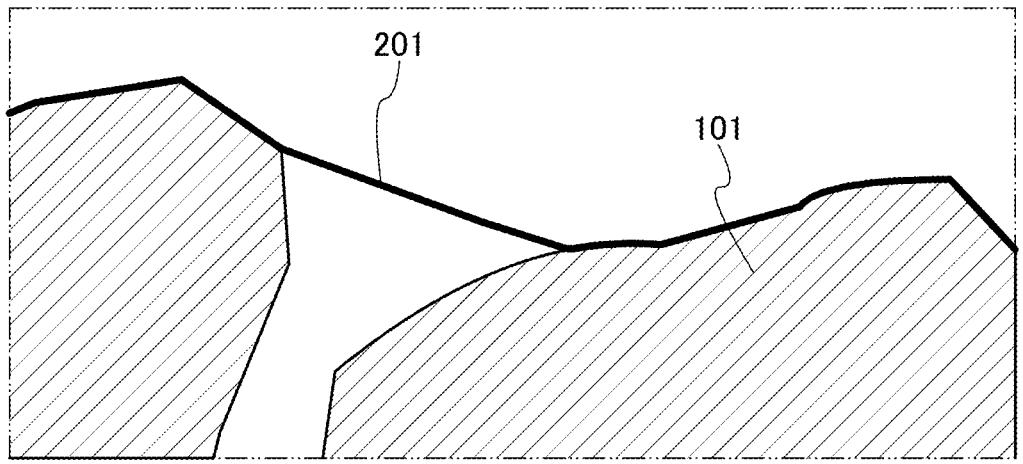

FIG. 11A shows a longitudinal cross-sectional view of the active material layer 200. FIG. 11B is an enlarged view of a region surrounded by dotted line in FIG. 11A. The active material layer 200 includes a particulate positive electrode active material 101, a graphene compound 201 serving as a conductive additive, and a binder (not illustrated). Here, graphene or multilayer graphene may be used as the graphene compound 201, for example. The graphene compound 201 preferably has a sheet-like shape. The graphene compound 201 may have a sheet-like shape formed of a plurality of sheets of multilayer graphene and/or a plurality of sheets of graphene that partly overlap with each other.

In the longitudinal cross section of the active material layer 200, as illustrated in FIG. 11A, the sheet-like graphene compounds 201 are dispersed substantially uniformly in the active material layer 200. The graphene compounds 201 are schematically shown by thick lines in FIG. 11A but are actually thin films each having a thickness corresponding to the thickness of a single layer or a multi-layer of carbon molecules. The plurality of graphene compounds 201 are formed in such a way as to wrap or cover the plurality of particulate positive electrode active materials 101 or adhere to the surfaces of the plurality of particulate positive electrode active materials 101, so that the graphene compounds 201 make surface contact with the particulate positive electrode active materials 101.

Here, when the plurality of graphene compounds are bonded to each other, a net-like graphene compound sheet (hereinafter referred to as a graphene compound net or a graphene net) can be formed. The graphene net covering the active material can function as a binder for bonding active materials. The amount of a binder can thus be reduced, or the binder does not have to be used, increasing the proportion of the active material in the electrode volume or weight. That is to say, the capacity of the power storage device can be increased.

Here, it is preferable that graphene oxide be used as the graphene compounds 201 and mixed with an active material to form a layer to be the active material layer 200, and then reduction be performed. When graphene oxide with extremely high dispersibility in a polar solvent is used for the formation of the graphene compounds 201, the graphene compounds 201 can be substantially uniformly dispersed in the active material layer 200. The solvent is removed by volatilization from a dispersion medium in which graphene oxide is uniformly dispersed, and the graphene oxide is reduced; hence, the graphene compounds 201 remaining in the active material layer 200 partly overlap with each other and are dispersed such that surface contact is made, thereby forming a three-dimensional conductive path. Note that graphene oxide can be reduced either by heat treatment or with the use of a reducing agent, for example.

Unlike a conductive additive in the form of particles, such as acetylene black, which makes point contact with an active material, the graphene compound 201 is capable of making low-resistance surface contact; accordingly, the electrical conduction between the particulate positive electrode active materials 101 and the graphene compound 201 can be improved with a smaller amount of the graphene compound 201 than that of a normal conductive additive. This increases the proportion of the positive electrode active material 101 in the active material layer 200. Accordingly, the discharge capacity of the power storage device can be increased.

As the binder, a rubber material such as styrene-butadiene rubber (SBR), styrene-isoprene-styrene rubber, acrylonitrile-butadiene rubber, butadiene rubber, or ethylene-propylene-diene copolymer can be used, for example. Alternatively, fluororubber can be used as the binder.

As the binder, for example, water-soluble polymers are preferably used. As the water-soluble polymers, a polysaccharide and the like can be used. As the polysaccharide, a cellulose derivative such as carboxymethyl cellulose (CMC), methyl cellulose, ethyl cellulose, hydroxypropyl cellulose, diacetyl cellulose, or regenerated cellulose, starch, or the like can be used. It is more preferred that such water-soluble polymers be used in combination with any of the above rubber materials.

Alternatively, as the binder, a material such as polystyrene, poly(methyl acrylate), poly(methyl methacrylate) (PMMA), sodium polyacrylate, polyvinyl alcohol (PVA), polyethylene oxide (PEO), polypropylene oxide, polyimide, polyvinyl chloride, polytetrafluoroethylene, polyethylene, polypropylene, polyisobutylene, polyethylene terephthalate, nylon, polyvinylidene fluoride (PVDF), polyacrylonitrile (PAN), ethylene-propylene-diene polymer, polyvinyl acetate, or nitrocellulose is preferably used.

A plurality of the above materials may be used in combination for the binder.

For example, a material having a significant viscosity modifying effect and another material may be used in combination. For example, a rubber material or the like has high adhesion or high elasticity but may have difficulty in viscosity modification when mixed in a solvent. In such a case, a rubber material or the like is preferably mixed with a material having a significant viscosity modifying effect, for example. As a material having a significant viscosity modifying effect, for example, a water-soluble polymer may be used. An example of a water-soluble polymer having an especially significant viscosity modifying effect is the above-mentioned polysaccharide; for example, a cellulose derivative such as carboxymethyl cellulose (CMC), methyl cellulose, ethyl cellulose, hydroxypropyl cellulose, diacetyl cellulose, or regenerated cellulose, or starch can be used.

Note that a cellulose derivative such as carboxymethyl cellulose obtains a higher solubility when converted into a salt such as a sodium salt or an ammonium salt of carboxymethyl cellulose, and accordingly, easily exerts an effect as a viscosity modifier. The high solubility can also increase the dispersibility of an active material and other components in the formation of slurry for an electrode. In this specification, cellulose and a cellulose derivative used as a binder of an electrode include salts thereof.

The water-soluble polymers stabilize viscosity by being dissolved in water and allow stable dispersion of the active material and another material combined as a binder such as styrene-butadiene rubber in an aqueous solution. Furthermore, a water-soluble polymer is expected to be easily and stably adsorbed to an active material surface because it has a functional group. Many cellulose derivatives such as carboxymethyl cellulose have functional groups such as a hydroxyl group and a carboxyl group, and because of the functional groups, polymers are expected to interact with each other and cover an active material surface in a large area.

In the case where the binder covering or being in contact with the active material surface forms a film, the film is expected to serve as a passivation film to inhibit the decomposition of the electrolyte solution. Here, the passivation film refers to a film without electric conductivity or a film with extremely low electric conductivity, and can inhibit the decomposition of an electrolyte solution at a potential at which a battery reaction occurs in the case where the passivation film is formed on the active material surface, for example. It is preferred that the passivation film can conduct lithium ions while inhibiting electric conduction.

<Positive Electrode Current Collector>

For the positive electrode current collector, a material that has high conductivity, such as a metal like stainless steel, gold, platinum, aluminum, or titanium, or an alloy thereof, can be used. It is preferred that a material used for the positive electrode current collector not dissolve at the potential of the positive electrode. It is also possible to use an aluminum alloy to which an element that improves heat resistance, such as silicon, titanium, neodymium, scandium, or molybdenum, is added. The positive electrode current collector can also be formed with a metal element that forms silicide by reacting with silicon. Examples of the metal element that forms silicide by reacting with silicon include zirconium, titanium, hafnium, vanadium, niobium, tantalum, chromium, molybdenum, tungsten, cobalt, and nickel. The current collector can have any of various shapes including a foil-like shape, a plate-like shape (sheet-like shape), a net-like shape, a punching-metal shape, and an expanded-metal shape. The current collector preferably has a thickness of 5 µm to 30 µm.

<Negative Electrode>

The negative electrode includes a negative electrode active material layer and a negative electrode current collector. The negative electrode active material layer may contain a conductive additive and a binder.

<Negative Electrode Active Material>

As a negative electrode active material, for example, an alloy-based material or a carbon-based material can be used.

For the negative electrode active material, an element which enables charge-discharge reactions by an alloying reaction and a dealloying reaction with lithium can be used. For example, a material containing at least one of silicon, tin, gallium, aluminum, germanium, lead, antimony, bismuth, silver, zinc, cadmium, indium, and the like can be used. Such elements have higher capacity than carbon; in particular, silicon has a high theoretical capacity of 4200 mAh/g. For this reason, silicon is preferably used as the negative electrode active material. Alternatively, a compound containing any of the above elements may be used. Examples of the compound include SiO, $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, and SbSn. Here, an element that enables charge-discharge reactions by an alloying reaction and a dealloying reaction with lithium, a compound containing the element, and the like may be referred to as an alloy-based material.

In this specification and the like, SiO refers to silicon monoxide, for example. SiO can alternatively be expressed as $SiO_x$. Here, x is preferably 1 or an approximate value of 1. For example, x is preferably 0.2 or more and 1.5 or less, further preferably 0.3 or more and 1.2 or less.

As the carbon-based material, graphite, graphitizing carbon (soft carbon), non-graphitizing carbon (hard carbon), a carbon nanotube, graphene, carbon black, and the like can be used.

Examples of graphite include artificial graphite and natural graphite. Examples of artificial graphite include meso-carbon microbeads (MCMB), coke-based artificial graphite, and pitch-based artificial graphite. As artificial graphite, spherical graphite having a spherical shape can be used. For example, MCMB is preferable because it may have a spherical shape. Moreover, MCMB is preferable in some cases because it can relatively easily have a small surface area. Examples of natural graphite include flake graphite and spherical natural graphite.

Graphite has a low potential substantially equal to that of a lithium metal (higher than or equal to 0.05 V and lower than or equal to 0.3 V vs. $Li/Li^+$) when lithium ions are intercalated into the graphite (while a lithium-graphite intercalation compound is formed). For this reason, a lithium ion secondary battery can have a high operating voltage. In addition, graphite is preferred because of its advantages such as a relatively high capacity per unit volume, relatively small volume expansion, low cost, and higher level of safety than that of a lithium metal.

Alternatively, for the negative electrode active material, an oxide such as titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used.

Still alternatively, for the negative electrode active material, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

A nitride containing lithium and a transition metal is preferably used, in which case lithium ions are contained in the negative electrode active material and thus the negative electrode active material can be used in combination with a material for a positive electrode active material which does not contain lithium ions, such as $V_2O_5$ or $Cr_3O_8$. In the case of using a material containing lithium ions as a positive electrode active material, the nitride containing lithium and a transition metal can be used for the negative electrode active material by extracting the lithium ions contained in the positive electrode active material in advance.

Alternatively, a material which causes a conversion reaction can be used for the negative electrode active material. For example, a transition metal oxide which does not form an alloy with lithium, such as cobalt oxide (CoO), nickel oxide (NiO), and iron oxide (FeO), may be used for the negative electrode active material. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$.

For the conductive additive and the binder that can be included in the negative electrode active material layer, materials similar to those of the conductive additive and the binder that can be included in the positive electrode active material layer can be used.

<Negative Electrode Current Collector>

For the negative electrode current collector, a material similar to that of the positive electrode current collector can be used. Note that a material that is not alloyed with a carrier ion such as lithium is preferably used for the negative electrode current collector.

[Electrolyte Solution]

The electrolyte solution contains a solvent and an electrolyte. As a solvent of the electrolyte solution, an aprotic organic solvent is preferably used; for example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, ethyl acetate, methyl propionate, ethyl propionate, propyl propionate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

When one or more kinds of ionic liquids (room temperature molten salts) which have non-flammability and non-volatility is used as a solvent of the electrolyte solution, a power storage device can be prevented from exploding or catching fire even when the power storage device internally shorts out or the internal temperature increases owing to overcharging or the like. An ionic liquid is made with a cation and an anion, and contains an organic cation and an anion. Examples of the organic cation used for the electrolyte solution include aliphatic onium cations such as a quaternary ammonium cation, a tertiary sulfonium cation, and a quaternary phosphonium cation, and aromatic cations such as an imidazolium cation and a pyridinium cation. Examples of the anion used for the electrolyte solution include a monovalent amide-based anion, a monovalent methide-based anion, a fluorosulfonate anion, a perfluoroalkylsulfonate anion, a tetrafluoroborate anion, a perfluoroalkylborate anion, a hexafluorophosphate anion, and a perfluoroalkylphosphate anion.

As an electrolyte dissolved in the above-described solvent, one of lithium salts such as $LiPF_6$, $LiClO_4$, $LiAsF_6$, $LiBF_4$, $LiAlCl_4$, LiSCN, LiBr, LiI, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2FsSO_2)_3$, $LiN(CF_3SO_2)_2$, $LiN(C_4F_9SO_2)(CF_3SO_2)$, and $LiN(C_2FsSO_2)_2$ can be used, or two or more of these lithium salts can be used in an appropriate combination in an appropriate ratio.

The electrolyte solution used for a storage device is preferably highly purified and contains a small amount of dust particles and elements other than the constituent elements of the electrolyte solution (hereinafter also simply referred to as impurities). Specifically, the weight ratio of impurities to the electrolyte solution is less than or equal to 1%, preferably less than or equal to 0.1%, and further preferably less than or equal to 0.01%.

Furthermore, an additive agent such as vinylene carbonate, propane sultone (PS), tert-butylbenzene (TBB), fluoroethylene carbonate (FEC), lithium bis(oxalate)borate (LiBOB), or a dinitrile compound such as succinonitrile or adiponitrile may be added to the electrolyte solution. The concentration of the additive agent is, for example, higher than or equal to 0.1 wt % and lower than or equal to 5 wt % with respect to the whole solvent.

Alternatively, a polymer gel electrolyte obtained in such a manner that a polymer is swelled with an electrolyte solution may be used.

When a polymer gel electrolyte is used, safety against liquid leakage and the like is improved. Furthermore, a secondary battery can be thinner and more lightweight.

As a polymer that undergoes gelation, a silicone gel, an acrylic gel, an acrylonitrile gel, a polyethylene oxide-based gel, a polypropylene oxide-based gel, a fluorine-based polymer gel, or the like can be used. Examples of the polymer include a polymer having a polyalkylene oxide structure, such as polyethylene oxide (PEO); PVDF; polyacrylonitrile; and a copolymer containing any of them. For example, PVDF-HFP, which is a copolymer of PVDF and hexafluoropropylene (HFP), can be used. The formed polymer may be porous.

Instead of the electrolyte solution, a solid electrolyte including an inorganic material such as a sulfide-based inorganic material or an oxide-based inorganic material, or the like, or a solid electrolyte including a high-molecular material such as a polyethylene oxide (PEO)-based high-molecular material, or the like may be used. When the solid electrolyte is used, a separator and a spacer are not necessary. Furthermore, since the battery can be entirely solidified, there is no possibility of liquid leakage to increase the safety of the battery dramatically.

Thus, the positive electrode active material formed by the forming method of one embodiment of the present invention can be applied to an all-solid-state battery. When the positive electrode active material is applied to an all-solid-state battery, the all-solid-state battery can have high safety and excellent characteristics.

Embodiment 5

In this embodiment, examples of the shape of a secondary battery including the positive electrode active material formed by the forming method described in the above embodiment are described. For the materials used for the secondary battery described in this embodiment, the description of the above embodiments can be referred to.

[Coin-Type Secondary Battery]

Figure 12A:
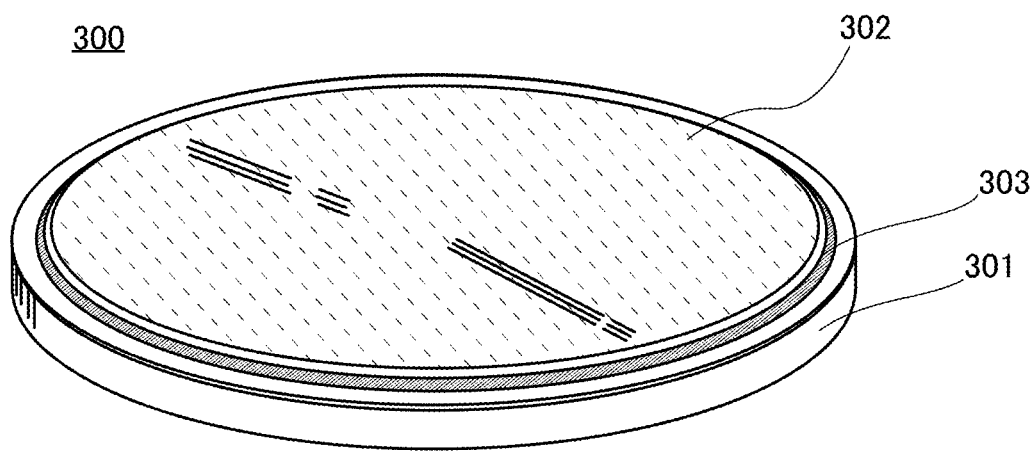
FIG. 12A and FIG. 12B are perspective views illustrating a coin-type secondary battery.
Figure 12B:
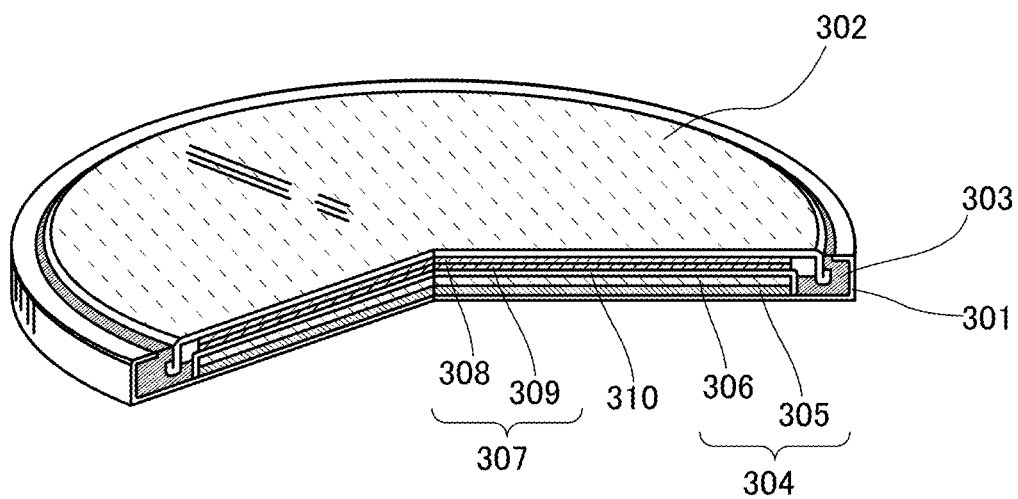

First, an example of a coin-type secondary battery is described. FIG. 12A is an external view of a coin-type (single-layer flat type) secondary battery, and FIG. 12B is a cross-sectional view thereof.

In a coin-type secondary battery 300, a positive electrode can 301 doubling as a positive electrode terminal and a negative electrode can 302 doubling as a negative electrode terminal are insulated from each other and sealed by a gasket 303 made of polypropylene or the like. A positive electrode 304 includes a positive electrode current collector 305 and a positive electrode active material layer 306 provided in contact with the positive electrode current collector 305. A negative electrode 307 includes a negative electrode current collector 308 and a negative electrode active material layer 309 provided in contact with the negative electrode current collector 308.

Note that only one surface of each of the positive electrode 304 and the negative electrode 307 used for the coin-type secondary battery 300 is provided with an active material layer.

For the positive electrode can 301 and the negative electrode can 302, a metal having a corrosion-resistant property to an electrolyte solution, such as nickel, aluminum, or titanium, an alloy of such a metal, or an alloy of such a metal and another metal (e.g., stainless steel) can be used. Alternatively, the positive electrode can 301 and the negative electrode can 302 are preferably covered with nickel, aluminum, or the like in order to prevent corrosion due to the electrolyte solution. The positive electrode can 301 and the negative electrode can 302 are electrically connected to the positive electrode 304 and the negative electrode 307, respectively.

The negative electrode 307, the positive electrode 304, and the separator 310 are immersed in the electrolyte solution. Then, as illustrated in FIG. 12B, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 located therebetween. In such a manner, the coin-type secondary battery 300 can be formed.

When the positive electrode active material particle described in the above embodiments is used in the positive electrode 304, the coin-type secondary battery 300 with little deterioration and high safety can be obtained.

[Separator]

The secondary battery preferably includes a separator. As the separator, for example, a fiber containing cellulose such as paper; nonwoven fabric; a glass fiber; ceramics; a synthetic fiber using nylon (polyamide), vinylon (polyvinyl alcohol-based fiber), polyester, acrylic, polyolefin, or polyurethane; or the like can be used. The separator is preferably formed to have an envelope-like shape to wrap one of the positive electrode and the negative electrode.

The separator may have a multilayer structure. For example, an organic material film such as polypropylene or polyethylene can be coated with a ceramic-based material, a fluorine-based material, a polyamide-based material, a mixture thereof, or the like. Examples of the ceramic-based material include aluminum oxide particles and silicon oxide particles. Examples of the fluorine-based material include PVDF and polytetrafluoroethylene. Examples of the polyamide-based material include nylon and aramid (meta-based aramid and para-based aramid).

Deterioration of the separator in charge and discharge at high voltage can be inhibited and thus the reliability of the secondary battery can be improved because oxidation resistance is improved when the separator is coated with the ceramic-based material. In addition, when the separator is coated with the fluorine-based material, the separator is easily brought into close contact with an electrode, resulting in high output characteristics. When the separator is coated with the polyamide-based material, in particular, aramid, the safety of the secondary battery is improved because heat resistance is improved.

For example, both surfaces of a polypropylene film may be coated with a mixed material of aluminum oxide and aramid. Alternatively, a surface of the polypropylene film that is in contact with the positive electrode may be coated with the mixed material of aluminum oxide and aramid, and a surface of the polypropylene film that is in contact with the negative electrode may be coated with the fluorine-based material.

With the use of a separator having a multilayer structure, the capacity per volume of the secondary battery can be increased because the safety of the secondary battery can be maintained even when the total thickness of the separator is small.

[Cylindrical Secondary Battery]

An example of a cylindrical secondary battery is described with reference to FIG. 13A to FIG. 13D. A cylindrical secondary battery 600 illustrated in FIG. 13A includes, as illustrated in the cross-sectional schematic view of FIG. 13B, a positive electrode cap (battery lid) 601 on the top surface and a battery can (outer can) 602 on the side and bottom surfaces. The positive electrode cap and the battery can (outer can) 602 are insulated from each other by a gasket (insulating packing) 610.

Inside the battery can 602 having a hollow cylindrical shape, a battery element in which a strip-like positive electrode 604 and a strip-like negative electrode 606 are wound with a separator 605 located therebetween is provided. Although not illustrated, the battery element is wound around a center pin. One end of the battery can 602 is close and the other end thereof is open. For the battery can 602, a metal having a corrosion-resistant property to an electrolyte solution, such as nickel, aluminum, or titanium, an alloy of such a metal, or an alloy of such a metal and another metal (e.g., stainless steel) can be used. Alternatively, the battery can 602 is preferably covered with nickel, aluminum, or the like in order to prevent corrosion due to the electrolyte solution. Inside the battery can 602, the battery element in which the positive electrode, the negative electrode, and the separator are wound is provided between a pair of insulating plates 608 and 609 that face each other. Furthermore, a nonaqueous electrolyte solution (not illustrated) is injected inside the battery can 602 provided with the battery element.

As the nonaqueous electrolyte solution, a nonaqueous electrolyte solution that is similar to that of the coin-type secondary battery can be used.

Since the positive electrode and the negative electrode of the cylindrical secondary battery are wound, active materials are preferably formed on both sides of the current collectors. A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a PTC element (Positive Temperature Coefficient) 611. The safety valve mechanism 612 cuts off electrical connection between the positive electrode cap 601 and the positive electrode 604 when the internal pressure of the battery exceeds a predetermined threshold value. The PTC element 611, which serves as a thermally sensitive resistor whose resistance increases as temperature rises, limits the amount of current by increasing the resistance, thereby preventing abnormal heat generation. Barium titanate ($BaTiO_3$)-based semiconductor ceramic or the like can be used for the PTC element.

Figure 13A:
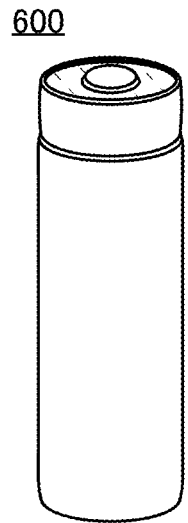
FIG. 13A is a perspective view illustrating a cylindrical secondary battery.
Figure 13B:
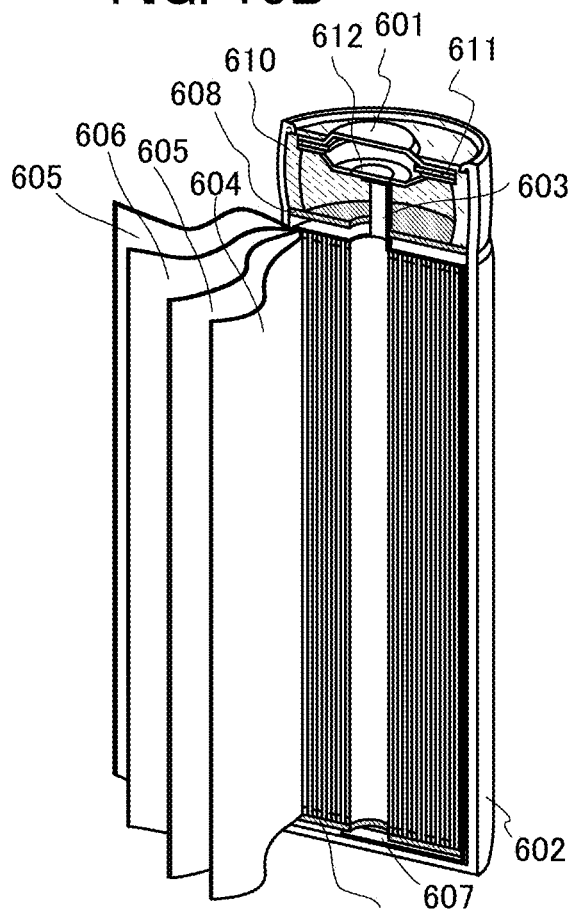
FIG. 13B is an exploded perspective view.
Figure 13C:
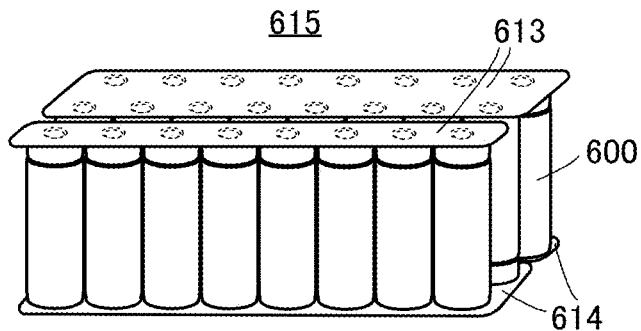
FIG. 13C is a perspective view of cylindrical secondary batteries.

Alternatively, as illustrated in FIG. 13C, a plurality of secondary batteries 600 may be sandwiched between a conductive plate 613 and a conductive plate 614 to form a module 615. The plurality of secondary batteries 600 may be connected parallel to each other, connected in series, or connected in series after being connected parallel to each other. With the module 615 including the plurality of secondary batteries 600, large electric power can be extracted.

Figure 13D:
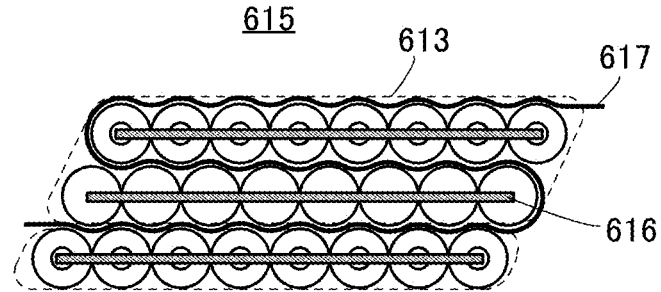
FIG. 13D is a top view illustrating cylindrical secondary batteries.

FIG. 13D is a top view of the module 615. The conductive plate 613 is shown by a dotted line for clarity of the drawing. As illustrated in FIG. 13D, the module 615 may include a conducting wiring 616 which electrically connects the plurality of secondary batteries 600 to each other. It is possible to provide the conductive plate 613 over the conducting wiring 616 to overlap with each other. In addition, a temperature control device 617 may be provided between the plurality of secondary batteries 600. When the secondary batteries 600 are overheated, the temperature control device 617 can cool them, and when the secondary batteries 600 are cooled too much, the temperature control device 617 can heat them. Thus, the performance of the module 615 is not easily influenced by the outside air temperature.

When the positive electrode active material formed by the forming method described in the above embodiment is used in the positive electrode 604, the cylindrical secondary battery 600 with little deterioration and high safety can be obtained.

[Structural Examples of Power Storage Device]

Other structural examples of power storage devices are described with reference to FIG. 14 to FIG. 18.

Figure 14A:
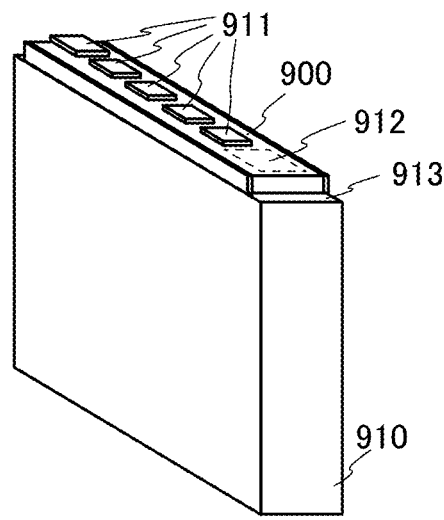
FIG. 14A and FIG. 14B are diagrams illustrating an example of a secondary battery.
Figure 14B:
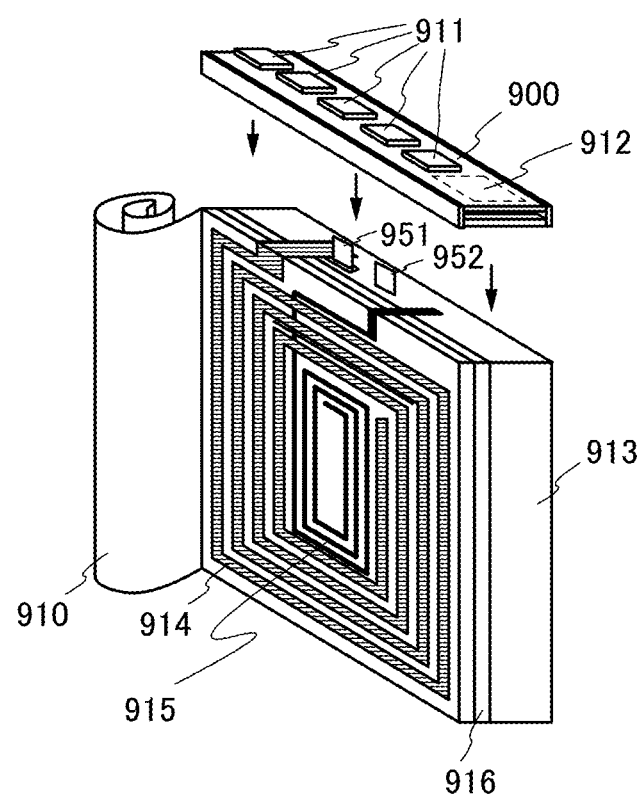

FIG. 14A and FIG. 14B are external views of a power storage device. The power storage device includes a circuit board 900 and a secondary battery 913. A label 910 is attached onto the secondary battery 913. The power storage device further includes a terminal 951, a terminal 952, an antenna 914, and an antenna 915 as illustrated in FIG. 14B.

The circuit board 900 includes a terminal 911 and a circuit 912. The terminal 911 is connected to the terminal 951, the terminal 952, the antenna 914, the antenna 915, and the circuit 912. Note that a plurality of terminals 911 serving as a control signal input terminal, a power supply terminal, and the like may be provided.

The circuit 912 may be provided on the rear surface of the circuit board 900. Note that the shape of the antenna 914 and the antenna 915 is not limited to a coil shape and may be a linear shape or a plate shape. Furthermore, a planar antenna, an aperture antenna, a traveling-wave antenna, an EH antenna, a magnetic-field antenna, or a dielectric antenna may be used. The antenna 914 or the antenna 915 may be a flat-plate conductor. The flat-plate conductor can serve as one of conductors for electric field coupling. That is, the antenna 914 or the antenna 915 can serve as one of two conductors of a capacitor. Thus, electric power can be transmitted and received not only by an electromagnetic field or a magnetic field but also by an electric field.

The line width of the antenna 914 is preferably larger than the line width of the antenna 915. This makes it possible to increase the amount of electric power received by the antenna 914.

The power storage device includes a layer 916 between the secondary battery 913, and the antenna 914 and the antenna 915. The layer 916 has a function of, for example, blocking an electromagnetic field from the secondary battery 913. As the layer 916, for example, a magnetic body can be used.

Note that the structure of the power storage device is not limited to that shown in FIG. 14.

Figure 15A:
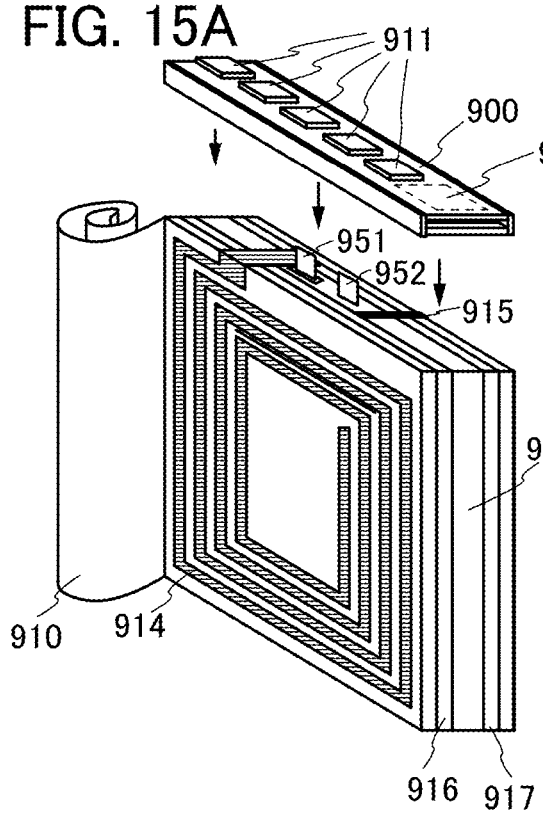
FIG. 15A, FIG. 15B, FIG. 15C, and FIG. 15D are perspective views illustrating examples of a secondary battery.
Figure 15B:
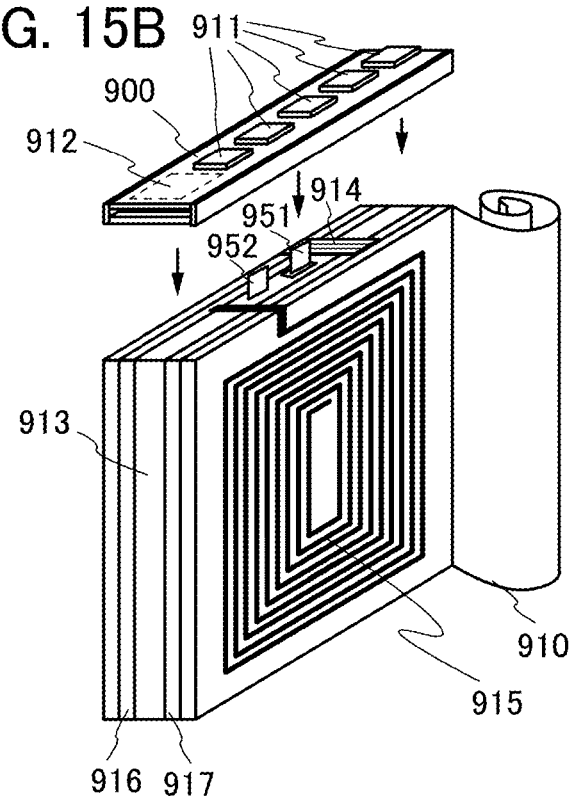

For example, as shown in FIG. 15A and FIG. 15B, two opposite surfaces of the secondary battery 913 illustrated in FIG. 14A and FIG. 14B may be provided with an antenna. FIG. 15A is an external view showing one side of the opposite surfaces, and FIG. 15B is an external view showing the other side of the opposite surfaces. For the same portions as those of the power storage device illustrated in FIG. 14A and FIG. 14B, a description of the power storage device illustrated in FIG. 14A and FIG. 14B can be referred to as appropriate.

As illustrated in FIG. 15A, the antenna 914 is provided on one of the opposite surfaces of the secondary battery 913 with the layer 916 located therebetween, and as illustrated in FIG. 15B, the antenna 915 is provided on the other of the opposite surfaces of the secondary battery 913 with a layer 917 located therebetween. The layer 917 has a function of, for example, blocking an electromagnetic field from the secondary battery 913. As the layer 917, for example, a magnetic body can be used.

With the above structure, both the antenna 914 and the antenna 915 can be increased in size.

Figure 15C:
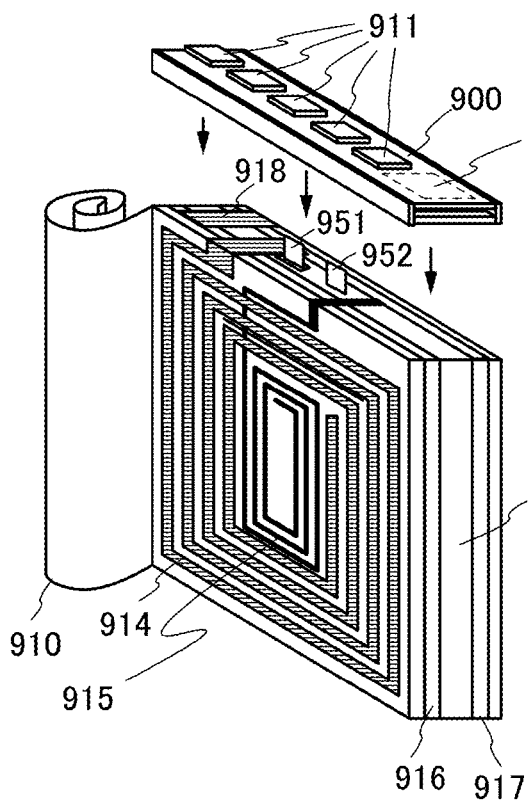
Figure 15D:
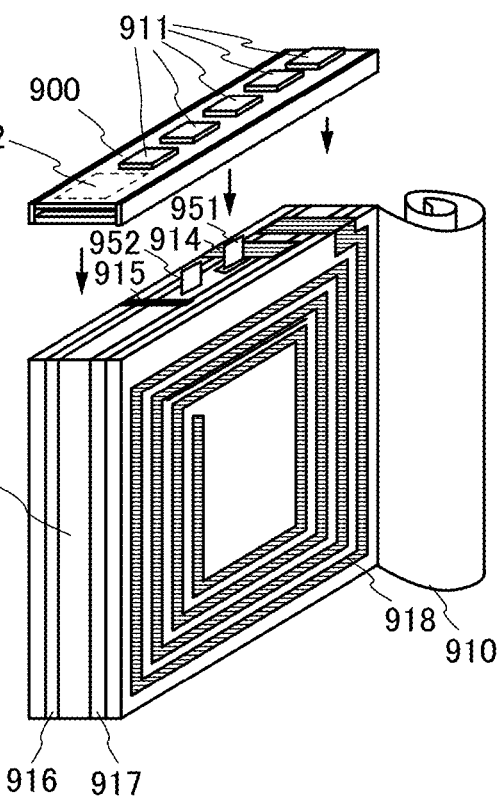

Alternatively, as illustrated in FIG. 15C and FIG. 15D, two opposite surfaces of the secondary battery 913 in FIG. 14A and FIG. 14B may be provided with different types of antennas. FIG. 15C is an external view showing one side of the opposite surfaces, and FIG. 15D is an external view showing the other side of the opposite surfaces. For the same portions as those of the power storage device illustrated in FIG. 14A and FIG. 14B, a description of the power storage device illustrated in FIG. 14A and FIG. 14B can be referred to as appropriate.

As illustrated in FIG. 15C, the antenna 914 and the antenna 915 are provided on one of the opposite surfaces of the secondary battery 913 with the layer 916 interposed therebetween, and as illustrated in FIG. 15D, an antenna 918 is provided on the other of the opposite surfaces of the secondary battery 913 with the layer 917 interposed therebetween. The antenna 918 has a function of, for example, communicating data with an external device. An antenna with a shape that can be applied to the antenna 914 and the antenna 915, for example, can be used as the antenna 918. As a system for communication using the antenna 918 between the power storage device and another device, a response method that can be used between the power storage device and another device, such as NFC, can be employed.

Figure 16A:
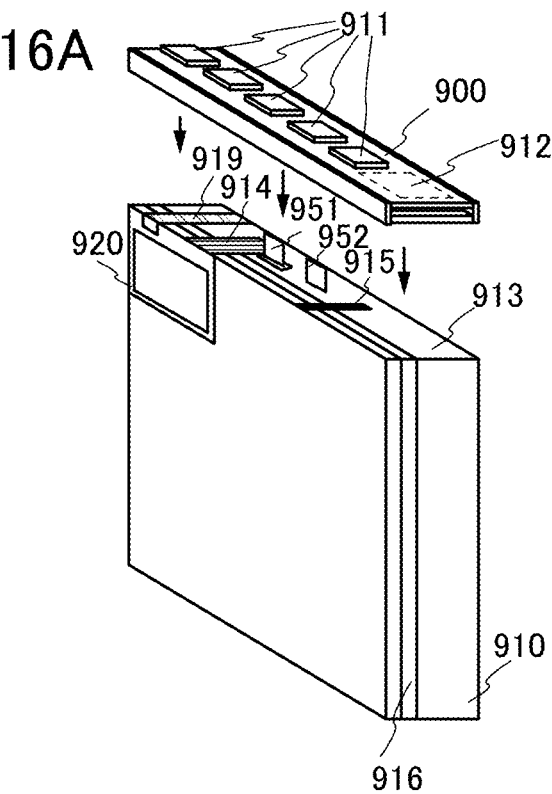
FIG. 16A and FIG. 16B are perspective views illustrating an example of a secondary battery.

Alternatively, as illustrated in FIG. 16A, the secondary battery 913 in FIG. 14A and FIG. 14B may be provided with a display device 920. The display device 920 is electrically connected to the terminal 911 via a terminal 919. It is possible that the label 910 is not provided in a portion where the display device 920 is provided. For the same portions as those of the power storage device illustrated in FIG. 14A and FIG. 14B, a description of the power storage device illustrated in FIG. 14A and FIG. 14B can be referred to as appropriate.

The display device 920 can display, for example, an image showing whether charging is being carried out, an image showing the amount of stored power, or the like. As the display device 920, electronic paper, a liquid crystal display device, an electroluminescence (also referred to as EL) display device, or the like can be used. For example, the use of electronic paper can reduce the power consumption of the display device 920.

Figure 16B:
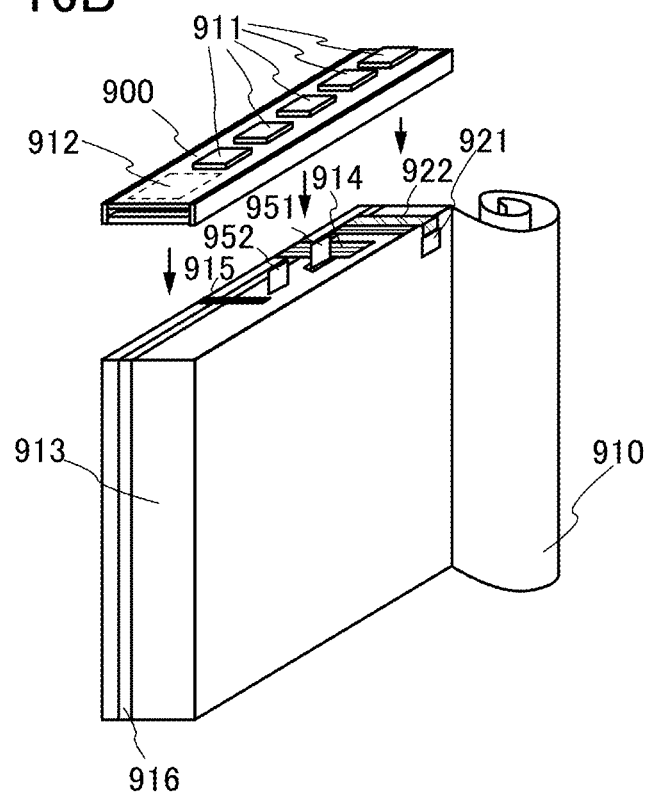

Alternatively, as illustrated in FIG. 16B, the secondary battery 913 illustrated in FIG. 14A and FIG. 14B may be provided with a sensor 921. The sensor 921 is electrically connected to the terminal 911 via a terminal 922. For the same portions as those of the power storage device illustrated in FIG. 14A and FIG. 14B, a description of the power storage device illustrated in FIG. 14A and FIG. 14B can be referred to as appropriate.

The sensor 921 has a function of measuring, for example, displacement, position, speed, acceleration, angular velocity, rotational frequency, distance, light, liquid, magnetism, temperature, chemical substance, sound, time, hardness, electric field, electric current, voltage, electric power, radiation, flow rate, humidity, gradient, oscillation, odor, or infrared rays. With the sensor 921, for example, data on an environment (e.g., temperature) where the power storage device is placed can be sensed and stored in a memory inside the circuit 912.

Further structural examples of the secondary battery 913 are described with reference to FIG. 17 and FIG. 18.

Figure 17A:
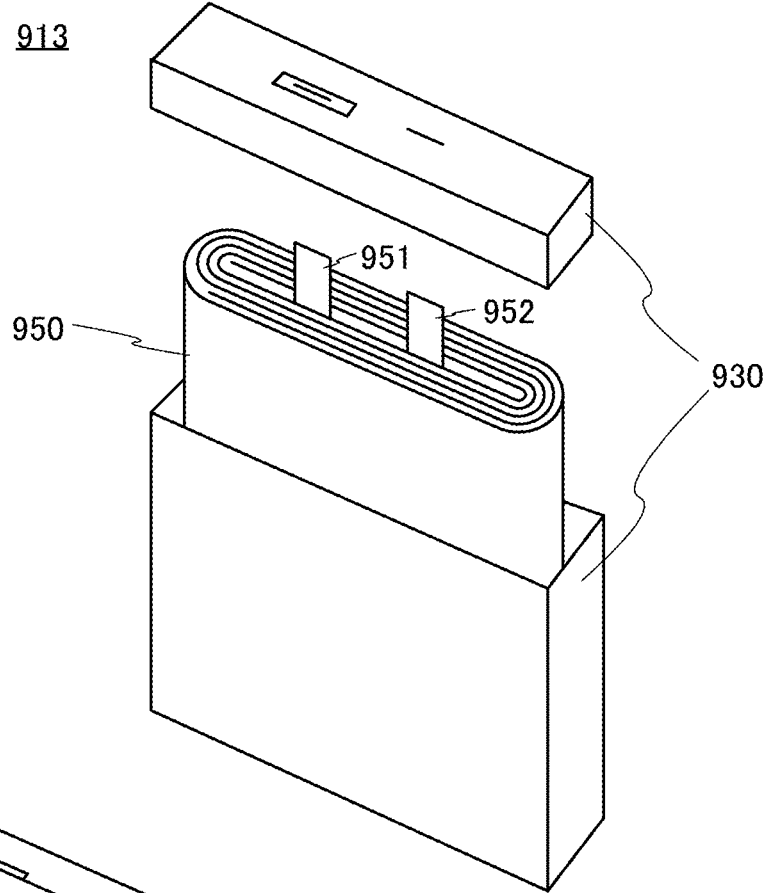
FIG. 17A and FIG. 17B are perspective views illustrating an example of a secondary battery.

The secondary battery 913 illustrated in FIG. 17A includes a wound body 950 provided with the terminal 951 and the terminal 952 inside a housing 930. The wound body 950 is soaked in an electrolyte solution inside the housing 930. The terminal 952 is in contact with the housing 930, and an insulator or the like inhibits contact between the terminal 951 and the housing 930. Note that in FIG. 17A, the housing 930 divided into two pieces is illustrated for convenience; however, in the actual structure, the wound body 950 is covered with the housing 930 and the terminal 951 and the terminal 952 extend to the outside of the housing 930. For the housing 930, a metal material (such as aluminum) or a resin material can be used.

Figure 17B:
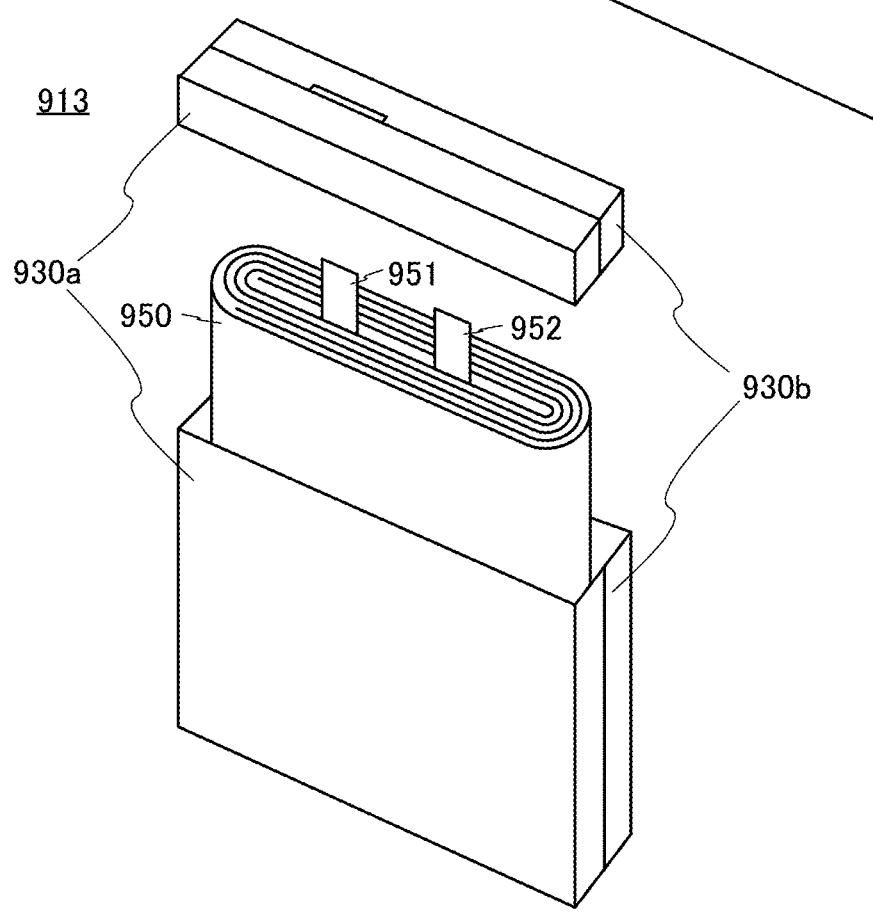

Note that as illustrated in FIG. 17B, the housing 930 in FIG. 17A may be formed using a plurality of materials. For example, in the secondary battery 913 in FIG. 17B, a housing 930a and a housing 930b are bonded to each other, and the wound body 950 is provided in a region surrounded by the housing 930a and the housing 930b.

For the housing 930a, an insulating material such as an organic resin can be used. In particular, when a material such as an organic resin is used for the side on which an antenna is formed, blocking of an electric field from the secondary battery 913 can be inhibited. When an electric field is not significantly blocked by the housing 930a, an antenna such as the antenna 914 and the antenna 915 may be provided inside the housing 930a. For the housing 930b, a metal material can be used, for example.

Figure 18:
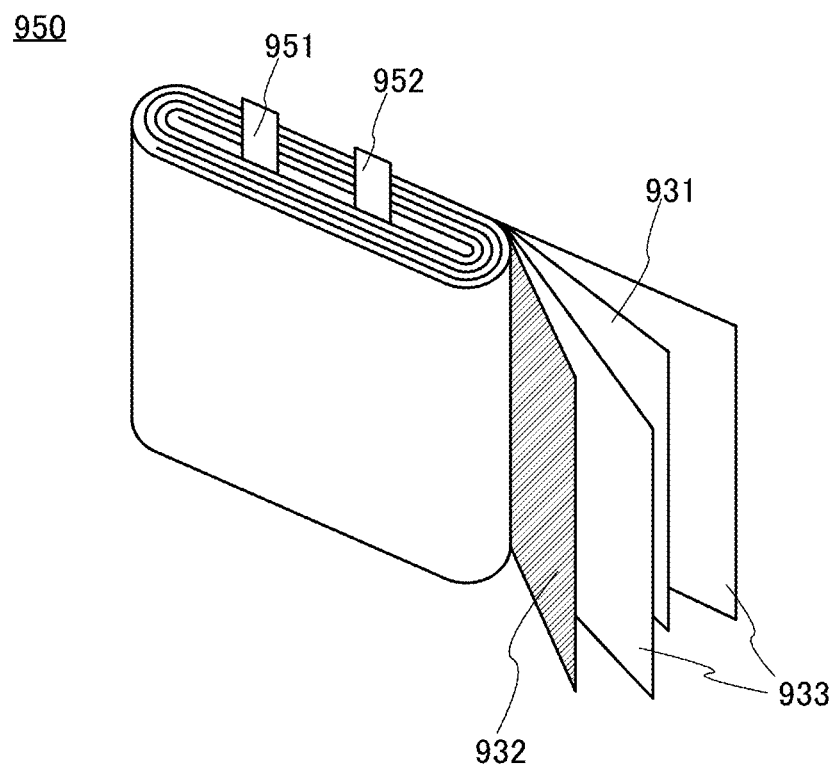
FIG. 18 is a perspective view illustrating an example of a secondary battery.

FIG. 18 illustrates the structure of the wound body 950. The wound body 950 includes a negative electrode 931, a positive electrode 932, and separators 933. The wound body 950 is obtained by winding a sheet of a stack in which the negative electrode 931 overlaps with the positive electrode 932 with the separator 933 provided therebetween. Note that a plurality of stacks each including the negative electrode 931, the positive electrode 932, and the separator 933 may be further stacked.

The negative electrode 931 is connected to the terminal 911 illustrated in FIG. 14 via one of the terminal 951 and the terminal 952. The positive electrode 932 is connected to the terminal 911 illustrated in FIG. 14 via the other of the terminal 951 and the terminal 952.

When the positive electrode active material particle described in the above embodiments is used in the positive electrode 932, the secondary battery 913 with little deterioration and high safety can be obtained.

[Laminated Secondary Battery]

Next, an example of a laminated secondary battery is described with reference to FIG. 19 to FIG. 24. When the laminated secondary battery has flexibility and is used in an electronic device at least part of which is flexible, the secondary battery can be bent as the electronic device is bent.

A laminated secondary battery 980 is described with reference to FIG. 19A to FIG. 19C. The laminated secondary battery 980 includes a wound body 993 illustrated in FIG. 19A. The wound body 993 includes a negative electrode 994, a positive electrode 995, and a separator 996. The wound body 993 is, like the wound body 950 illustrated in FIG. 18, obtained by winding a sheet of a stack in which the negative electrode 994 overlaps with the positive electrode 995 with the separator 996 therebetween.

Note that the number of stacks each including the negative electrode 994, the positive electrode 995, and the separator 996 may be determined as appropriate depending on capacity and an element volume which are required. The negative electrode 994 is connected to a negative electrode current collector (not illustrated) via one of a lead electrode 997 and a lead electrode 998, and the positive electrode 995 is connected to a positive electrode current collector (not illustrated) via the other of the lead electrode 997 and the lead electrode 998.

Figure 19A:
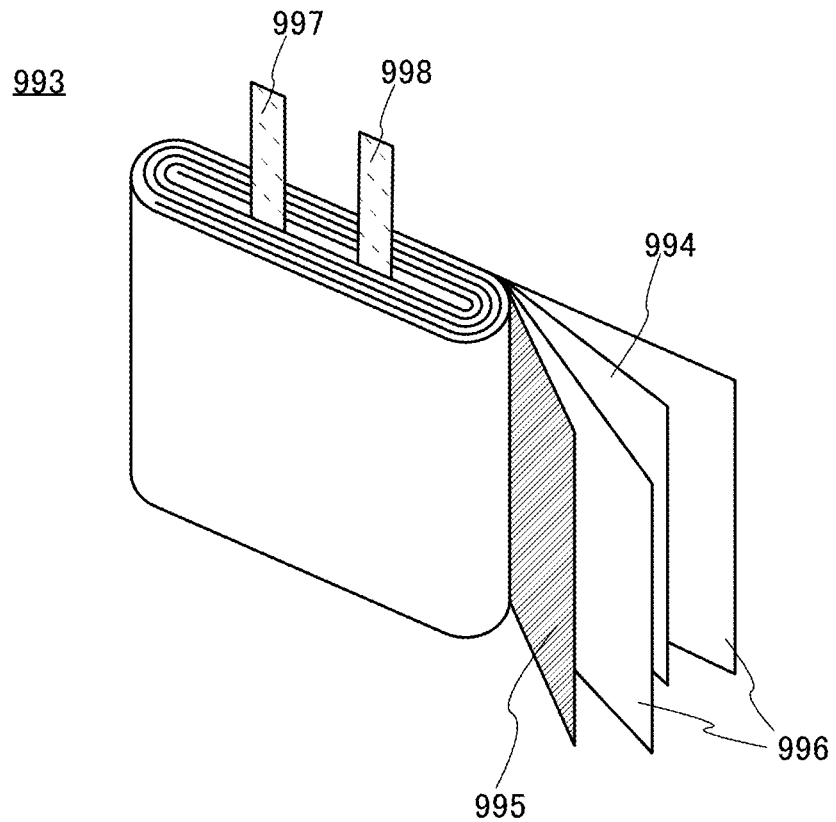
FIG. 19A, FIG. 19B, and FIG. 19C are perspective views illustrating a laminated secondary battery.
Figure 19B:
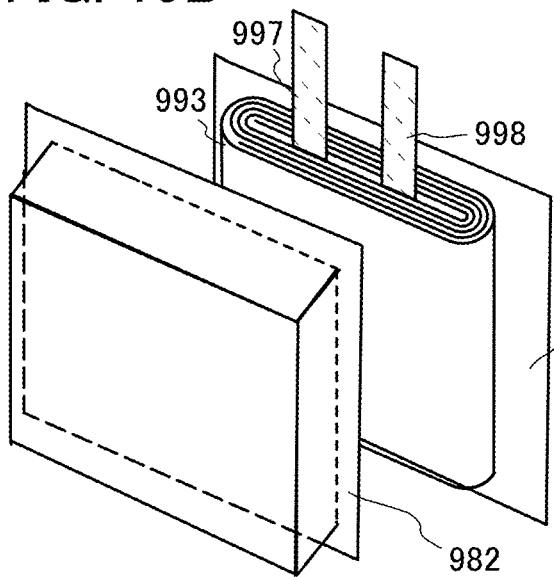
Figure 19C:
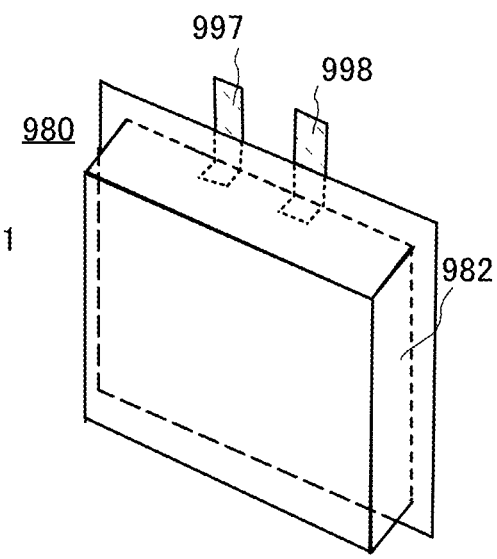

As illustrated in FIG. 19B, the wound body 993 is packed in a space formed by bonding a film 981 and a film 982 having a depressed portion that serve as exterior bodies by thermocompression bonding or the like, whereby the secondary battery 980 can be formed as illustrated in FIG. 19C. The wound body 993 includes the lead electrode 997 and the lead electrode 998, and is soaked in an electrolyte solution inside a space surrounded by the film 981 and the film 982 having a depressed portion.

For the film 981 and the film 982 having a depressed portion, a metal material such as aluminum or a resin material can be used, for example. With the use of a resin material for the film 981 and the film 982 having a depressed portion, the film 981 and the film 982 having a depressed portion can be changed in their forms when external force is applied; thus, a flexible storage battery can be formed.

Although FIG. 19B and FIG. 19C illustrate an example where a space is formed by two films, the wound body 993 may be placed in a space formed by bending one film.

When the positive electrode active material particle described in the above embodiments is used in the positive electrode 995, the secondary battery 980 with little deterioration and high safety can be obtained.

In FIG. 19A to FIG. 19C, an example in which the secondary battery 980 includes a wound body in a space formed by films serving as exterior bodies is described; however, as illustrated in FIG. 20, a secondary battery may include a plurality of strip-shaped positive electrodes, a plurality of strip-shaped separators, and a plurality of strip-shaped negative electrodes in a space formed by films serving as exterior bodies, for example.

Figure 20A:
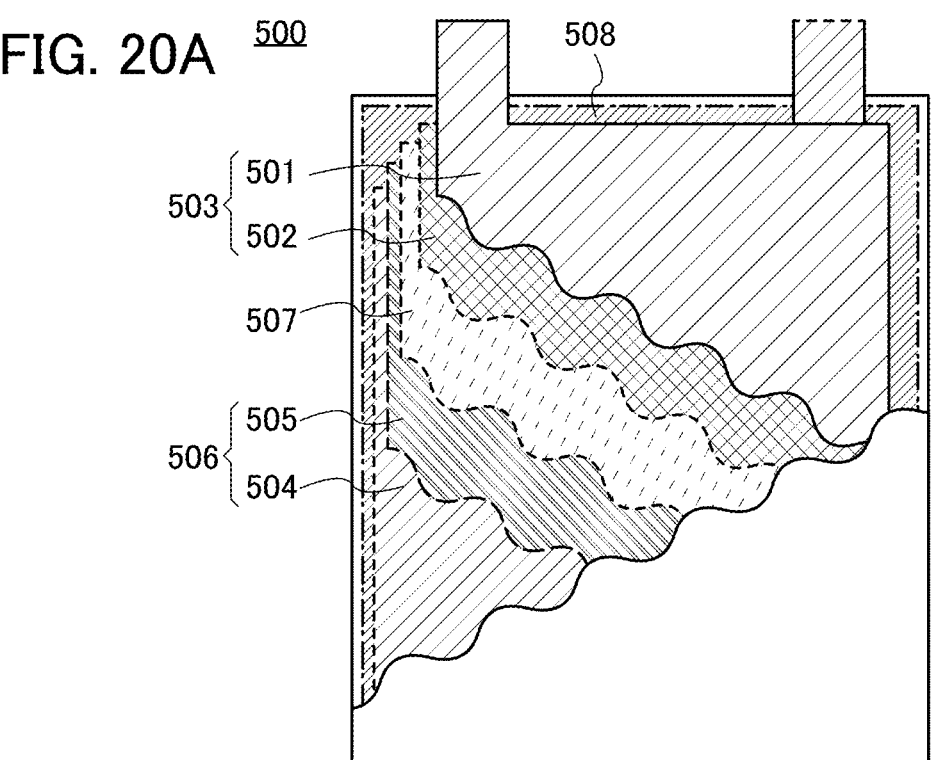
FIG. 20A is a top view illustrating a laminated secondary battery.

A laminated secondary battery 500 illustrated in FIG. 20A includes a positive electrode 503 including a positive electrode current collector 501 and a positive electrode active material layer 502, a negative electrode 506 including a negative electrode current collector 504 and a negative electrode active material layer 505, a separator 507, an electrolyte solution 508, and an exterior body 509. The separator 507 is provided between the positive electrode 503 and the negative electrode 506 in the exterior body 509. The exterior body 509 is filled with the electrolyte solution 508. The electrolyte solution described in Embodiment 4 can be used for the electrolyte solution 508.

In the laminated secondary battery 500 illustrated in FIG. 20A, the positive electrode current collector 501 and the negative electrode current collector 504 also serve as terminals for an electrical contact with an external portion. For this reason, the positive electrode current collector 501 and the negative electrode current collector 504 may be arranged so as to be partly exposed to the outside of the exterior body 509. Alternatively, without exposing the positive electrode current collector 501 and the negative electrode current collector 504 from the exterior body 509 to the outside, a lead electrode may be used, and the lead electrode and the positive electrode current collector 501 or the negative electrode current collector 504 may be bonded by ultrasonic welding so that the lead electrode is exposed to the outside.

As the exterior body 509 of the laminated secondary battery 500, for example, a laminate film having a three-layer structure can be employed in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided over the metal thin film as the outer surface of the exterior body.

Figure 20B:
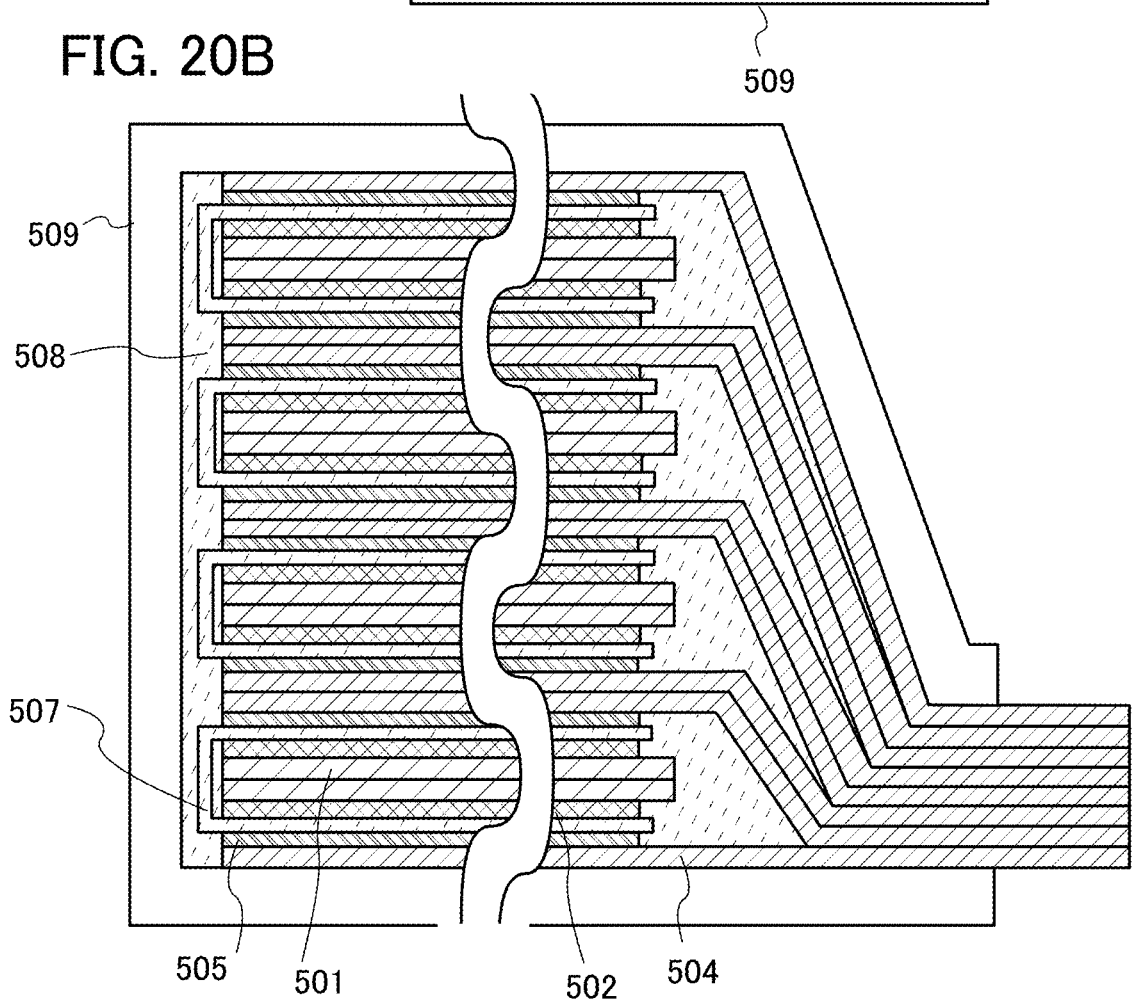
FIG. 20B is a cross-sectional view illustrating a laminated secondary battery.

FIG. 20B illustrates an example of a cross-sectional structure of the laminated secondary battery 500. Although FIG. 20A illustrates an example including only two current collectors for simplicity, an actual battery includes a plurality of electrode layers.

The example in FIG. 20B includes 16 electrode layers. The secondary battery 500 has flexibility even though the secondary battery 500 includes 16 electrode layers. FIG. 20B illustrates a structure including 8 layers of negative electrode current collectors 504 and 8 layers of positive electrode current collectors 501, i.e., 16 layers in total. Note that FIG. 20B illustrates a cross section of the extraction portion of the negative electrode, and the 8 negative electrode current collectors 504 are bonded to each other by ultrasonic welding. It is needless to say that the number of electrode layers is not limited to 16, and may be more than 16 or less than 16. With a large number of electrode layers, the secondary battery can have high capacity. With a small number of electrode layers, the secondary battery can have small thickness and high flexibility.

Figure 21:
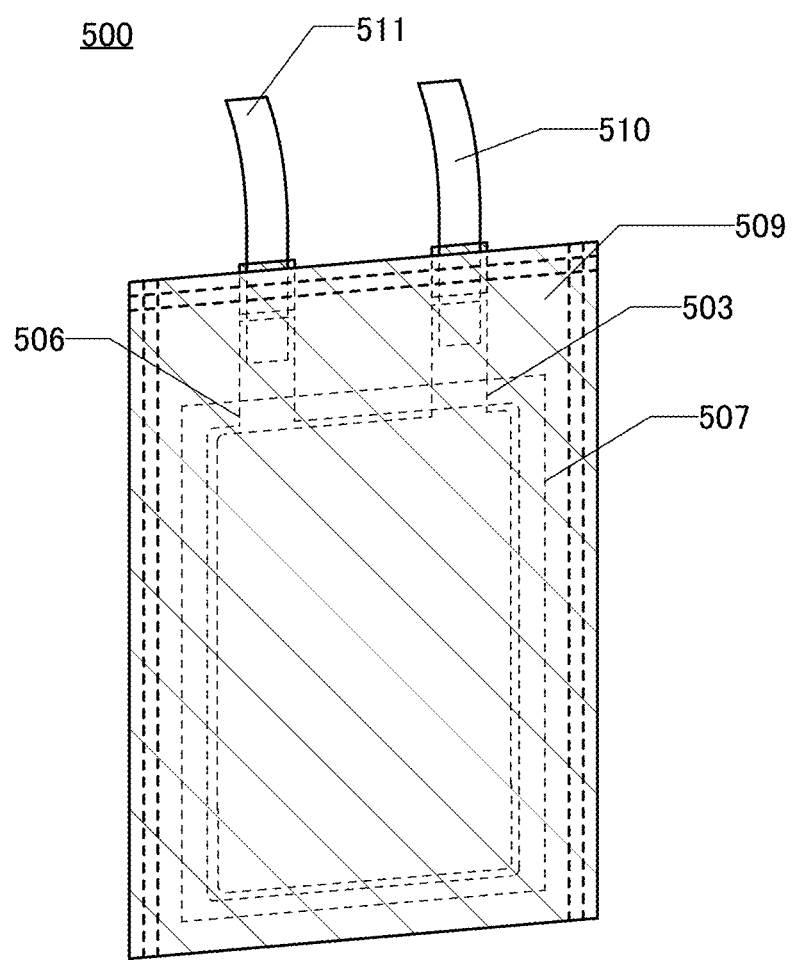
FIG. 21 is an external view of a secondary battery.
Figure 22:
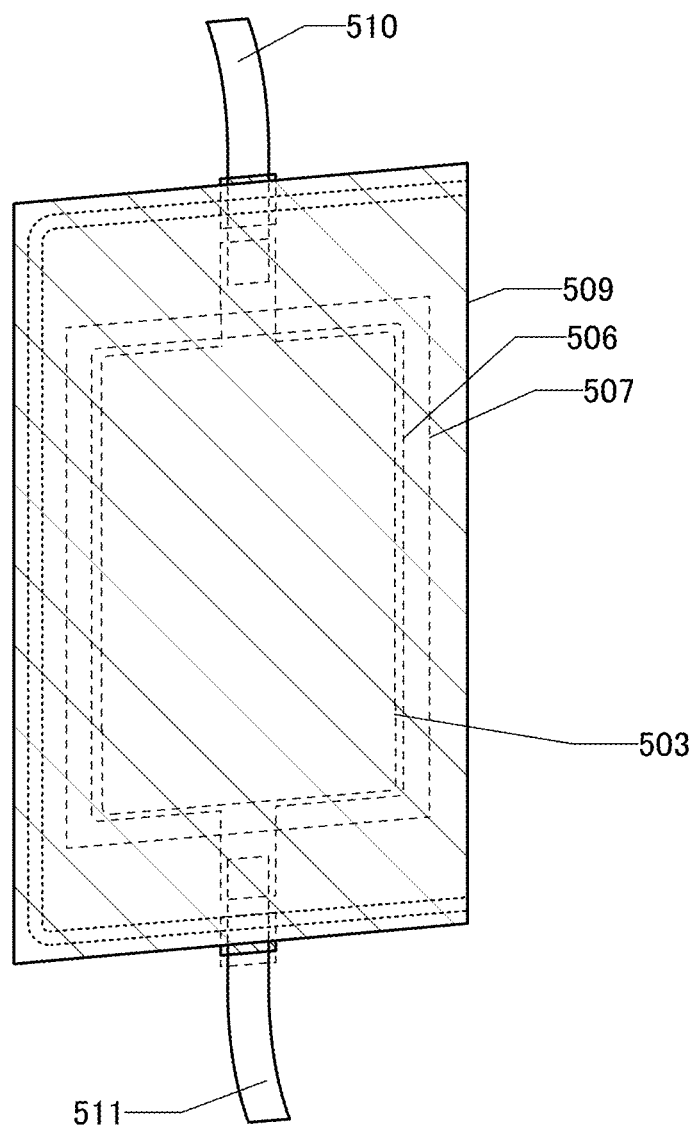
FIG. 22 is an external view of a secondary battery.

FIG. 21 and FIG. 22 each illustrate an example of the external view of the laminated secondary battery 500. In FIG. 21 and FIG. 22, the positive electrode 503, the negative electrode 506, the separator 507, the exterior body 509, a positive electrode lead electrode 510, and a negative electrode lead electrode 511 are included.

Figure 23A:
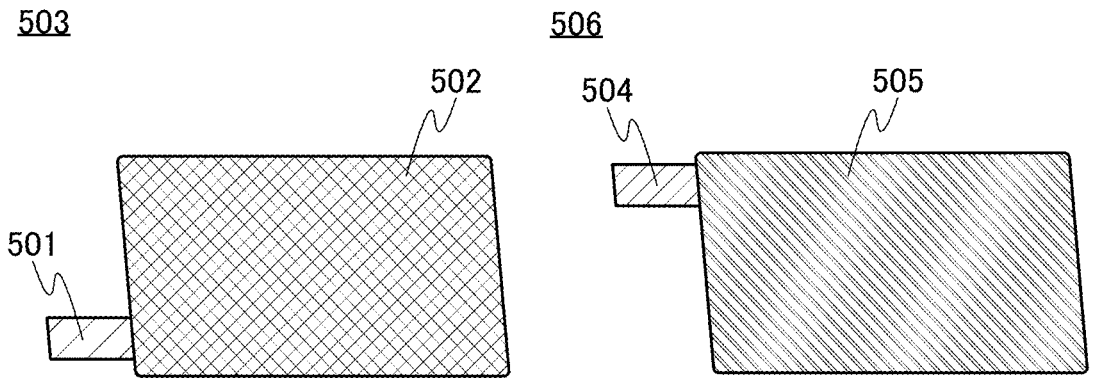
FIG. 23A, FIG. 23B, and FIG. 23C are diagrams illustrating a method for forming a secondary battery.

FIG. 23A illustrates external views of the positive electrode 503 and the negative electrode 506. The positive electrode 503 includes the positive electrode current collector 501, and the positive electrode active material layer 502 is formed on a surface of the positive electrode current collector 501. The positive electrode 503 also includes a region where the positive electrode current collector 501 is partly exposed (hereinafter referred to as a tab region). The negative electrode 506 includes the negative electrode current collector 504, and the negative electrode active material layer 505 is formed on a surface of the negative electrode current collector 504. The negative electrode 506 also includes a region where the negative electrode current collector 504 is partly exposed, that is, a tab region. The areas and the shapes of the tab regions included in the positive electrode and the negative electrode are not limited to those illustrated in FIG. 23A.

[Method for Forming Laminated Secondary Battery]

Figure 23B:
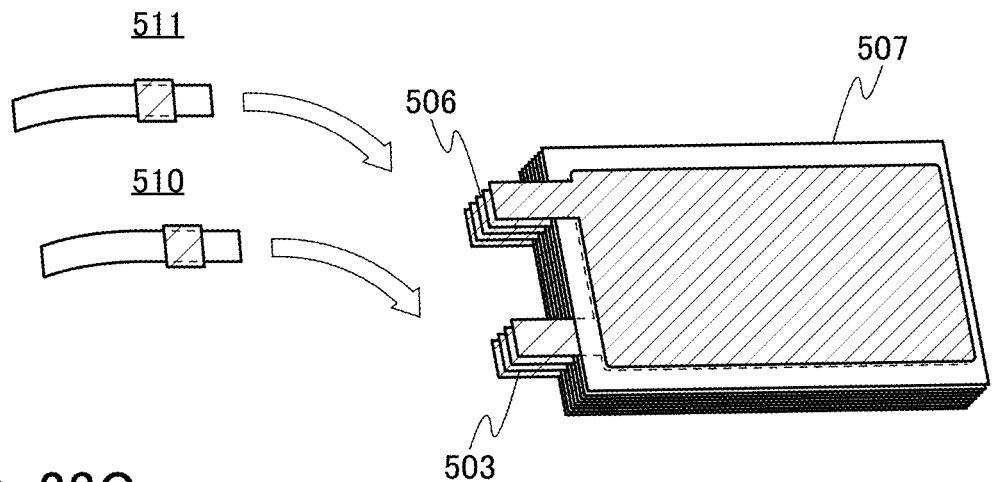

Here, an example of a method for forming the laminated secondary battery whose external view is illustrated in FIG. 21 is described with reference to FIG. 23B and FIG. 23C.

First, the negative electrode 506, the separator 507, and the positive electrode 503 are stacked. FIG. 23B illustrates a stack including the negative electrode 506, the separator 507, and the positive electrode 503. An example described here includes 5 pairs of negative electrodes and 4 pairs of positive electrodes. Next, the tab regions of the positive electrodes 503 are bonded to each other, and the positive electrode lead electrode 510 is bonded to the tab region of the positive electrode on the outermost surface. The bonding can be performed by ultrasonic welding, for example. In a similar manner, the tab regions of the negative electrodes 506 are bonded to each other, and the negative electrode lead electrode 511 is bonded to the tab region of the negative electrode on the outermost surface.

After that, the negative electrode 506, the separator 507, and the positive electrode 503 are placed over the exterior body 509.

Figure 23C:
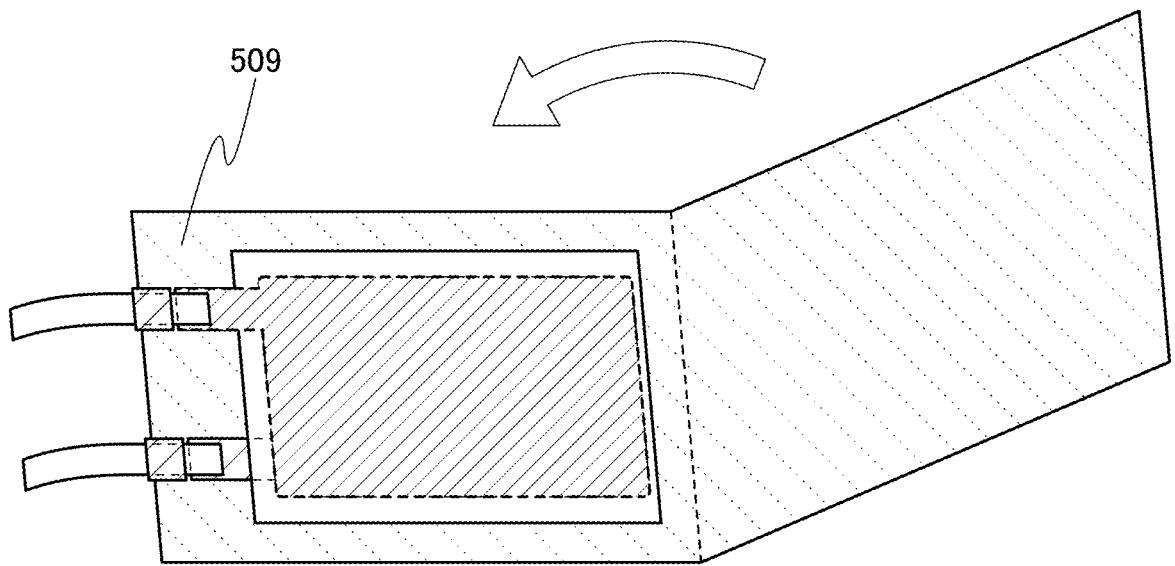

Subsequently, the exterior body 509 is folded along a dashed line as illustrated in FIG. 23C. Then, the outer edge of the exterior body 509 is bonded. The bonding can be performed by thermocompression bonding, for example. At this time, a part (or one side) of the exterior body 509 is left unbonded (to provide an inlet) so that the electrolyte solution 508 can be introduced later.

Next, the electrolyte solution 508 is introduced into the exterior body 509 from the inlet of the exterior body 509. The electrolyte solution 508 is preferably introduced in a reduced pressure atmosphere or in an inert atmosphere. Lastly, the inlet is bonded. In the above manner, the laminated secondary battery 500 can be formed.

When the positive electrode active material particle described in the above embodiments is used in the positive electrode 503, the secondary battery 500 with little deterioration and high safety can be obtained.

[Bendable Secondary Battery]

Next, an example of a bendable secondary battery is described with reference to FIG. 24 and FIG. 25.

Figure 24A:
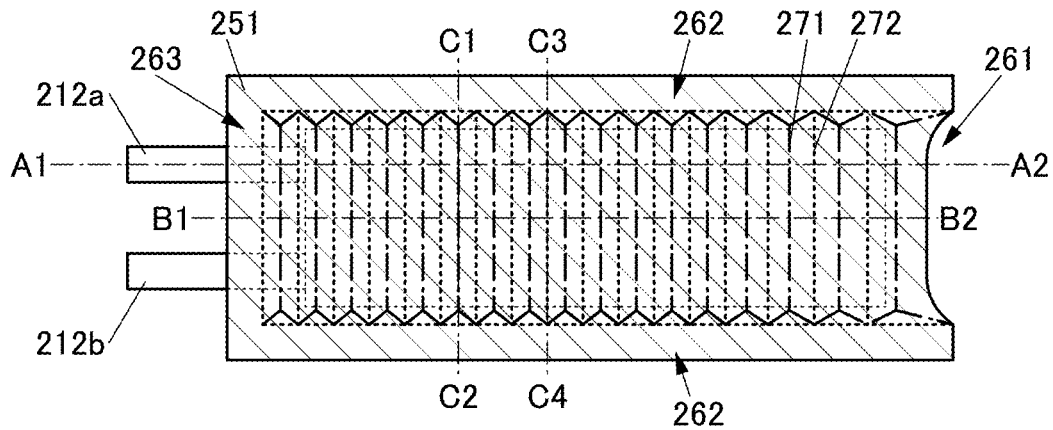
FIG. 24A is a top view of a bendable secondary battery.
Figure 24B:
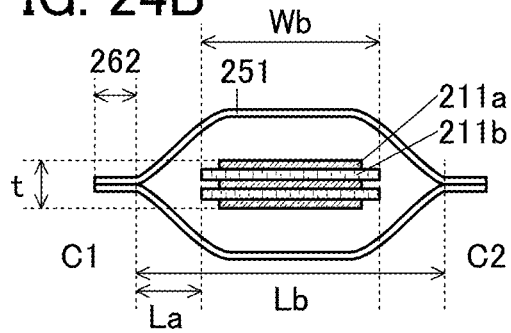
FIG. 24B, FIG. 24C, FIG. 24D, and FIG. 24E are cross-sectional views illustrating the secondary battery.
Figure 24C:
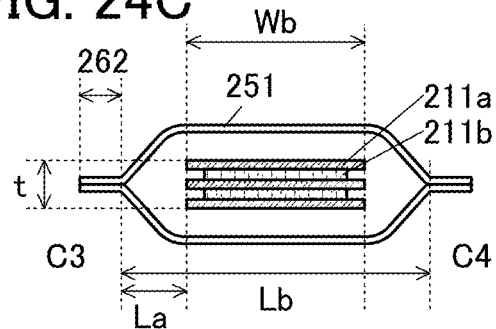
Figure 24D:
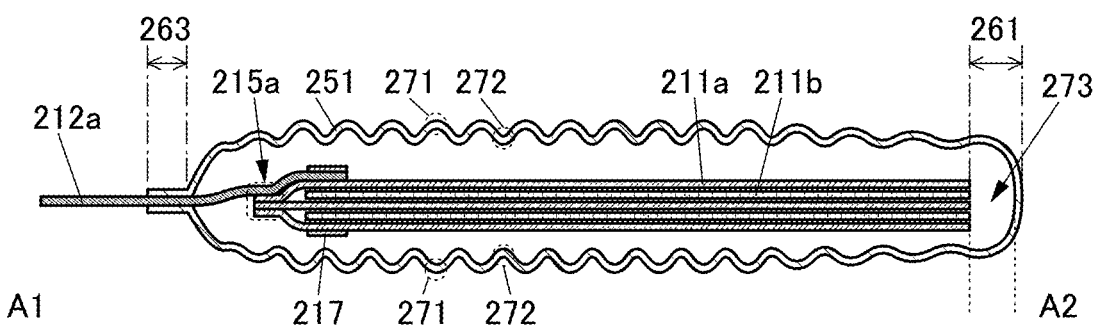

FIG. 24A is a schematic top view of a bendable battery 250. FIG. 24B, FIG. 24C, and FIG. 24D are schematic cross-sectional views taken along cutting line C1-C2, cutting line C3-C4, and cutting line A1-A2, respectively, in FIG. 24A. The battery 250 includes an exterior body 251, and a positive electrode 211a and a negative electrode 211b which are held in the exterior body 251. A lead 212a electrically connected to the positive electrode 211a and a lead 212b electrically connected to the negative electrode 211b are extended to the outside of the exterior body 251. In addition to the positive electrode 211a and the negative electrode 211b, an electrolyte solution (not illustrated) is enclosed in a region surrounded by the exterior body 251.

Figure 25A:
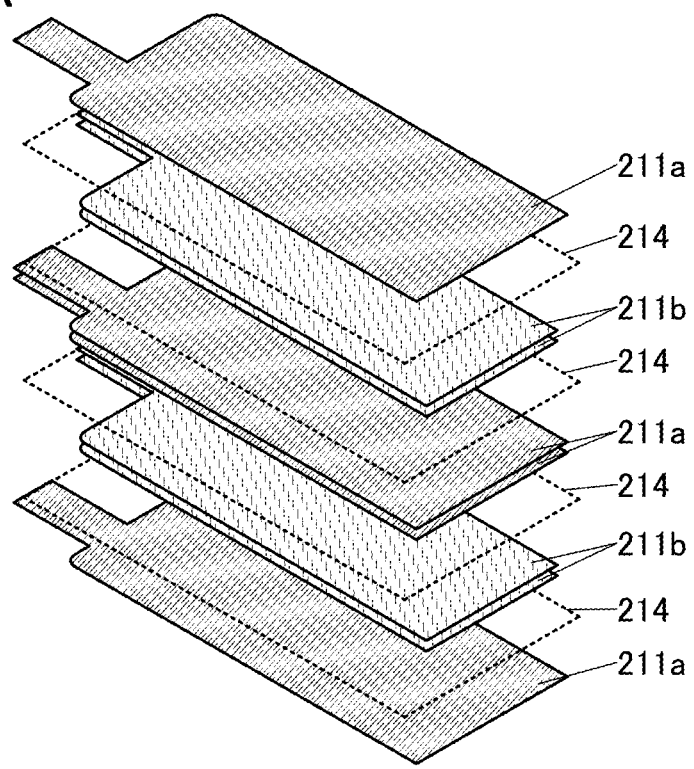
FIG. 25A and FIG. 25B are perspective views illustrating a bendable secondary battery.
Figure 25B:
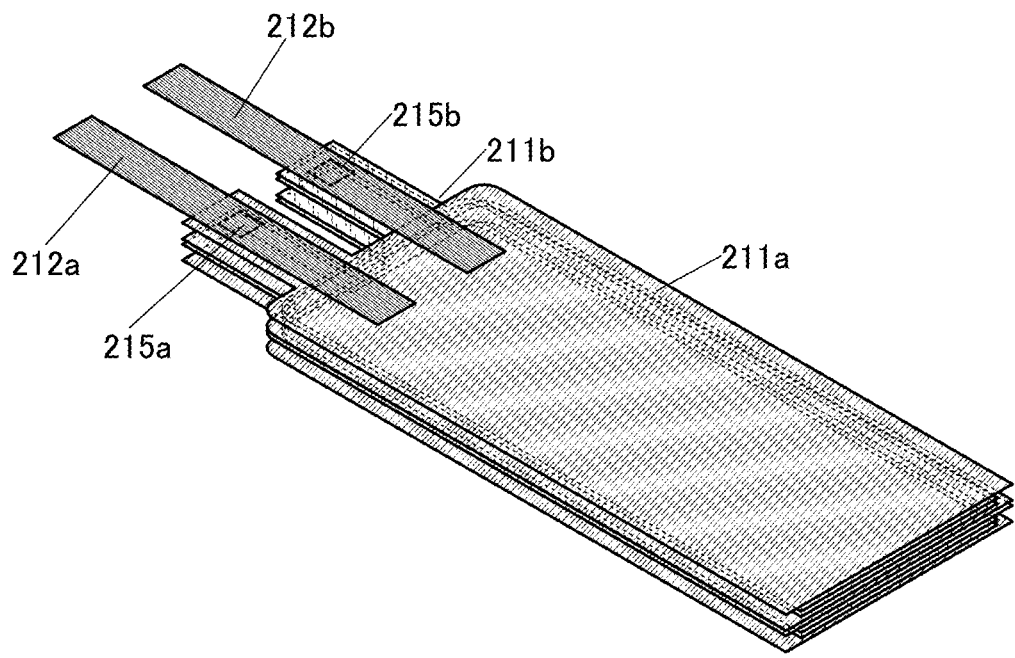

The positive electrode 211a and the negative electrode 211b included in the battery 250 are described with reference to FIG. 25. FIG. 25A is a perspective view illustrating the stacking order of the positive electrode 211a, the negative electrode 211b, and the separator 214. FIG. 25B is a perspective view illustrating the lead 212a and the lead 212b in addition to the positive electrode 211a and the negative electrode 211b.

As illustrated in FIG. 25A, the battery 250 includes a plurality of strip-shaped positive electrodes 211a, a plurality of strip-shaped negative electrodes 211b, and a plurality of separators 214. The positive electrode 211a and the negative electrode 211b each include a projected tab portion and a portion other than the tab. A positive electrode active material layer is formed on one surface of the positive electrode 211a other than the tab portion, and a negative electrode active material layer is formed on one surface of the negative electrode 211b other than the tab portion.

The positive electrodes 211a and the negative electrodes 211b are stacked so that surfaces of the positive electrodes 211a on each of which the positive electrode active material layer is not formed are in contact with each other and that surfaces of the negative electrodes 211b on each of which the negative electrode active material layer is not formed are in contact with each other.

Furthermore, the separator 214 is provided between the surface of the positive electrode 211a on which the positive electrode active material layer is formed and the surface of the negative electrode 211b on which the negative electrode active material layer is formed. In FIG. 25, the separator 214 is shown by a dotted line for easy viewing.

In addition, as illustrated in FIG. 25B, the plurality of positive electrodes 211a are electrically connected to the lead 212a in a bonding portion 215a. The plurality of negative electrodes 211b are electrically connected to the lead 212b in a bonding portion 215b.

Next, the exterior body 251 is described with reference to FIG. 24B, FIG. 24C, FIG. 24D, and FIG. 24E.

The exterior body 251 has a film-like shape and is folded in half with the positive electrodes 211a and the negative electrodes 211b between facing portions of the exterior body 251. The exterior body 251 includes a folded portion 261, a pair of seal portions 262, and a seal portion 263. The pair of seal portions 262 is provided with the positive electrodes 211a and the negative electrodes 211b positioned therebetween and thus can also be referred to as side seals. The seal portion 263 has portions overlapping with the lead 212a and the lead 212b and can also be referred to as a top seal.

Part of the exterior body 251 that overlaps with the positive electrodes 211a and the negative electrodes 211b preferably has a wave shape in which crest lines 271 and trough lines 272 are alternately arranged. The seal portions 262 and the seal portion 263 of the exterior body 251 are preferably flat.

FIG. 24B shows a cross section cut along the part overlapping with the crest line 271. FIG. 24C shows a cross section cut along the part overlapping with the trough line 272. FIG. 24B and FIG. 24C correspond to cross sections of the battery 250, the positive electrodes 211a, and the negative electrodes 211b in the width direction.

Here, the distance between an end portion of the negative electrode 211b in the width direction, that is, the end portion of the negative electrode 211b, and the seal portion 262 is referred to as a distance La. When the battery 250 changes in shape such as bending, the positive electrode 211a and the negative electrode 211b change in shape such that the positions thereof are shifted from each other in the length direction as described later. At the time, if the distance La is too short, the exterior body 251 and the positive electrode 211a and the negative electrode 211b are rubbed hard against each other, so that the exterior body 251 is damaged in some cases. In particular, when a metal film of the exterior body 251 is exposed, there is concern that the metal film is corroded by the electrolyte solution. Thus, the distance La is preferably set as long as possible. However, a too long distance La increases the volume of the battery 250.

The distance La between the negative electrode 211b and the seal portion 262 is preferably increased as the total thickness of the stacked positive electrodes 211a and negative electrodes 211b is increased.

More specifically, when the total thickness of the stacked positive electrodes 211a and negative electrodes 211b is referred to as a thickness t, the distance La is preferably 0.8 times or more and 3.0 times or less, further preferably 0.9 times or more and 2.5 times or less, and still further preferably 1.0 times or more and 2.0 times or less as large as the thickness t. When the distance La is in this range, a compact battery which is highly reliable for bending can be obtained.

Furthermore, when the distance between the pair of seal portions 262 is referred to as a distance Lb, it is preferable that the distance Lb be sufficiently longer than the width of the positive electrode 211a and the negative electrode 211b (here, a width Wb of the negative electrode 211b). In this case, even when the positive electrode 211a and the negative electrode 211b come into contact with the exterior body 251 by change in the shape of the battery 250 such as repeated bending, the position of part of the positive electrode 211a and the negative electrode 211b can be shifted in the width direction; thus, the positive electrode 211a and the negative electrode 211b and the exterior body 251 can be effectively prevented from being rubbed against each other.

For example, the difference between the distance Lb between the pair of seal portions 262 and the width Wb of the negative electrode 211b is preferably 1.6 times or more and 6.0 times or less, further preferably 1.8 times or more and 5.0 times or less, and still further preferably 2.0 times or more and 4.0 times or less as large as the total thickness t of the positive electrode 211a and the negative electrode 211b.

In other words, the distance Lb, the width Wb, and the thickness t preferably satisfy the relation of the following Formula 1.

[Formula 1]

$$\frac{Lb - Wb}{2t} \geq a \quad \text{(Formula 1)}$$

In the formula, a is 0.8 or more and 3.0 or less, preferably 0.9 or more and 2.5 or less, and further preferably 1.0 or more and 2.0 or less.

FIG. 24D illustrates a cross section including the lead 212a and corresponds to a cross section of the battery 250, the positive electrode 211a, and the negative electrode 211b in the length direction. As illustrated in FIG. 24D, in the folded portion 261, a space 273 is preferably provided between end portions of the positive electrode 211a and the negative electrode 211b in the length direction and the exterior body 251.

Figure 24E:
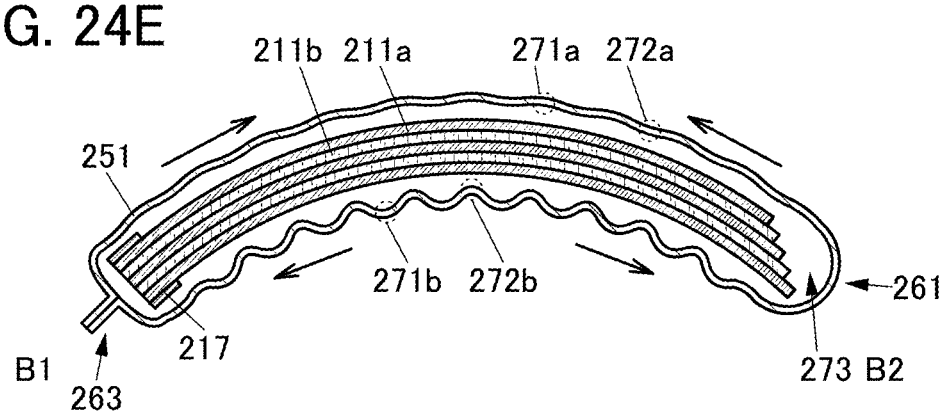

FIG. 24E is a schematic cross-sectional view of the battery 250 that is bent. FIG. 24E corresponds to a cross section along cutting line B1-B2 in FIG. 24A.

When the battery 250 is bent, a part of the exterior body 251 positioned on the outer side in bending is stretched and the other part positioned on the inner side changes in shape as it shrinks. More specifically, the part of the exterior body 251 positioned on the outer side changes in shape such that the wave amplitude becomes smaller and the length of the wave period becomes larger. In contrast, the part of the exterior body 251 positioned on the inner side changes in shape such that the wave amplitude becomes larger and the length of the wave period becomes smaller. When the exterior body 251 changes in shape in this manner, stress applied to the exterior body 251 due to bending is relieved, so that a material itself that forms the exterior body 251 does not need to expand and contract. As a result, the battery 250 can be bent with weak force without damage to the exterior body 251.

Furthermore, as illustrated in FIG. 24E, when the battery 250 is bent, the positions of the positive electrode 211a and the negative electrode 211b are shifted relatively. At this time, ends of the stacked positive electrodes 211a and negative electrodes 211b on the seal portion 263 side are fixed by a fixing member 217; thus, the plurality of positive electrodes 211a and the plurality of negative electrodes 211b are more shifted at a position closer to the folded portion 261. Therefore, stress applied to the positive electrode 211a and the negative electrode 211b is relieved, and the positive electrode 211a and the negative electrode 211b themselves do not need to expand and contract. As a result, the battery 250 can be bent without damage to the positive electrode 211a and the negative electrode 211b.

Furthermore, the space 273 provided between the positive electrode 211a and the negative electrode 211b and the exterior body 251 enables the positive electrode 211a and the negative electrode 211b located on an inner side to be shifted relatively without being in contact with the exterior body 251 when the battery 250 is bent.

In the battery 250 illustrated in FIG. 24 and FIG. 25, the exterior body, the positive electrode 211a, and the negative electrode 211b are less likely to be damaged and the battery characteristics are less likely to deteriorate even when the battery 250 is repeatedly bent and unbent. When the positive electrode active material particle described in the above embodiments is used for the positive electrode 211a included in the battery 250, a secondary battery with little deterioration and high safety can be obtained.

Embodiment 6

In this embodiment, examples of electronic devices including the secondary battery of one embodiment of the present invention are described.

First, FIG. 26 shows examples of electronic devices including the bendable secondary battery described in Embodiment 4. Examples of an electronic device including a bendable secondary battery include television sets (also referred to as televisions or television receivers), monitors of computers or the like, digital cameras, digital video cameras, digital photo frames, mobile phones (also referred to as cellular phones or mobile phone devices), portable game machines, portable information terminals, audio reproducing devices, and large game machines such as pachinko machines.

In addition, a flexible secondary battery can be incorporated along a curved inside/outside wall surface of a house or a building or a curved interior/exterior surface of an automobile.

Figure 26A:
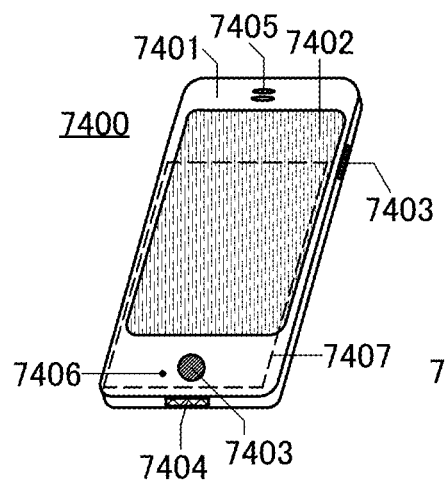
FIG. 26A and FIG. 26B are perspective views illustrating an example of an electronic device.

FIG. 26A illustrates an example of a mobile phone. A mobile phone 7400 is provided with a display portion 7402 incorporated in a housing 7401, an operation button 7403, an external connection port 7404, a speaker 7405, a microphone 7406, and the like. Note that the mobile phone 7400 includes a secondary battery 7407.

Figure 26B:
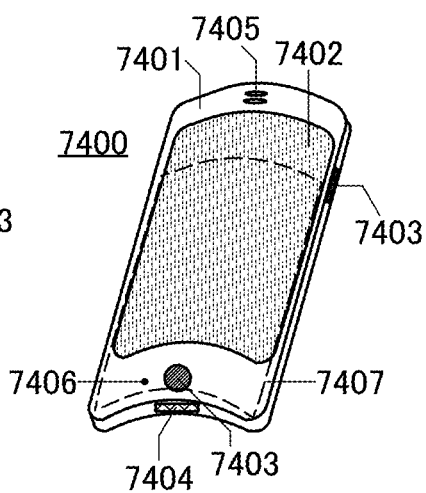
Figure 26C:
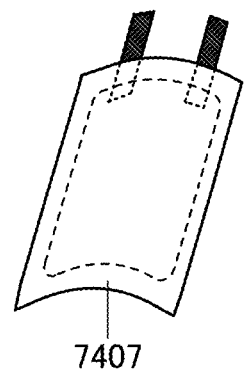
FIG. 26C is a perspective view of a secondary battery.

FIG. 26B illustrates the mobile phone 7400 that is bent. When the whole mobile phone 7400 is curved by external force, the secondary battery 7407 included in the mobile phone 7400 is also curved. FIG. 26C illustrates the curved secondary battery 7407. The secondary battery 7407 is a thin secondary battery. The secondary battery 7407 is curved and fixed. Note that the secondary battery 7407 includes a lead electrode electrically connected to a current collector.

Figure 26D:
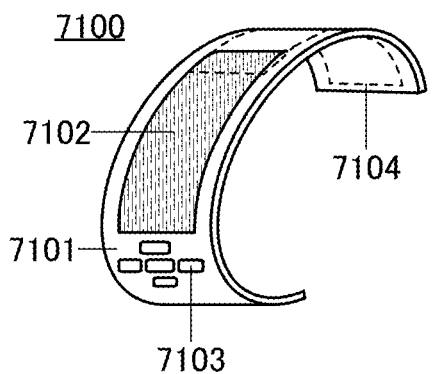
FIG. 26D is a diagram illustrating an example of an electronic device.
Figure 26E:
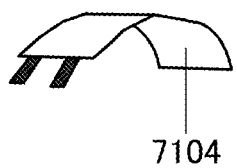
FIG. 26E is a perspective view of a secondary battery.

FIG. 26D illustrates an example of a bangle display device. A portable display device 7100 includes a housing 7101, a display portion 7102, an operation button 7103, and a secondary battery 7104. FIG. 26E illustrates the bent secondary battery 7104. When the curved secondary battery 7104 is on a user's arm, the housing changes its form and the curvature of a part or the whole of the secondary battery 7104 is changed. Note that the radius of curvature of a curve at a point refers to the radius of the circular arc that best approximates the curve at that point, and the reciprocal of the radius of curvature is referred to as a curvature. Specifically, part or the whole of the housing or the main surface of the secondary battery 7104 is changed in the range of radius of curvature from 40 mm to 150 mm. When the radius of curvature at the main surface of the secondary battery 7104 is greater than or equal to 40 mm and less than or equal to 150 mm, the reliability can be kept high.

Figure 26F:
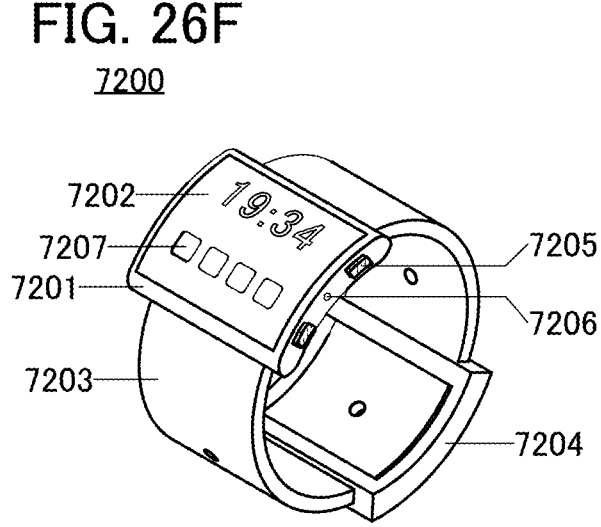
FIG. 26F and FIG. 26G are diagrams illustrating examples of electronic devices.

FIG. 26F illustrates an example of a watch-type portable information terminal. A portable information terminal 7200 includes a housing 7201, a display portion 7202, a band 7203, a buckle 7204, an operation button 7205, an input output terminal 7206, and the like.

The portable information terminal 7200 is capable of executing a variety of applications such as mobile phone calls, e-mailing, viewing and editing texts, music reproduction, Internet communication, and a computer game.

The display surface of the display portion 7202 is curved, and images can be displayed on the curved display surface. In addition, the display portion 7202 includes a touch sensor, and operation can be performed by touching the screen with a finger, a stylus, or the like. For example, by touching an icon 7207 displayed on the display portion 7202, application can be started.

With the operation button 7205, a variety of functions such as time setting, power on/off, on/off of wireless communication, setting and cancellation of a silent mode, and setting and cancellation of a power saving mode can be performed. For example, the functions of the operation button 7205 can be set freely by setting the operating system incorporated in the portable information terminal 7200.

The portable information terminal 7200 can employ near field communication that is standardized communication. For example, mutual communication between the portable information terminal 7200 and a headset capable of wireless communication can be performed, and thus hands-free calling is possible.

Moreover, the portable information terminal 7200 includes the input output terminal 7206, and data can be directly transmitted to and received from another information terminal via a connector. In addition, charging via the input output terminal 7206 is possible. Note that the charging operation may be performed by wireless power feeding without using the input output terminal 7206.

The display portion 7202 of the portable information terminal 7200 includes the secondary battery of one embodiment of the present invention. For example, the secondary battery 7104 illustrated in FIG. 26E can be provided in the housing 7201 while being curved, or can be provided in the band 7203 such that it can be curved.

The portable information terminal 7200 preferably includes a sensor. As the sensor, for example, a human body sensor such as a fingerprint sensor, a pulse sensor, or a temperature sensor, a touch sensor, a pressure sensitive sensor, an acceleration sensor, or the like is preferably mounted.

Figure 26G:
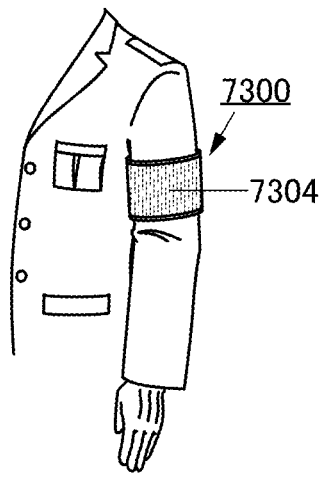

FIG. 26G illustrates an example of an armband display device. A display device 7300 includes a display portion 7304 and the secondary battery of one embodiment of the present invention. The display device 7300 can include a touch sensor in the display portion 7304 and can serve as a portable information terminal.

The display surface of the display portion 7304 is bent, and images can be displayed on the bent display surface. In addition, the display state of the display device 7300 can be changed by, for example, near field communication that is standardized communication, or the like.

The display device 7300 includes an input output terminal, and data can be directly transmitted to and received from another information terminal via a connector. In addition, charging via the input output terminal is possible. Note that the charging operation may be performed by wireless power feeding without using the input output terminal.

Figure 27A:
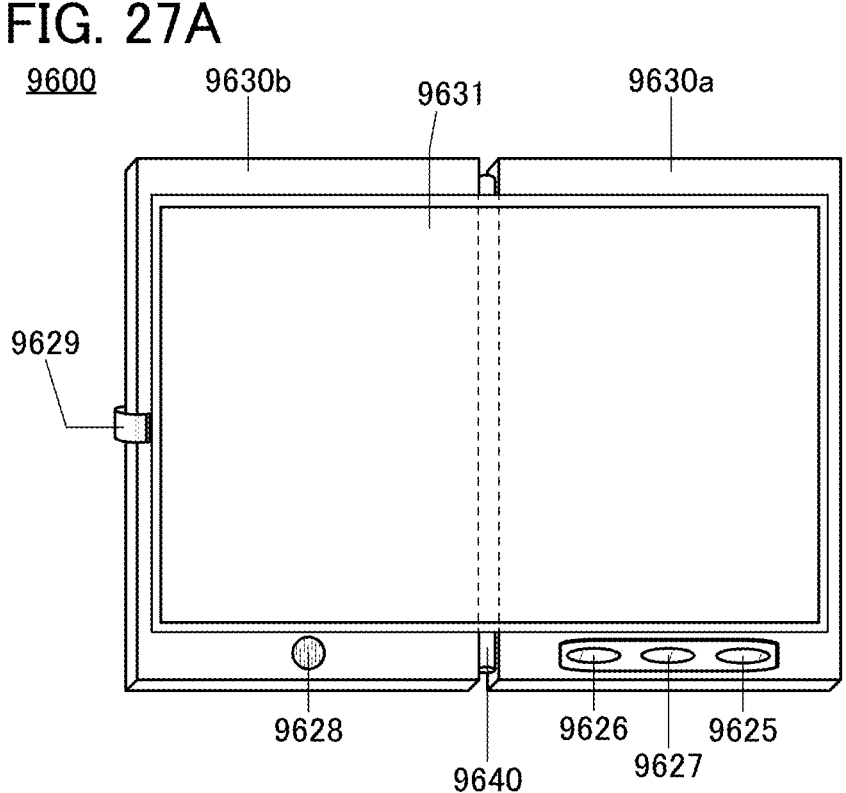
FIG. 27A and FIG. 27B are top views illustrating an example of an electronic device.
Figure 27B:
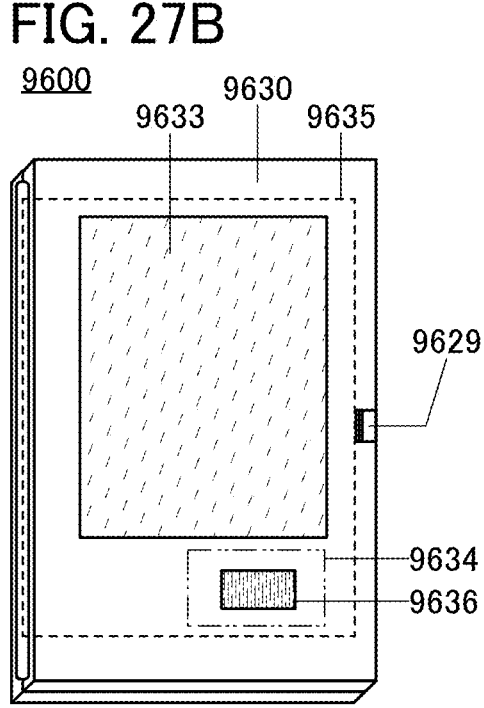

Next, FIG. 27A and FIG. 27B illustrate an example of a foldable tablet terminal. A tablet terminal 9600 illustrated in FIG. 27A and FIG. 27B includes a housing 9630a, a housing 9630b, a movable portion 9640 connecting the housing 9630a and the housing 9630b, a display portion 9631, a display mode changing switch 9626, a power switch 9627, a power saving mode changing switch 9625, a fastener 9629, and an operation switch 9628. A flexible panel is used for the display portion 9631, whereby a tablet terminal with a larger display portion can be provided. FIG. 27A illustrates the tablet terminal 9600 that is opened, and FIG. 27B illustrates the tablet terminal 9600 that is closed.

The tablet terminal 9600 includes a power storage unit 9635 inside the housing 9630a and the housing 9630b. The power storage unit 9635 is provided across the housing 9630a and the housing 9630b, passing through the movable portion 9640.

Part of the display portion 9631 can be a touch panel region and data can be input when a displayed operation key is touched. When a position where a keyboard display switching button is displayed on the touch panel is touched with a finger, a stylus, or the like, keyboard buttons can be displayed on the display portion 9631.

The display mode switch 9626 can switch the display between a portrait mode and a landscape mode, and between monochrome display and color display, for example. The power saving mode changing switch 9625 can control display luminance in accordance with the amount of external light in use of the tablet terminal 9600, which is measured with an optical sensor incorporated in the tablet terminal 9600. Another detection device including a sensor for detecting inclination, such as a gyroscope sensor or an acceleration sensor, may be incorporated in the tablet terminal, in addition to the optical sensor.

The tablet terminal is closed in FIG. 27B. The tablet terminal includes the housing 9630, a solar cell 9633, and a charge and discharge control circuit 9634 including a DC-DC converter 9636. The secondary battery of one embodiment of the present invention is used as the power storage unit 9635.

The tablet terminal 9600 can be folded such that the housing 9630a and the housing 9630b overlap with each other when not in use. By the folding, the display portion 9631 can be protected, which increases the durability of the tablet terminal 9600. Since the power storage unit 9635 using the secondary battery of one embodiment of the present invention has high capacity and excellent cycle performance, the tablet terminal which can be used for a long time for a long period can be provided.

The tablet terminal illustrated in FIG. 27A and FIG. 27B can also have a function of displaying various kinds of data (e.g., a still image, a moving image, and a text image), a function of displaying a calendar, a date, or the time on the display portion, a touch-input function of operating or editing data displayed on the display portion by touch input, a function of controlling processing by various kinds of software (programs), and the like.

The solar cell 9633, which is attached on the surface of the tablet terminal, supplies electric power to a touch panel, a display portion, an image signal processor, and the like. Note that the solar cell 9633 can be provided on one or both surfaces of the housing 9630 and the power storage unit 9635 can be charged efficiently.

Figure 27C:
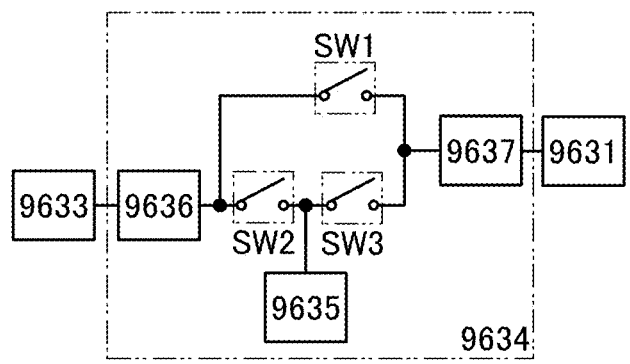
FIG. 27C is a block diagram.

The structure and operation of the charge and discharge control circuit 9634 illustrated in FIG. 27B are described with reference to a block diagram in FIG. 27C. The solar cell 9633, the power storage unit 9635, the DC-DC converter 9636, a converter 9637, switches SW1 to SW3, and the display portion 9631 are illustrated in FIG. 27C, and the power storage unit 9635, the DC-DC converter 9636, the converter 9637, and the switches SW1 to SW3 correspond to the charge and discharge control circuit 9634 in FIG. 27B.

First, an example of the operation in the case where power is generated by the solar cell 9633 using external light is described. The voltage of electric power generated by the solar cell is raised or lowered by the DC-DC converter 9636 to a voltage for charging the power storage unit 9635. When the power from the solar cell 9633 is used for the operation of the display portion 9631, the switch SW1 is turned on and the voltage of the power is raised or lowered by the converter 9637 to a voltage needed for operating the display portion 9631. When display on the display portion 9631 is not performed, the switch SW1 is turned off and the switch SW2 is turned on, so that the power storage unit 9635 can be charged.

Note that the solar cell 9633 is described as an example of a power generation means; however, one embodiment of the present invention is not limited to this example. The power storage unit 9635 may be charged using another power generation means such as a piezoelectric element or a thermoelectric conversion element (Peltier element). For example, the power storage unit 9635 may be charged with a non-contact power transmission module that transmits and receives power wirelessly (without contact) to charge the battery or with a combination of other charging means.

Figure 28:
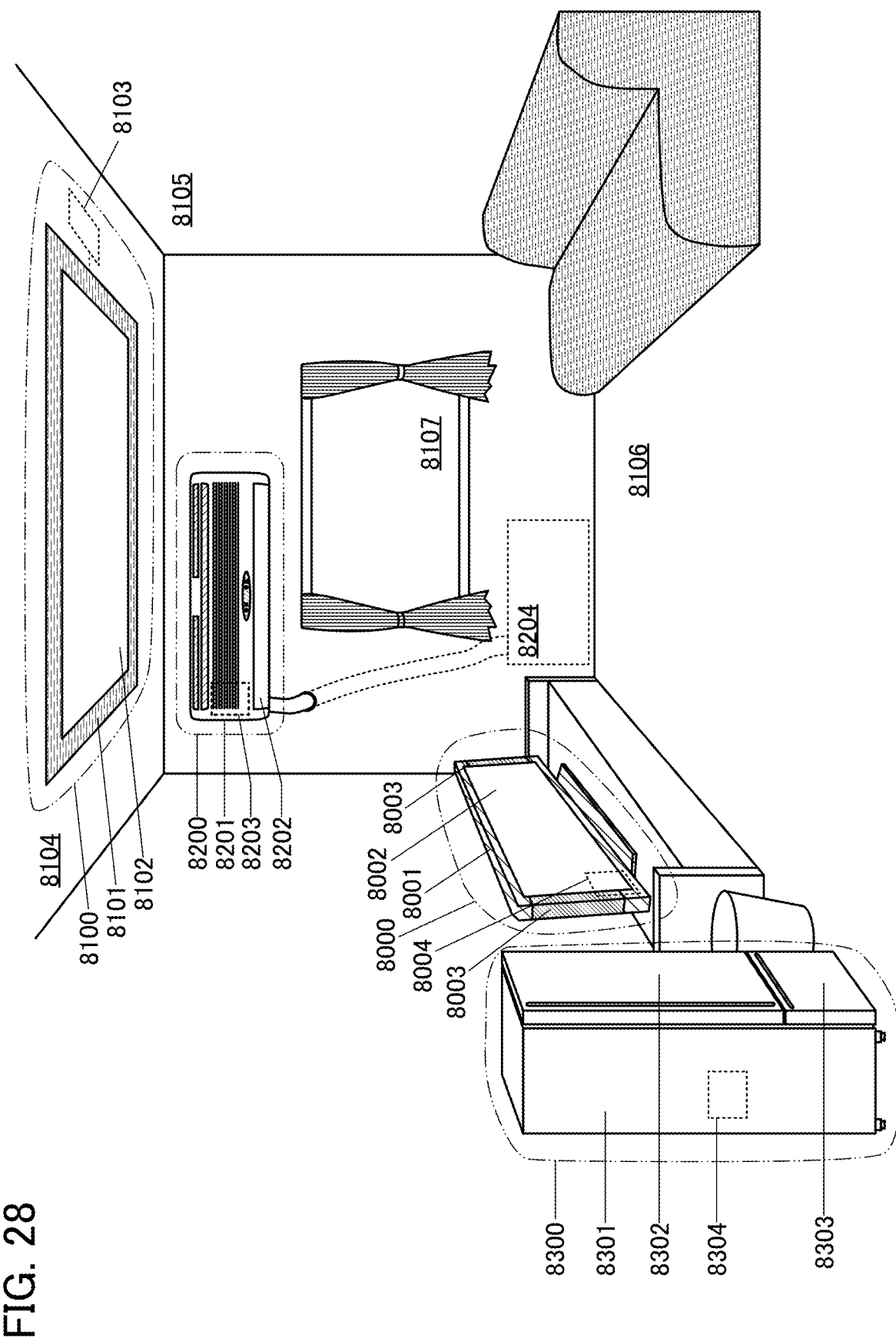
FIG. 28 is a diagram illustrating examples of electronic devices.

FIG. 28 illustrates other examples of electronic devices. In FIG. 28, a display device 8000 is an example of an electronic device using a secondary battery 8004 of one embodiment of the present invention. Specifically, the display device 8000 corresponds to a display device for TV broadcast reception and includes a housing 8001, a display portion 8002, speaker portions 8003, the secondary battery 8004, and the like. The secondary battery 8004 of one embodiment of the present invention is provided in the housing 8001. The display device 8000 can receive electric power from a commercial power supply, or use electric power stored in the secondary battery 8004. Thus, the display device 8000 can operate with the use of the secondary battery 8004 of one embodiment of the present invention as an uninterruptible power supply even when electric power cannot be supplied from a commercial power supply due to power failure or the like.

A semiconductor display device such as a liquid crystal display device, a light-emitting device in which a light-emitting element such as an organic EL element is provided in each pixel, an electrophoretic display device, a DMD (Digital Micromirror Device), a PDP (Plasma Display Panel), or an FED (Field Emission Display) can be used for the display portion 8002.

Note that the display device includes, in its category, all of information display devices for personal computers, advertisement displays, and the like other than TV broadcast reception.

In FIG. 28, an installation lighting device 8100 is an example of an electronic device using a secondary battery 8103 of one embodiment of the present invention. Specifically, the lighting device 8100 includes a housing 8101, a light source 8102, the secondary battery 8103, and the like. Although FIG. 28 illustrates the case where the secondary battery 8103 is provided in a ceiling 8104 on which the housing 8101 and the light source 8102 are installed, the secondary battery 8103 may be provided in the housing 8101. The lighting device 8100 can receive electric power from a commercial power supply, or use electric power stored in the secondary battery 8103. Thus, the lighting device 8100 can operate with the use of the secondary battery 8103 of one embodiment of the present invention as an uninterruptible power supply even when electric power cannot be supplied from a commercial power supply due to power failure or the like.

Note that although the installation lighting device 8100 provided in the ceiling 8104 is illustrated in FIG. 28 as an example, the secondary battery of one embodiment of the present invention can be used for an installation lighting device provided in, for example, a sidewall 8105, a floor 8106, a window 8107, or the like other than the ceiling 8104, or can be used in a tabletop lighting device or the like.

As the light source 8102, an artificial light source which emits light artificially by using power can be used. Specifically, an incandescent lamp, a discharge lamp such as a fluorescent lamp, and a light-emitting element such as an LED or an organic EL element are given as examples of the artificial light source.

In FIG. 28, an air conditioner including an indoor unit 8200 and an outdoor unit 8204 is an example of an electronic device including a secondary battery 8203 of one embodiment of the present invention. Specifically, the indoor unit 8200 includes a housing 8201, an air outlet 8202, the secondary battery 8203, and the like. Although FIG. 28 illustrates the case where the secondary battery 8203 is provided in the indoor unit 8200, the secondary battery 8203 may be provided in the outdoor unit 8204. Alternatively, the secondary batteries 8203 may be provided in both the indoor unit 8200 and the outdoor unit 8204. The air conditioner can receive electric power from a commercial power supply, or use electric power stored in the secondary battery 8203. Particularly in the case where the secondary batteries 8203 are provided in both the indoor unit 8200 and the outdoor unit 8204, the air conditioner can operate with the use of the secondary battery 8203 of one embodiment of the present invention as an uninterruptible power supply even when electric power cannot be supplied from a commercial power supply due to power failure or the like.

Note that although the split-type air conditioner including the indoor unit and the outdoor unit is illustrated in FIG. 28 as an example, the secondary battery of one embodiment of the present invention can be used in an air conditioner in which the functions of an indoor unit and an outdoor unit are integrated in one housing.

In FIG. 28, an electric refrigerator-freezer 8300 is an example of an electronic device using a secondary battery 8304 of one embodiment of the present invention. Specifically, the electric refrigerator-freezer 8300 includes a housing 8301, a refrigerator door 8302, a freezer door 8303, the secondary battery 8304, and the like. The secondary battery 8304 is provided in the housing 8301 in FIG. 28. The electric refrigerator-freezer 8300 can receive electric power from a commercial power supply, or use electric power stored in the secondary battery 8304. Thus, the electric refrigerator-freezer 8300 can operate with the use of the secondary battery 8304 of one embodiment of the present invention as an uninterruptible power supply even when electric power cannot be supplied from a commercial power supply due to power failure or the like.

In addition, power can be stored in the secondary battery in a time period when electronic devices are not used, particularly when the proportion of the amount of power which is actually used to the total amount of power which can be supplied from a commercial power source (such a proportion referred to as a usage rate of power) is low, whereby an increase in the usage rate of power can be reduced in a time period when the electronic devices are used. For example, in the case of the electric refrigerator-freezer 8300, power is stored in the secondary battery 8304 in night time when the temperature is low and the refrigerator door 8302 and the freezer door 8303 are not opened and closed. On the other hand, in daytime when the temperature is high and the refrigerator door 8302 and the freezer door 8303 are opened and closed, the secondary battery 8304 is used as an auxiliary power source; thus, the usage rate of power in daytime can be reduced.

The secondary battery of one embodiment of the present invention can be used in a variety of electronic devices as well as the above electronic devices. According to one embodiment of the present invention, the secondary battery can have little deterioration and high safety. Thus, when the secondary battery of one embodiment of the present invention is used in the electronic devices described in this embodiment, electronic devices with longer lifetime and higher safety can be obtained. This embodiment can be implemented in appropriate combination with the other embodiments.

Embodiment 7

In this embodiment, examples of vehicles including the secondary battery of one embodiment of the present invention are described.

The use of secondary batteries in vehicles enables production of next-generation clean energy vehicles such as hybrid electric vehicles (HVs), electric vehicles (EVs), and plug-in hybrid electric vehicles (PHVs or PHEVs).

Figure 29A:
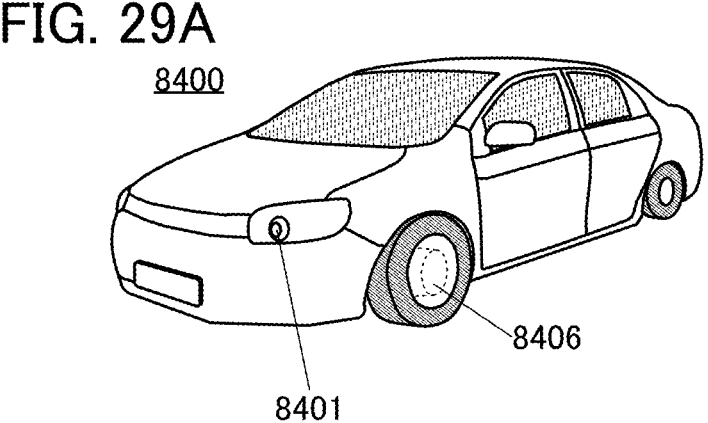
FIG. 29A is a perspective view of a vehicle.

FIG. 29 illustrates examples of a vehicle using the secondary battery of one embodiment of the present invention. An automobile 8400 illustrated in FIG. 29A is an electric vehicle that runs on the power of an electric motor. Alternatively, the automobile 8400 is a hybrid electric vehicle capable of driving appropriately using either an electric motor or an engine. The use of a secondary battery of one embodiment of the present invention can provide a high-mileage vehicle. The automobile 8400 includes the secondary battery. The secondary battery is used not only for driving an electric motor 8406, but also for supplying electric power to a light-emitting device such as a headlight 8401 or a room light (not illustrated).

The secondary battery can also supply electric power to a display device of a speedometer, a tachometer, or the like included in the automobile 8400. Furthermore, the secondary battery can supply electric power to a semiconductor device included in the automobile 8400, such as a navigation system.

Figure 29B:
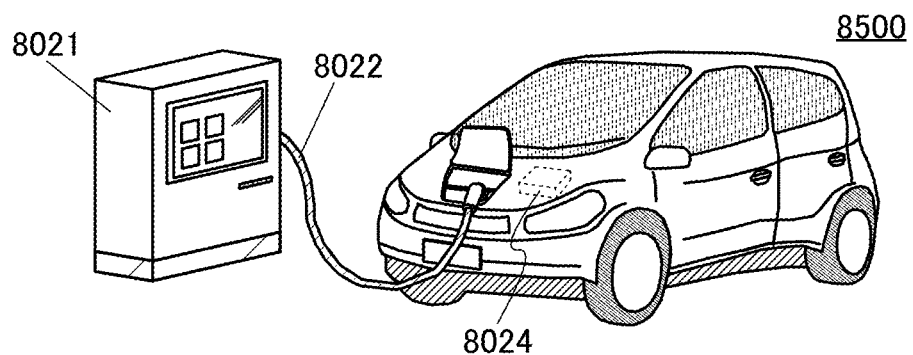
FIG. 29B is a perspective view illustrating charging of a vehicle.

An automobile 8500 illustrated in FIG. 29B can be charged when a secondary battery 8024 included in the automobile 8500 is supplied with electric power through external charging equipment by a plug-in system, a contactless power feeding system, or the like. In FIG. 29B, the secondary battery 8024 mounted on the automobile 8500 is charged with the use of a ground-based charging apparatus 8021 through a cable 8022. In charging, a given method such as CHAdeMO (registered trademark) or Combined Charging System may be employed as a charging method, a connector, or the like as appropriate. The charging apparatus 8021 may be a charging station provided in a commerce facility or a power source in a house. With the use of a plug-in technique, the secondary battery 8024 mounted on the automobile 8500 can be charged by being supplied with electric power from the outside, for example. The charging can be performed by converting AC electric power into DC electric power through a converter such as an AC-DC converter.

Furthermore, although not illustrated, the vehicle may include a power receiving device so that it can be charged by being supplied with electric power from an above-ground power transmitting device in a contactless manner. In the case of the contactless power feeding system, by fitting a power transmitting device in a road or an exterior wall, charging can be performed not only when the vehicle stops but also when moves. In addition, the contactless power feeding system may be utilized to perform transmission and reception of electric power between vehicles. A solar cell may be provided in the exterior of the vehicle to charge the secondary battery when the vehicle stops or moves. To supply electric power in such a contactless manner, an electromagnetic induction method or a magnetic resonance method can be used.

Figure 29C:
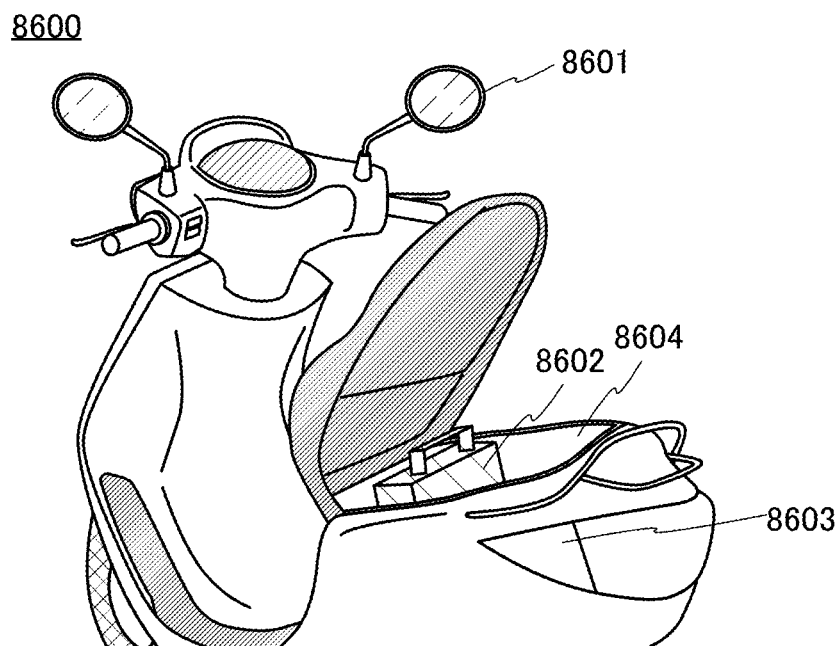
FIG. 29C is a perspective view illustrating an electric motorcycle.

FIG. 29C shows an example of a motorcycle using the secondary battery of one embodiment of the present invention. A motor scooter 8600 illustrated in FIG. 29C includes a secondary battery 8602, side mirrors 8601, and indicators 8603. The secondary battery 8602 can supply electric power to the indicators 8603.

Furthermore, in the motor scooter 8600 illustrated in FIG. 29C, the secondary battery 8602 can be held in a storage unit under seat 8604. The secondary battery 8602 can be held in the storage unit under seat 8604 even with a small size.

According to one embodiment of the present invention, the secondary battery can have little deterioration and high safety. Thus, when the secondary battery is mounted on a vehicle, a reduction in mileage, acceleration performance, or the like can be inhibited. In addition, a highly safe vehicle can be achieved. Furthermore, the secondary battery mounted on the vehicle can be used as a power source for supplying electric power to products other than the vehicle. In such a case, the use of a commercial power source can be avoided at peak time of electric power demand, for example. If the use of a commercial power source can be avoided at peak time of electric power demand, the avoidance can contribute to energy saving and a reduction in carbon dioxide emissions. Moreover, the secondary battery with little deterioration and high safety can be used for a long period; thus, the use amount of rare metals such as cobalt can be reduced.

This embodiment can be implemented in appropriate combination with the other embodiments.

Example 1

In this example, $LiMO_2$ formed by the forming method of one embodiment of the present invention is described. The forming method is described with reference to FIG. 1, FIG. 4A, and Table 2.

<Formation of Samples of $LiMO_2$>

First, the mixture 902 containing magnesium and fluorine was formed (Steps Step S11 to Step S14). LiF and $MgF_2$ were weighted so that the molar ratio of LiF to $MgF_2$ was $LiF:MgF_2=1:3$, acetone was added as a solvent, and the materials were mixed and ground by a wet process. The mixing and the grinding were performed in a ball mill using a zirconia ball at 400 rpm for 12 hour. The material that has been subjected to the treatment was collected to be the mixture 902.

Next, lithium cobalt oxide was prepared as a composite oxide containing lithium and cobalt. More specifically, CELLSEED C-10N formed by NIPPON CHEMICAL INDUSTRIAL CO., LTD. was prepared as a composite oxide (Step S25).

Next, in Step S31, the materials were weighed so that the atomic weight of magnesium in the mixture 902 was 0.5 mol % of the atomic weight of cobalt in the lithium cobalt oxide. The mixing was performed by a dry method. The mixing was performed in a ball mill using a zirconia ball at 150 rpm for 1 hour.

Figure 30A:
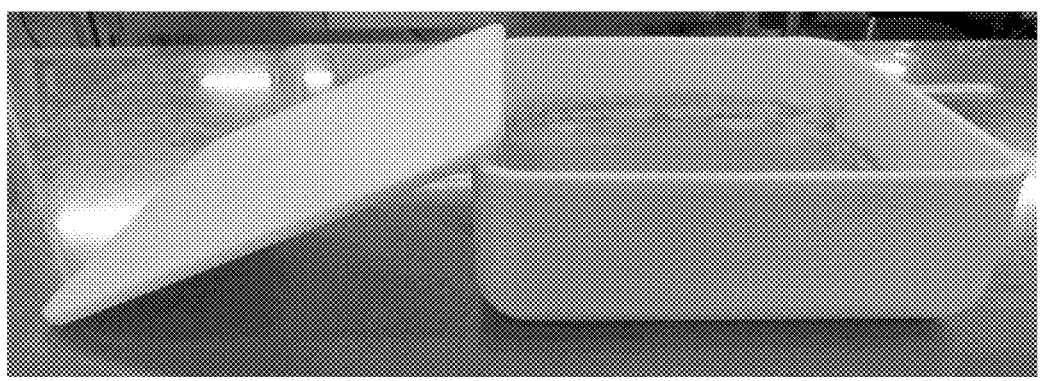
FIG. 30A and FIG. 30B are photographs of an alumina crucible used in annealing.
Figure 30B:
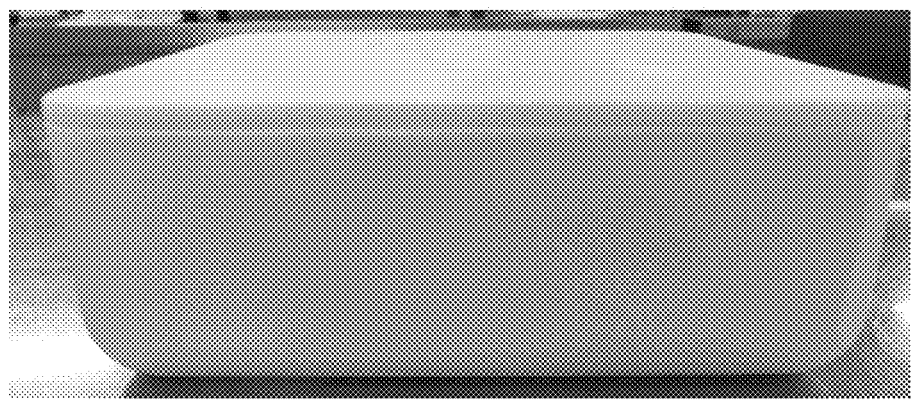

Next, the mixture 903 was put into an alumina crucible (aluminum oxide crucible) and annealed in a muffle furnace (Step S34). The annealing conditions are different between the samples and are shown in Table 2. The temperature rising rate was 200° C./h, and the temperature decreasing time was longer than or equal to 10 hours. The material after the heat treatment was collected and made to pass through a sieve (Step S35), so that each sample (Comparative sample 1 and Sample 2) was obtained (Step S36). FIG. 30 shows the alumina crucible that was actually used. FIG. 30A shows the alumina crucible not covered with a lid yet, and FIG. 30B shows the alumina crucible covered with the lid.

Sample 2 was formed by the forming method of one embodiment of the present invention. Comparative sample 1 and Sample 2 are different in the condition of an atmosphere including LiF.

TABLE 2

| | Sample weight (g) | Annealing temperature (° C.) | Annealing time (h) | $O_2$ condition | Atmosphere including LiF |
|---|---|---|---|---|---|
| Comparative sample 1 | 30 | 900 | 20 | flow | No |
| Sample 2 | 30 | 900 | 20 | flow | Yes |

<Annealing Methods of Samples of $LiMO_2$>

The steps up to S33 were the same in all the samples. The annealing method in S34 was different between the samples. A conceptual view at the time of the annealing is illustrated in FIG. 4A.

In Table 2, "Sample weight" is weight of the annealed mixture 903.

In Table 2, "Annealing temperature" is a temperature at the time of the annealing, and "Annealing time" is time for holding the annealing temperature.

In Table 2, "$O_2$ condition" means a method for introducing $O_2$ into the space 102 in the heating furnace, and "flow" shows that the annealing was performed while $O_2$ is introduced at a flow rate of 10 L/min.

In Table 2, "Atmosphere including LiF" shows whether or not the container 122 and the fluoride 906 (LiF in this example) were heated at the same time as the annealing of the mixture 903, "No" shows the case where only the mixture 903 was annealed without the use of the container 122 and the fluoride 906, and "Yes" shows the case where the container 122 and the fluoride 906 were heated at the same time as the mixture 903. Note that in the case of "Yes", four containers 122 each including 1 g of LiF were provided in the space 102 in the heating furnace.

<Formation of Battery Cell>

Next, positive electrodes were formed using Comparative sample 1 and Sample 2 formed in the above as positive electrode active materials. A current collector that was coated with slurry in which the positive electrode active material, AB, and PVDF were mixed at the active material:AB:PVDF=95:3:2 (weight ratio) was used. As a solvent of the slurry, NMP was used.

After the current collector was coated with the slurry, the solvent was volatilized. Then, pressure was applied at 210 kN/m, and then pressure was applied at 1467 kN/m. Through the above process, the positive electrode was obtained. The carried amount of the positive electrode was approximately 7 mg/cm$^2$, and the electrode density was >3.8 g/cc.

Using the formed positive electrodes, CR2032 type coin battery cells (a diameter of 20 mm, a height of 3.2 mm) were formed.

A lithium metal was used for a counter electrode.

As an electrolyte contained in the electrolyte solution, 1 mol/L lithium hexafluorophosphate (LiPF$_6$) was used. As the electrolyte solution, an electrolyte solution in which ethylene carbonate (EC) and diethyl carbonate (DEC) were mixed at EC:DEC=3:7 (volume ratio) was used. Note that for secondary batteries used for evaluating the charge and discharge efficiency, 2 wt % of vinylene carbonate (VC) was added to the electrolytic solution.

As a separator, 25-μm-thick polypropylene was used.

A positive electrode can and a negative electrode can that were formed using stainless steel (SUS) were used.

<Measurement of Charge and Discharge Efficiency>

Figure 31:
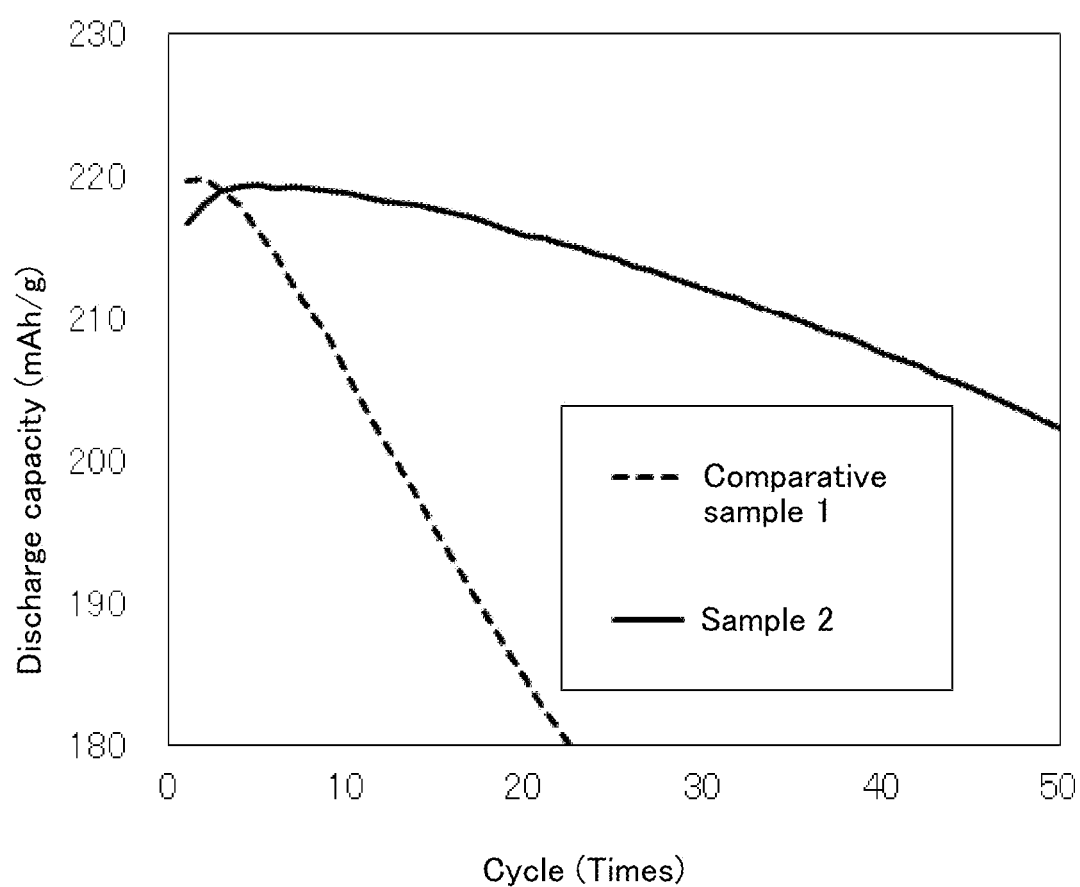
FIG. 31 is a diagram illustrating cycle performance of Example.

The cycle performance of the battery cells formed using the comparative sample and Sample 2 that were obtained was measured. The cycle performance was evaluated at 25° C. while the CCCV charging (1.0 C, 4.6 V, a termination current of 0.1 C) and the CC discharging (1.0 C, 2.5 V) were performed. FIG. 31 shows the results.

It is found from FIG. 31 that Sample 2 that was formed by one embodiment of the present invention shows cycle performance superior to that of Comparative sample 1. Thus, annealing in an atmosphere including LiF enables a positive electrode active material having excellent characteristics to be formed.

REFERENCE NUMERALS

100: heating furnace, 101: positive electrode active material, 100A-1: positive electrode active material, 100C: positive electrode active material, 102: space in heating furnace, 104: hot plate, 106: heater, 108: heat insulator, 110: gas supply line, 112: gate valve, 114: gas exhaust line, 116: container, 120: heating furnace, 122: container, 124: container, 130: heating furnace, 132: conveyor belt, 134: container, 140: heating furnace, 142: material input port, 144: atmosphere control portion, 146: collecting portion, 200: active material layer, 201: graphene compound, 211a: positive electrode, 211b: negative electrode, 212a: lead, 212b: lead, 214: separator, 215a: bonding portion, 215b: bonding portion, 217: fixing member, 250: battery, 251: exterior body, 261: folded portion, 262: seal portion, 263: seal portion, 271: crest line, 272: trough line, 273: space, 300: secondary battery, 301: positive electrode can, 302: negative electrode can, 303: gasket, 304: positive electrode, 305: positive electrode current collector, 306: positive electrode active material layer, 307: negative electrode, 308: negative electrode current collector, 309: negative electrode active material layer, 310: separator, 500: secondary battery, 501: positive electrode current collector, 502: positive electrode active material layer, 503: positive electrode, 504: negative electrode current collector, 505: negative electrode active material layer, 506: negative electrode, 507: separator, 508: electrolyte solution, 509: exterior body, 510: positive electrode lead electrode, 511: negative electrode lead electrode, 600: secondary battery, 601: positive electrode cap, 602: battery can, 603: positive electrode terminal, 604: positive electrode, 605: separator, 606: negative electrode, 607: negative electrode terminal, 608: insulating plate, 609: insulating plate, 611: PTC element, 612: safety valve mechanism, 613: conductive plate, 614: conductive plate, 615: module, 616: conducting wiring, 617: temperature control device, 900: circuit board, 902: mixture, 902-3: mixture, 903: mixture, 903-2: mixture, 903-3: mixture, 904: positive electrode active material, 904-2: positive electrode active material, 904-3: positive electrode active material, 904-4: positive electrode active material, 905: mixture, 906: fluoride, 908: mixture, 909: mixture, 910: label, 911: terminal, 912: circuit, 913: secondary battery, 914: antenna, 915: antenna, 916: layer, 917: layer, 918: antenna, 919: terminal, 920: display device, 921: sensor, 922: terminal, 930: housing, 930a: housing, 930b: housing, 931: negative electrode, 932: positive electrode, 933: separator, 950: wound body, 951: terminal, 952: terminal, 980: secondary battery, 981:

film, 982: film, 993: wound body, 994: negative electrode, 995: positive electrode, 996: separator, 997: lead electrode, 998: lead electrode, 7100: portable display device, 7101: housing, 7102: display portion, 7103: operation button, 7104: secondary battery, 7200: portable information terminal, 7201: housing, 7202: display portion, 7203: band, 7204: buckle, 7205: operation button, 7206: input output terminal, 7207: icon, 7300: display device, 7304: display portion, 7400: mobile phone, 7401: housing, 7402: display portion, 7403: operation button, 7404: external connection port, 7405: speaker, 7406: microphone, 7407: secondary battery, 8000: display device, 8001: housing, 8002: display portion, 8003: speaker portion, 8004: secondary battery, 8021: charging apparatus, 8022: cable, 8024: secondary battery, 8100: lighting device, 8101: housing, 8102: light source, 8103: secondary battery, 8104: ceiling, 8105: sidewall, 8106: floor, 8107: window, 8200: indoor unit, 8201: housing, 8202: air outlet, 8203: secondary battery, 8204: outdoor unit, 8300: electric refrigerator-freezer, 8301: housing, 8302: refrigerator door, 8303: freezer door, 8304: secondary battery, 8400: automobile, 8401: headlight, 8406: electric motor, 8500: automobile, 8600: motor scooter, 8601: side mirror, 8602: secondary battery, 8603: indicator, 8604: storage unit under seat, 9600: tablet terminal, 9625: switch, 9626: switch, 9627: power switch, 9628: operation switch, 9629: fastener, 9630: housing, 9630*a*: housing, 9630*b*: housing, 9631: display portion, 9633: solar cell, 9634: charge and discharge control circuit, 9635: power storage unit, 9636: DC-DC converter, 9637: converter, 9640: movable portion

The invention claimed is:

1. A method for forming a positive electrode active material, wherein a first container that includes a mixture of lithium cobalt oxide, a first fluoride, and a magnesium compound and a second fluoride that is outside the first container are provided in a heating furnace, and the heating furnace is heated at a temperature higher than or equal to a temperature at which at least one of the first fluoride or the second fluoride is volatilized or sublimated, wherein the first fluoride and the magnesium compound are different.

2. The method for forming a positive electrode active material according to claim 1, wherein the first fluoride is lithium fluoride and the second fluoride is lithium fluoride.

3. The method for forming a positive electrode active material according to claim 2, wherein the heating furnace is heated at higher than or equal to 730° C. and lower than or equal to 1130° C.

4. The method for forming a positive electrode active material according to claim 1, wherein the magnesium compound is magnesium fluoride.

5. The method for forming a positive electrode active material according to claim 1, wherein the heating furnace is heated after an atmosphere in the heating furnace is replaced with oxygen.

6. A method for forming a positive electrode active material, wherein a first container that contains a mixture of lithium cobalt oxide, a first fluoride, and a magnesium compound and a second container that includes a second fluoride are provided in a heating furnace, and the heating furnace is heated at a temperature higher than or equal to a temperature at which at least one of the first fluoride or the second fluoride is volatilized or sublimated, wherein the first fluoride and the magnesium compound are different.

7. The method for forming a positive electrode active material according to claim 6, wherein the first fluoride is lithium fluoride and the second fluoride is lithium fluoride.

8. The method for forming a positive electrode active material according to claim 7, wherein the heating furnace is heated at higher than or equal to 730° C. and lower than or equal to 1130° C.

9. The method for forming a positive electrode active material according to claim 6, wherein the magnesium compound is magnesium fluoride.

* * * * *